United States Patent
Stilp

(10) Patent No.: US 7,023,341 B2
(45) Date of Patent: Apr. 4, 2006

(54) RFID READER FOR A SECURITY NETWORK

(75) Inventor: Louis A. Stilp, Berwyn, PA (US)

(73) Assignee: Ingrid, Inc., Berwyn, PA (US)

( * ) Notice: Subject to any disclaimer, the term of this patent is extended or adjusted under 35 U.S.C. 154(b) by 50 days.

(21) Appl. No.: 10/602,854

(22) Filed: Jun. 25, 2003

(65) Prior Publication Data

US 2004/0212493 A1 Oct. 28, 2004

Related U.S. Application Data

(63) Continuation-in-part of application No. 10/423,887, filed on Apr. 28, 2003, which is a continuation-in-part of application No. 10/366,316, filed on Feb. 14, 2003, which is a continuation-in-part of application No. 10/356,512, filed on Feb. 3, 2003, now Pat. No. 6,888,459.

(51) Int. Cl.
*G08B 13/08* (2006.01)

(52) U.S. Cl. ............... 340/572.1; 340/545.1; 340/545.2; 340/586.02

(58) Field of Classification Search ............ 340/572.1, 340/541, 539.14, 539.19, 539.22, 539.26, 340/506, 507, 545.1, 529, 545.2, 545.3, 545.9, 340/286.02

See application file for complete search history.

(56) References Cited

U.S. PATENT DOCUMENTS

| | | | |
|---|---|---|---|
| 4,367,458 A | 1/1983 | Hackett | ............ 340/539 |
| 4,465,904 A | 8/1984 | Gottsegen et al. | |
| 4,550,311 A | 10/1985 | Galloway et al. | |
| 4,613,848 A | 9/1986 | Watkins | ............ 340/541 |
| 4,724,425 A | 2/1988 | Gerhart et al. | |
| 4,731,810 A | 3/1988 | Watkins | |
| 4,754,261 A | 6/1988 | Marino | |
| 4,812,820 A | 3/1989 | Chatwin | |
| 4,855,713 A | 8/1989 | Brunius | |
| 4,908,604 A | 3/1990 | Jacob | |
| 4,951,029 A | 8/1990 | Severson | |
| 4,980,913 A | 12/1990 | Skret | |
| 5,040,335 A | 8/1991 | Grimes | ............ 49/502 |
| 5,233,640 A | 8/1993 | Kostusiak | |
| 5,300,875 A | 4/1994 | Tuttle | |
| 5,307,763 A | 5/1994 | Arthur et al. | ............ 119/718 |
| 5,406,263 A | 4/1995 | Tuttle | |
| 5,438,607 A | 8/1995 | Przygoda, Jr. et al. | |
| 5,465,081 A | 11/1995 | Todd | |
| 5,543,778 A | 8/1996 | Stouffer | |
| 5,621,662 A | 4/1997 | Humphries et al. | |
| 5,625,338 A | 4/1997 | Pildner et al. | |

(Continued)

*Primary Examiner*—Jeffery Hofsass
*Assistant Examiner*—Jennifer Stone
(74) *Attorney, Agent, or Firm*—Stradley Ronon Stevens & Young, LLP

(57) ABSTRACT

An RFID reader for use in a security network based upon RFID techniques. The RFID reader can use wireless communications to communicate with RFID transponders and other devices in the security network. The RFID reader of the security network can be provided with multiple modulation techniques, multiple antennas, and the capability to vary its power level and carrier frequency. The RFID reader can transmit RF energy useful for detecting motion or for charging the batteries in RFID transponders. The RFID reader can contain an audio transducer, a camera, or various environmental sensors to detect parameters such as smoke, temperature, and water, among others. The program code of the RFID reader can be updated. A master controller within the security network can control operations within the RFID reader.

44 Claims, 26 Drawing Sheets

U.S. PATENT DOCUMENTS

| | | |
|---|---|---|
| 5,646,592 A | 7/1997 | Tuttle |
| 5,649,296 A | 7/1997 | MacLellan et al. |
| 5,668,929 A | 9/1997 | Foster, Jr. .................. 704/273 |
| 5,706,399 A | 1/1998 | Bareis |
| 5,726,644 A | 3/1998 | Jednacz et al. |
| 5,736,927 A | 4/1998 | Stebbins et al. |
| 5,742,237 A | 4/1998 | Bledsoe |
| 5,748,079 A | 5/1998 | Addy |
| 5,761,206 A | 6/1998 | Kackman |
| 5,786,767 A | 7/1998 | Severino |
| 5,799,062 A | 8/1998 | Lazzara et al. |
| 5,801,626 A | 9/1998 | Addy |
| 5,805,063 A | 9/1998 | Kackman |
| 5,805,064 A | 9/1998 | Yorkey |
| 5,809,013 A | 9/1998 | Kackman |
| 5,812,054 A | 9/1998 | Cohen |
| 5,822,373 A | 10/1998 | Addy |
| 5,828,300 A | 10/1998 | Addy et al. |
| 5,831,531 A | 11/1998 | Tuttle |
| 5,889,468 A | 3/1999 | Banga |
| 5,894,266 A | 4/1999 | Wood, Jr. et al. ........... 340/539 |
| 5,898,369 A | 4/1999 | Godwin |
| 5,905,438 A | 5/1999 | Weiss et al. |
| 5,907,279 A | 5/1999 | Bruins et al. |
| 5,920,270 A | 7/1999 | Peterson |
| 5,929,778 A | 7/1999 | Asama et al. |
| 5,949,335 A | 9/1999 | Maynard .................. 340/572.1 |
| 5,950,110 A | 9/1999 | Hendrickson |
| 6,026,165 A | 2/2000 | Marino et al. |
| 6,028,513 A | 2/2000 | Addy |
| 6,049,273 A | 4/2000 | Hess |
| 6,054,925 A | 4/2000 | Proctor et al. |
| 6,058,137 A | 5/2000 | Partyka |
| 6,060,994 A | 5/2000 | Chen |
| 6,078,269 A | 6/2000 | Markwell et al. |
| 6,084,530 A | 7/2000 | Pidwerbetsky et al. |
| 6,087,933 A | 7/2000 | Addy et al. |
| 6,091,320 A | 7/2000 | Odinak .................... 340/10.01 |
| 6,104,785 A | 8/2000 | Chen |
| 6,120,262 A | 9/2000 | McDonough et al. |
| 6,127,928 A | 10/2000 | Issacman et al. ......... 340/572.1 |
| 6,134,303 A | 10/2000 | Chen |
| 6,137,402 A | 10/2000 | Marino |
| 6,150,936 A | 11/2000 | Addy |
| 6,150,948 A | 11/2000 | Watkins ................... 340/693.3 |
| 6,163,257 A | 12/2000 | Tracy |
| 6,175,860 B1 | 1/2001 | Gaucher |
| 6,177,861 B1 | 1/2001 | MacLellan et al. |
| 6,191,701 B1 | 2/2001 | Bruwer |
| 6,195,006 B1 | 2/2001 | Bowers et al. ........... 340/572.1 |
| 6,204,760 B1 | 3/2001 | Brunius |
| 6,208,247 B1 | 3/2001 | Agre et al. |
| 6,208,694 B1 | 3/2001 | Addy |
| 6,215,404 B1 | 4/2001 | Morales |
| 6,229,997 B1 | 5/2001 | Addy |
| 6,236,315 B1 | 5/2001 | Helms |
| 6,243,010 B1 | 6/2001 | Addy et al. |
| 6,243,012 B1 | 6/2001 | Shober et al. |
| 6,252,501 B1 | 6/2001 | Tice et al. |
| 6,255,944 B1 | 7/2001 | Addy |
| 6,271,754 B1 * | 8/2001 | Durtler ........................ 340/552 |
| 6,285,261 B1 | 9/2001 | Pax et al. |
| 6,294,992 B1 | 9/2001 | Addy et al. |
| 6,313,743 B1 | 11/2001 | Abraham-Fuchs et al. |
| 6,317,028 B1 | 11/2001 | Valiulis .................... 340/10.1 |
| 6,366,215 B1 | 4/2002 | Tice et al. |
| 6,367,697 B1 | 4/2002 | Turner et al. |
| 6,377,609 B1 | 4/2002 | Brennan, Jr. |
| 6,441,723 B1 | 8/2002 | Mansfield, Jr. et al. |
| 6,441,731 B1 | 8/2002 | Hess |
| 6,445,291 B1 * | 9/2002 | Addy et al. ............ 340/539.22 |
| 6,445,292 B1 | 9/2002 | Jen et al. |
| 6,456,668 B1 | 9/2002 | MacLellan et al. |
| 6,459,726 B1 | 10/2002 | Ovard et al. |
| 6,466,138 B1 | 10/2002 | Partyka |
| 6,483,433 B1 * | 11/2002 | Moskowitz et al. ...... 340/568.1 |
| 6,501,807 B1 | 12/2002 | Chieu et al. |
| 6,507,607 B1 | 1/2003 | Hill |
| 6,593,845 B1 | 7/2003 | Friedman et al. |
| 6,617,963 B1 | 9/2003 | Watters et al. ........... 340/10.41 |
| 6,624,750 B1 | 9/2003 | Marman et al. |
| 6,646,550 B1 | 11/2003 | Runyon et al. |
| 6,691,172 B1 | 2/2004 | Clow et al. |
| 6,693,513 B1 | 2/2004 | Tuttle ....................... 340/10.1 |
| 6,703,930 B1 * | 3/2004 | Skinner .................. 340/539.11 |
| 6,707,374 B1 * | 3/2004 | Zaharia .................... 340/5.31 |
| 6,806,808 B1 | 10/2004 | Watters et al. ........... 340/10.41 |
| 2001/0008390 A1 * | 7/2001 | Berquist et al. .......... 340/10.31 |
| 2002/0060639 A1 | 5/2002 | Harman ...................... 324/28 |
| 2002/0070863 A1 * | 6/2002 | Brooking ................ 340/572.1 |
| 2002/0174367 A1 | 11/2002 | Kimmel et al. ............. 713/201 |
| 2003/0227385 A1 * | 12/2003 | Lancaster ................ 340/572.1 |
| 2004/0008112 A1 | 1/2004 | Carrender .............. 340/539.26 |
| 2004/0046642 A1 | 3/2004 | Becker et al. ........... 340/10.32 |
| 2004/0066280 A1 * | 4/2004 | Pratt et al. ................. 340/10.2 |
| 2004/0189471 A1 * | 9/2004 | Ciarcia et al. ........... 340/572.1 |
| 2004/0210495 A1 | 10/2004 | White ......................... 705/28 |

\* cited by examiner

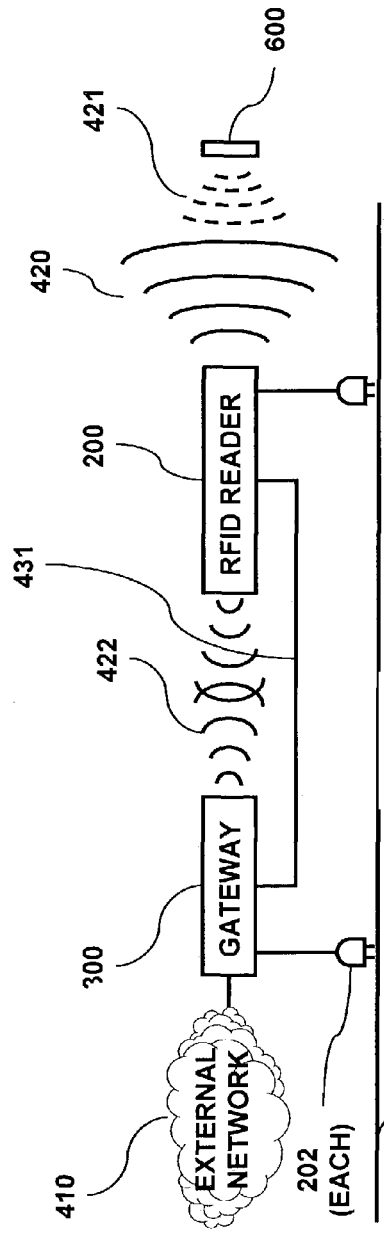
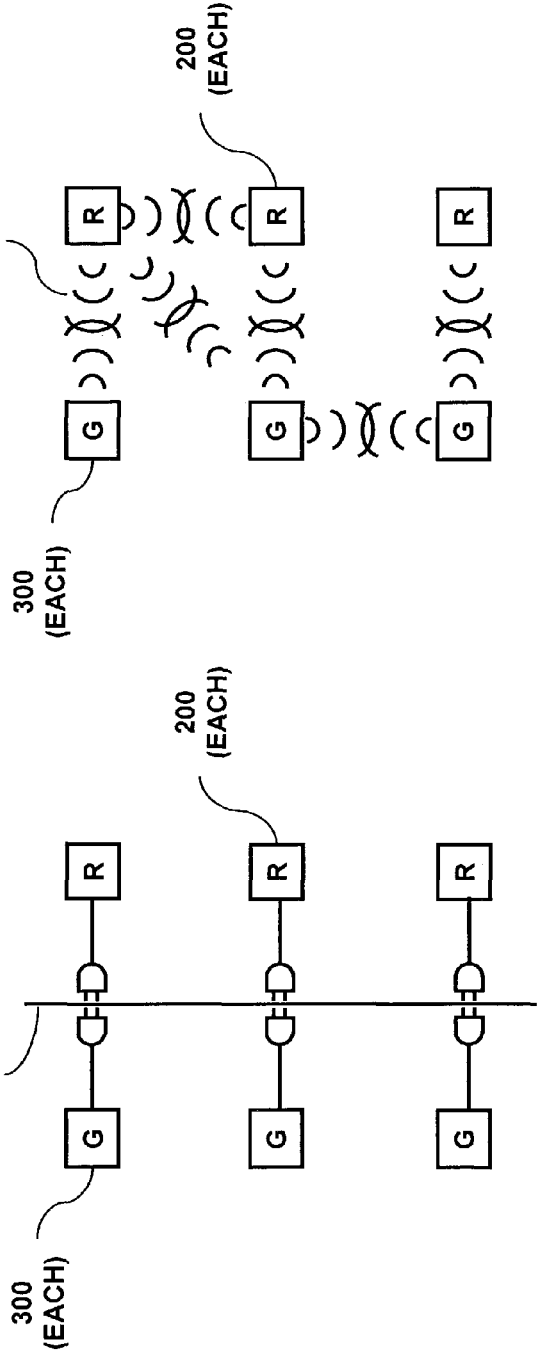
FIG. 2A
FIG. 2B
FIG. 2C

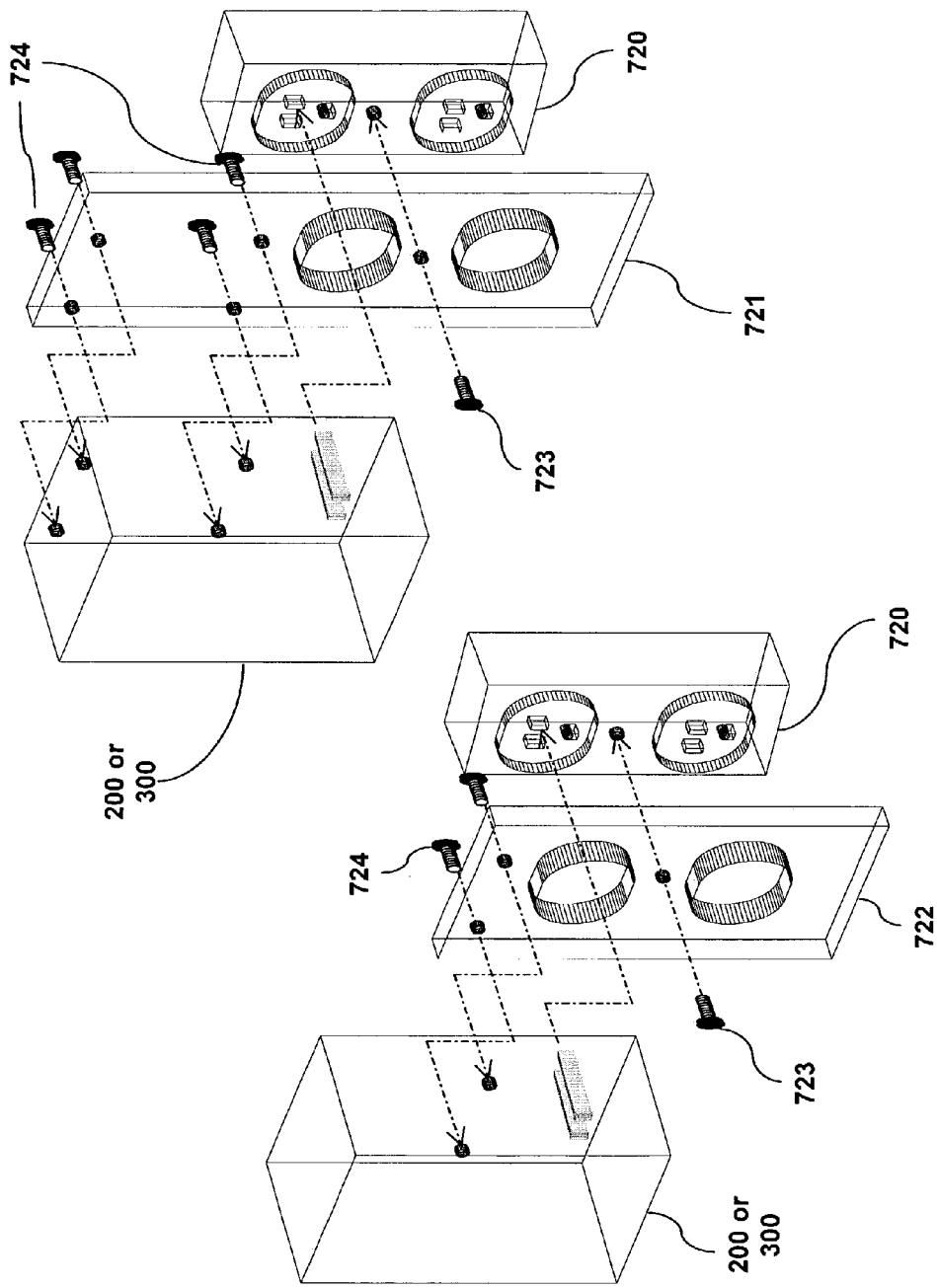

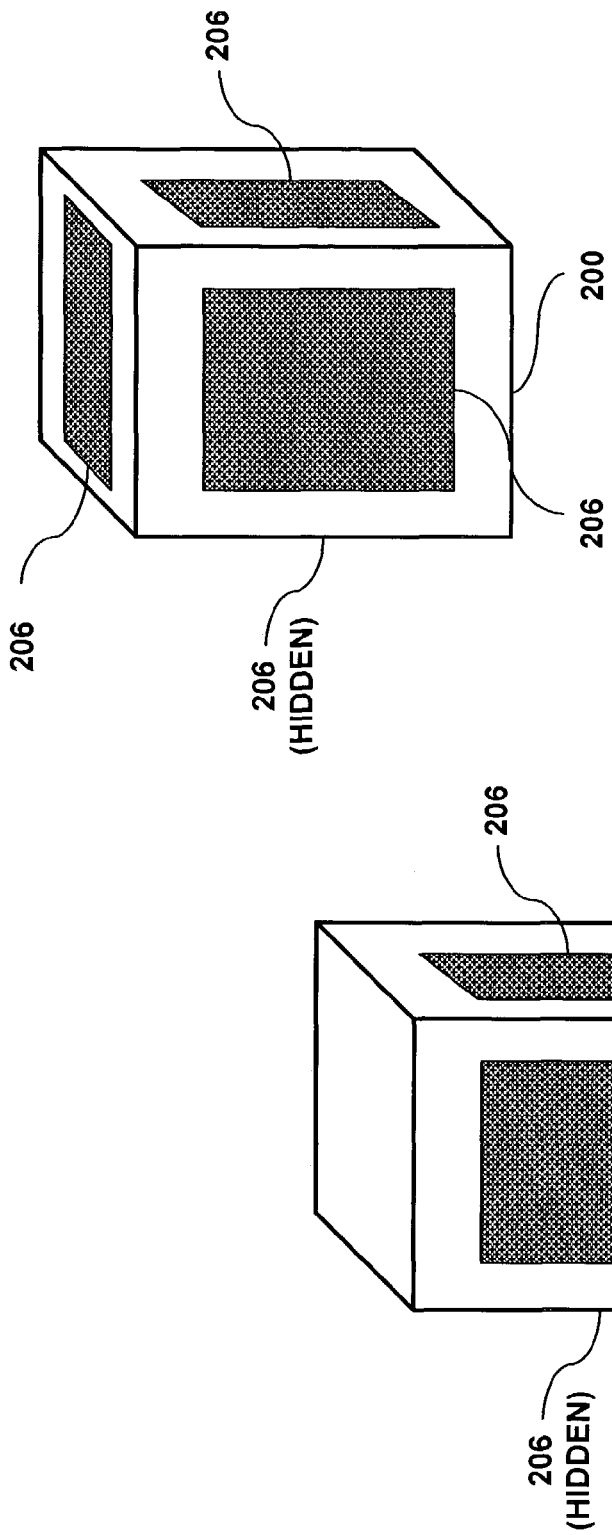

RFID READER FOR A SECURITY NETWORK

CROSS REFERENCE TO RELATED APPLICATIONS

This patent application is a continuation-in-part of pending U.S. application Ser. No. 10/423,887, RFID Based Security Network, filed on Apr. 28, 2003 by the inventor of the present application; which is itself a continuation-in-part of pending U.S. application Ser. No. 10/366,316, RFID Reader for a Security System, filed on Feb. 14, 2003 by the inventor of the present application; which is itself a continuation-in-part of U.S. application Ser. No. 10/356,512, RFID Based Security System, filed on Feb. 3, 2003 by the inventor of the present application (now granted as U.S. Pat. No. 6,888,459).

This patent application is further cross referenced to the following patent applications, all filed on Feb. 14, 2003 by the inventor of the present application: Communications Control in a Security System, application Ser. No. 10/366,320; Device Enrollment in a Security System, application Ser. No. 10/366,335; Controller for a Security System, application Ser. No. 10/366,334; and REID Transponder for a Security System, application Ser. No. 10/366,317.

All of the foregoing cross-referenced patent applications are incorporated by reference into this present patent application.

BACKGROUND OF THE INVENTION

Security systems and home automation networks are described in numerous patents, and have been in prevalent use for over 40 years. In the United States, there are over 14 million security systems in residential homes alone. The vast majority of these systems are hardwired systems, meaning the keypad, system controller, and various intrusion sensors are wired to each other.

These systems are easy to install when a home is first being constructed and access to the interiors of walls is easy; however, the cost increases substantially when wires must be added to an existing home. On average, the security industry charges approximately $75 per opening (i.e., window or door) to install a wired intrusion sensor (such as a magnet and reed switch), where most of this cost is due to the labor of drilling holes and running wires to each opening. For this reason, most homeowners only monitor a small portion of their openings. This is paradoxical because most homeowners actually want security systems to cover their entire home.

In order to induce a homeowner to install a security system, many security companies will underwrite a portion of the costs of installing a security system. Therefore, if the cost of installation were $1,500, the security company may only charge $500 and then require the homeowner to sign a multi-year contract with monthly fees. The security company then recovers its investment over time. Interestingly enough, if a homeowner wants to purchase a more complete security system, the revenue to the security company and the actual cost of installation generally rise in lockstep, keeping the approximate $1,000 investment constant. This actually leads to a disincentive for security companies to install more complete systems—it uses up more technician time without generating a higher monthly contract or more upfront profit. Furthermore, spending more time installing a more complete system for one customer reduces the total number of systems that any given technician can install per year, thereby reducing the number of monitoring contracts that the security company obtains per year.

In order to reduce the labor costs of installing wired systems into existing homes, wireless security systems have been developed in the last 10 to 20 years. These systems use RF communications for at least a portion of the keypads and intrusion sensors. Typically, a transceiver is installed in a central location in the home. Then, each opening is outfitted with an intrusion sensor connected to a small battery powered transmitter. The initial cost of the wireless system can range from $25 to $50 for each transmitter, plus the cost of the centrally located transceiver. This may seem less than the cost of a wired system, but in fact the opposite is true over a longer time horizon. Wireless security systems have demonstrated lower reliability than wired systems, leading to higher service and maintenance costs. For example, each transmitter contains a battery that drains over time (perhaps only a year or two), requiring a service call to replace the battery. Many of these transmitters lose their programming when the battery dies, requiring reprogramming along with the change of battery. Further, in larger houses, some of the windows and doors may be an extended distance from the centrally located transceiver, causing the wireless communications to intermittently fade out.

These types of wireless security systems generally operate under 47 CFR 15.231 (a), which places severe limits on the amount of power that can be transmitted. For example, at 433 MHz, used by the wireless transmitters of one manufacturer, an average field strength of only 11 mV/m is permitted at 3 meters (equivalent to approximately 36 microwatts). At 345 MHz, used by the wireless transmitters of another manufacturer, an average field strength of only 7.3 mV/m is permitted at 3 meters (equivalent to approximately 16 microwatts). Furthermore, control transmissions are only permitted once per hour, with a duration not to exceed one second. If these same transmitters wish to transmit data under 47 CFR 15.231 (e), the average field strengths at 345 and 433 MHz are reduced to 2.9 and 4.4 mV/m, respectively. (In a proceeding opened in October, 2001, the FCC is soliciting comments from the industry under which some of the rules of this section may change.) The problems of using these methods of transmission are discussed in various patents, including U.S. Pat. Nos. 6,087, 933, 6,137,402, 6,229,997, 6,288,639, and 6,294,992. In addition, as disclosed in U.S. Pat. No. 6,026,165 since centrally located transceivers must have a range sufficient to attempt to reach throughout the house these transceivers can also transmit and receive signals to/from outside the house and are therefore vulnerable to hacking by sophisticated intruders. Therefore, for the foregoing reasons and others, a number of reputable security monitoring companies strongly discourage the use of wireless security systems.

In either wired or wireless prior art security systems, additional sensors such as glass breakage sensors or motion sensors are an additional cost beyond a system with only intrusion sensors. Each glass breakage or motion sensor can cost $30 to $50 or more, not counting the labor cost of running wires from the alarm panel to these sensors. In the case of wireless security systems, the glass breakage or motion sensor can also be wireless, but then these sensors suffer from the same drawback as the transmitters used for intrusion sensing—they are battery powered and therefore require periodic servicing to replace the batteries and possible reprogramming in the event of memory loss.

Because existing wireless security systems are not reliable and wired security systems are difficult to install, many homeowners forego self-installation of security systems and either call professionals or do without. It is interesting to note that, based upon the rapid growth of home improvement chains such as Home Depot and Lowe's, there is a large market of do-it-yourself homeowners that will attempt carpentry, plumbing, and tile—but not security. There is, therefore, an established need for a security system that is both reliable and capable of being installed by the average homeowner.

Regardless of whether a present wired or wireless security system has been installed by a security company or self-installed, almost all present security systems are capable of only monitoring the house for intrusion, fire, or smoke. These investments are technology limited to a substantially single purpose. There would be a significant advantage to the homeowner if the security system were also capable of supporting additional home automation and lifestyle enhancing functions. There is, therefore, an apparent need for a security system that is actually a network of devices serving many functions in the home.

Radio Frequency Identification, or RFID, technology has been in existence for over 40 years, with substantial development by a number of large companies. A search of the USPTO database will reveal several hundred RFID-related patents. Surprisingly, though, a number of large companies such as Micron and Motorola have exited the RFID business as the existing applications for RFID have not proved lucrative enough. Most development and applications for RFID technology have been targeted at moveable items—things, people, animals, vehicles, merchandise, etc. that must be tracked or counted. Therefore, RFID has been applied to animal tracking, access control into buildings, inventory management, theft detection, toll collections, and library and supermarket checkout. In each of the applications, the low-cost RFID transponder or tag is affixed to the moveable object, and the RFID reader is generally a much higher cost transceiver. The term "RFID reader" or "RFID interrogator" is commonly used in the industry to refer to any transceiver device capable of transmitting to and receiving signals from RFID tags or RFID transponders. The terms "RFID tag" or "RFID transponder" are commonly used interchangeably in the industry to refer to the device remote from the RFID reader, with which the RFID reader is communicating. For example, in a building access application, an RFID reader is usually affixed near the entrance door of a building. Persons desiring access to the building carry an RFID tag or RFID transponder, sometimes in the form of an ID card, and hold this RFID tag or RFID transponder next to or in the vicinity of the RFID reader when attempting entry to the building. The RFID reader then "reads" the RFID tag, and if the RFID tag is valid, unlocks the entrance door.

The relative high cost (hundreds to thousands of dollars) of RFID readers is due to the requirement that they perform reliably in each mobile application. For example, the RFID reader for a toll collection application must "read" all of the RFID tags on cars traveling 40 MPH or more. Similarly, access control must read a large number of RFID tags in a brief period of time (perhaps only hundreds of milliseconds) while people are entering a building. Or a portable RFID reader must read hundreds or thousands of inventory RFID tags simultaneously while the operator is walking around a warehouse. Each of these applications can be fairly demanding from a technical standpoint, hence the need for sophisticated and higher cost readers. To date, RFID technology has not been applied to the market for security systems in homes or businesses.

It is therefore an object of the present invention to provide a security system for use in residential and commercial buildings that can be self-installed or installed by professionals at much lower cost than present systems. It is a further object of the present invention to provide a combination of RFID transponders and RFID readers that can be used in a security system for buildings.

BRIEF SUMMARY OF THE INVENTION

The present invention is a highly reliable system and method for constructing a security system, or security network, for a building comprising a network of devices and using a novel approach to designing RFID readers and RFID transponders to provide the radio link between each of a number of openings and a controller function capable of causing an alert in the event of an intrusion.

The present invention improves upon the traditional system model and paradigm by providing a security system with reliability exceeding that of existing wireless security systems, at lower cost than either professionally installed hardwired systems or wireless security systems. The present invention also allows self-installation, including incremental expansion, by typical homeowners targeted by the major home improvement chains. In the case of already installed security systems, present in more than 14 million residential homes, the present invention also provides an RFID reader that can be wired to and powered from existing control panels, directly or indirectly.

Several new marketing opportunities are created for security systems that are otherwise unavailable in the market today. First, for professional systems sold by major alarm companies, a single customer service representative may sell the system to a homeowner and then install the system in a single visit to the customer's home. This is in contrast to the present model where a salesperson sells the system and then an installer must return at a later date to drill holes, pull wires, and otherwise install the system. Second, there is a product upgrade available for existing systems whereby the scope of security coverage can be increased by adding RFID readers and RFID transponders to an existing control panel. Third, homeowners may purchase the inventive system at a home improvement chain, self-install the system, and contract for alarm monitoring from an alarm services company. The overall system cost is lower, and the alarm services company is not required to underwrite initial installation costs, as is presently done today. Therefore, the alarm services company can offer monitoring services at substantially lower prices. Fourth, a new market for apartment dwellers opens up. Presently, very few security systems are installed in apartments because building owners are unwilling to permit the drilling of holes and installation of permanent systems. Apartment dwellers are also more transient than homeowners and therefore most apartment dwellers and alarm service companies are unwilling to underwrite the cost of these systems anyway. The inventive system is not permanent, nor is drilling holes for hardwiring required. Therefore, an apartment dweller can purchase the inventive security system, use it in one apartment, and then unplug and move the system to another apartment later.

The improvements provided by the present invention are accomplished through the following innovations. The first innovation is the design of a low-cost RFID reader that can be installed onto an outlet and cover an area the size of a large room in the example of a house. Rather than rely on the centrally located transceiver approach of existing unreliable wireless security systems, the present invention places the RFID reader into each major room for which coverage is desired. The RFID reader has a more limited range than the centrally located transceiver, and is therefore less susceptible to hacking by sophisticated intruders. For the example of smaller to medium sized houses, a single RFID reader may be able to cover more than one room. Furthermore, the presence of multiple RFID readers within a building provides spatial receiver diversity.

The second innovation is the design of a low-cost RFID reader that can be installed in conjunction with the control panels of existing security systems, in particular wired security systems that can make power available to the RFID reader in the same manner as control panels make power available to conventional motion detectors, glass breakage detectors, and other sensors.

The third innovation is the use of an RFID transponder to transmit data from covered openings and sensors. As is well known, there is at least an order of magnitude difference in the manufacturing costs of RFID transponders versus present wireless security system transmitters. This is due both to difference in design, as well as manufacturing volumes of the respective components used in the two different designs.

The fourth innovation is the provision of a circuitry in both the RFID reader and the RFID transponder for the charging of any battery included in the RFID transponder. For some installations, a battery may be used in the RFID transponder to increase the range and reliability of the RF link between reader and transponder. The present problem of short battery life in wireless security system transmitters is overcome by the transfer of power through radio waves. The RFID reader receives its power from a permanent power source such as standard AC outlets, and converts some of this power into RF energy, which can then be received by the RFID transponder and used for battery charging.

The fifth innovation is the status monitoring of the need for battery charging. The RFID transponder can indicate to the RFID reader when power for charging is required. If desired, the RFID reader can shut off its transmitter if no power transfer is required, thereby reducing RF emissions and any possible interference.

The sixth innovation is the use of multiple forms of communications, providing different levels of communications cost, security, and range. The lowest cost and most prevalent form of communications is expected to be active RF communications, operating under 47 CFR 15.247.

Thus an RFID reader can perform both RFID functions and RF communications using shared RF circuits and antennas. The system can also include the use of power line carrier communications, if desired, between the RFID readers and one or more other devices. Also, the RFID readers can be hardwired to a control panel or controller. Relative to hardwiring, a significant installation cost advantage is obtained by allowing the RFID readers to "piggyback" on the standard AC power lines already in the building. By using the RF communications or power line carrier connection technique, an example homeowner can simply plug in the controller to a desired outlet, plug in the RFID readers in an outlet in the desired covered rooms, and configure the system and the system is ready to begin monitoring RFID transponders.

The seventh innovation is the optional inclusion of a glass breakage or motion sensor into the RFID reader. In many applications, an RFID reader will likely be installed into each major room of a house, using the same example throughout this document. Rather than require a separate glass breakage or motion sensor as in conventional security systems, a form of the RFID reader includes a glass breakage or motion sensor within the same integrated package, providing a further reduction in overall system cost when compared to conventional systems.

The eighth innovation is the permitted use of multiple distributed controller functions in the security system. In the present invention, the controller function can be located within RFID readers, the keypad for the security system, or even the alarm panel of a conventional security system. Therefore, a homeowner or building owner installing multiple devices will also simultaneously be installing multiple controller functions. The controller functions operate in a redundant mode with each other. Therefore, if an intruder discovers and disables a single device containing a controller function, the intruder may still be detected by any of the remaining installed devices containing controller functions.

The ninth innovation is the permitted optional use of the traditional public switched telephone network (i.e., PSTN—the standard home phone line), the integrated use of a commercial mobile radio service (CMRS) such as a TDMA, GSM, or CDMA wireless network, or the use of a broadband Internet network via Ethernet or WiFi connection for causing an alert at an emergency response agency such as an alarm service company. In particular, the use of a CMRS network provides a higher level of security, and a further ease of installation. The higher level of security results from (i) reduced susceptibility of the security system to cuts in the wires of a PSTN connection, and (ii) optional use of messaging between the security system and an emergency response agency such that any break in the messaging will in itself cause an alert.

Additional objects and advantages of this invention will be apparent from the following detailed description.

BRIEF DESCRIPTION OF THE DRAWINGS

FIG. 2A shows three ways in which the RFID reader and gateway can communicate with each other.

FIG. 2B shows an example network architecture if the RFID readers and gateways use power line carrier communications.

FIG. 2C shows an example network architecture if the RFID readers and gateways use active RF communications.

FIGS. 19A and 19B show one way in which the controller or RFID reader may be mounted to a plate, and then mounted to an outlet.

FIGS. 20A and 20B show the locations on the RFID reader where patch or microstrip antennas may be mounted so as to provide directivity to the transmissions.

DETAILED DESCRIPTION OF THE INVENTION

The present invention is a highly reliable system and method for constructing a security system, or security network, for use in a building, such as a commercial building, single or multifamily residence, or apartment. For consistency with the cross-referenced applications, the term "security system" shall be used throughout, though in the context of this present application, the terms "security system" and "security network" shall be considered interchangeable as they apply to the present invention. The security system may also be used for buildings that are smaller structures such as sheds, boathouses, other storage facilities, and the like. Throughout this specification, a residential house will be used as an example when describing aspects of the present invention. However, the present invention is equally application to other types of buildings.

Figure 1:
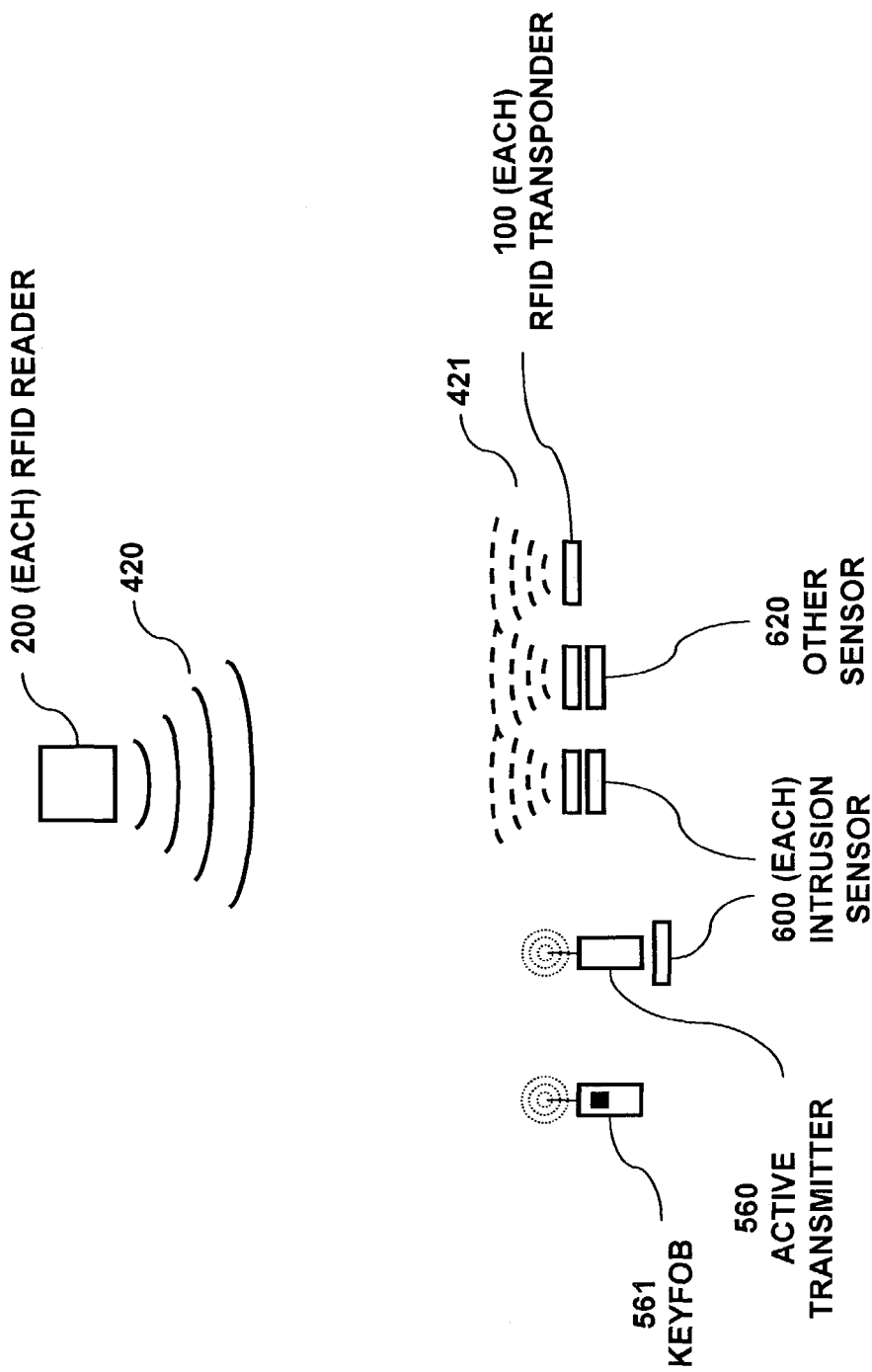
FIG. 1 shows the RFID reader communicating with RFID transponders and other transmitters.

There are 4 primary elements to the security system: an intrusion sensor 600, an RFID transponder 100, an RFID reader 200, and a controller function 250. FIG. 1 shows a very basic configuration of the security system with a single RFID reader 200 communicating with several RFID transponders 100, one of which has an associated intrusion sensor 600, one of which has any one of several other sensors 620, an a third which has no sensor. The controller function 250 is not shown in the diagram, but is present in the RFID reader 200.

Figure 8:
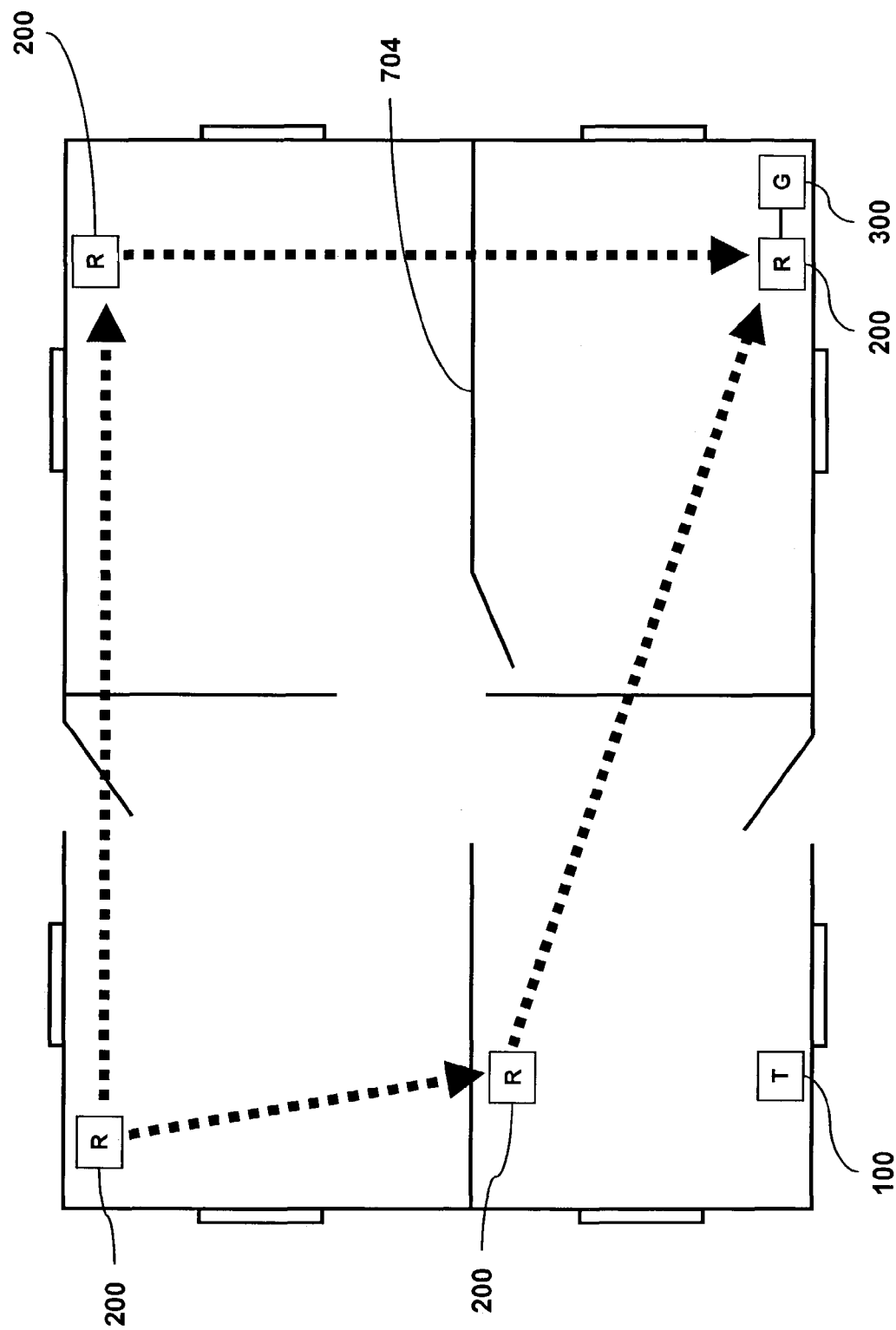
FIG. 8 shows an example layout of a house with multiple RFID readers, and the manner in which the RFID readers may form a network to use wireless communications to reach a gateway.

A security system with a single RFID reader 200 can be expanded to support multiple RFID readers 200. In addition, the system can communicate with external networks 410 using a device known as a gateway 300. FIGS. 2A, 2B, and 2C show the way in which multiple RFID readers 200 and gateways 300 communicate with each other in the security system. FIG. 2A shows three available connections: via active RF communications 422, via power line carrier communications 202 over the power lines 430, or via hardwire connection 431. FIG. 2B shows communications via power line carrier communications 202, where any of the devices can directly connect to any of the other devices. FIG. 2C shows a network in which active RF communications 422 is used; some of the devices can directly communicate with each other and some pairs of devices can only communicate through one or more intermediate devices. FIG. 8 shows an example of how the logical architecture of FIG. 2C might appear in a sample residence.

Figure 3:
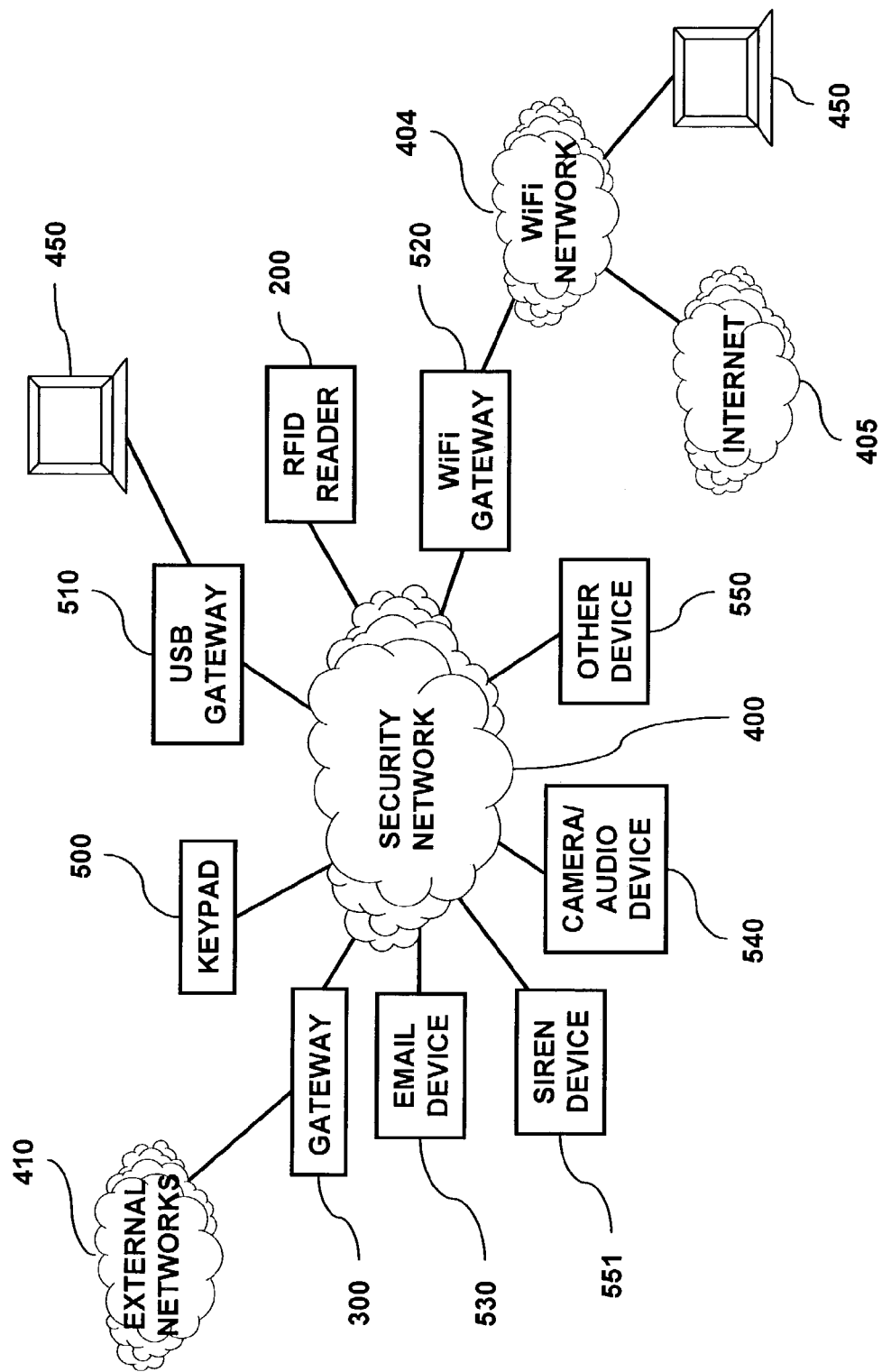
FIG. 3 shows a generalized network architecture of the security network.

Regardless of the form of communications chosen by any one designer or installer of this system, all of the devices, once installed, form a security network 400 with each other as shown in FIG. 3. That is, the physical connection is separated from the logical networking software and, regardless of physical connection, the devices of the security system become aware of and communicate with each other. FIG. 3 shows various examples of the types of devices that can be contained and can communicate within a security system. As can be further seen in FIG. 3, different example gateways 300, 510, and 520 show how the devices in the security system can also communicate to networks and devices external to the security system.

In addition to the primary elements of the security system, other devices 550 and functions can be added and integrated. In the context of this application, the term "other device 550" means generically any powered device generally following the architecture shown in FIG. 5A, and includes RFID readers 200, gateways 300, email devices 530, siren devices 530, camera/audio devices 540, as well as devices not specifically identified here but designed to operate in the inventive security system by connecting to the security network 400 and being capable of communicating over the security network 400 with example devices shown in FIG. 5A.

A keypad 500 may be added to provide a method for user interface. A gateway 300 can be provided to enable communications between the security system and external networks 410 such as, for example, a security monitoring company. The gateway 300 may also convert protocols between the security system and a WiFi network 401 or a USB port of a computer 450. A siren 551 may be added to provide loud noise-making capability. An email terminal 530 can be added to initiate and receive messages to/from external networks 410 and via a gateway 300. Other sensors 620 may be added to detect fire, smoke, heat, water, temperature, vibration, motion, as well as other measurable events or items. A camera and/or audio terminal 540 may be added to enable remote monitoring via a gateway 300. A keyfob 561 may be added to enable wireless function control of the security system. This list of devices that can be added is not intended to be exhaustive, and other types can also be created and added as well.

Figure 4:
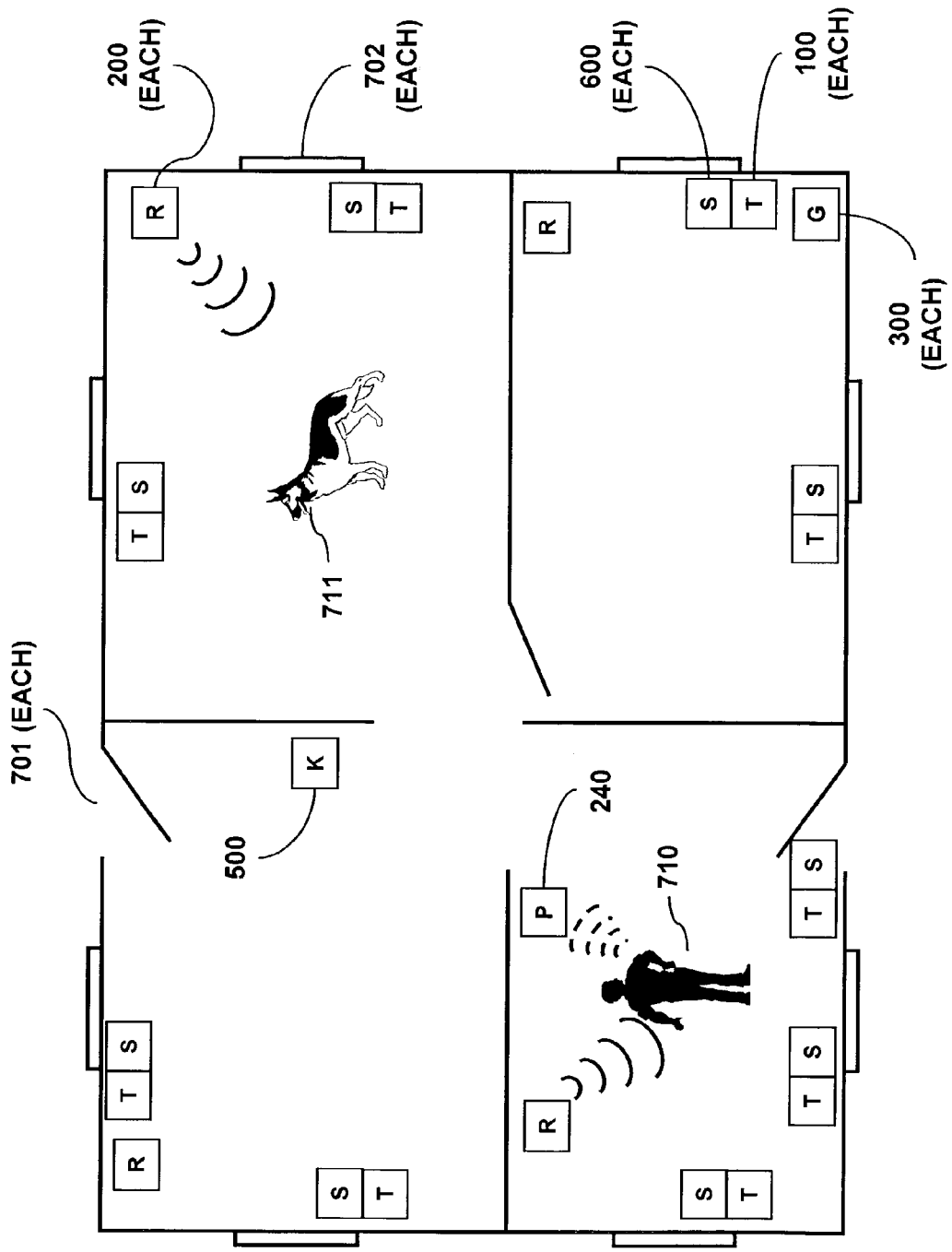
FIG. 4 shows the distributed manner in which the present invention would be installed into an example house.

The distributed nature of the security system is shown in the example layout in FIG. 4 for a small house. At each opening in the house, such as windows 702 and doors 701, for which monitoring is desired, an intrusion sensor 600 and RFID transponder 100 are mounted. In a pattern determined by the layout of the house or building into which the security system is to be installed, one or more RFID readers 200 are mounted. Each RFID reader 200 is in wireless communication with one or more RFID transponders 100. Each RFID reader 200 is also in communication with one or more other RFID readers 200, each of which may contain a controller function 250, wherein the form of the communication can vary depending upon the embodiments of the RFID readers 200. In general, each RFID reader 200 is responsible for the RFID transponders 100 in a predetermined read range of each RFID reader 200. As is well understood to those skilled in the art, the range of wireless communications is dependent, in part, upon many environmental factors in addition to the specific design parameters of the RFID readers 200 and RFID transponders 100.

According to U.S. Census Bureau statistics, the median size of one-family houses has ranged from 1,900 to 2,100 square feet (176 to 195 square meters) in the last ten years, with approximately two-thirds under 2,400 square feet (223 square meters). This implies typical rooms in the house of 13 to 20 square meters, with typical wall lengths in each room ranging from 3 to 6 meters. It is likely in many residential homes that most installed RFID readers 200 will be able to communicate with RFID transponders 100 in multiple rooms. Therefore, in many cases with this system it will be possible to either install fewer RFID readers 200 than major rooms in a building, or to follow the guideline of one RFID reader 200 per major room, creating a system with excellent spatial antenna diversity as well as redundancy in the event of single component failure.

The RFID reader 200 can be installed in various locations within a house or building. The choice of location is at the convenience of the installer or building occupant, and is typically chosen to provide good wireless propagation ability. In a residential house example, the RFID reader 200 can be installed in a room, a hallway, in the attic above a room, or in the basement/crawl space below a room. When installed in a room or a hallway, the RFID reader 200 may either be (i) mounted on a wall/ceiling and obtain its power remotely in a manner similar to conventional motion detectors, or (ii) mounted on or near an outlet and obtain its power locally from the aforesaid outlet. The choice of installation location will determine the physical shape and embodiment of the RFID reader 200, but the primary function will remain the same.

There are several elements that will typically be common to all devices that form part of the security system. One element, networking, has already been shown in FIGS. 2 and 3. In a typical installation, the most numerous powered device installed will be RFID readers 200. The RFID reader 200 is the central element in the security system, and it typically is capable of several basic and optional forms of communication. The first basic form is the backscatter modulation 420 technique, used to communicate with the RFID transponders 100. The second basic form is active RF communication 422, used to communicate with other powered devices within the security system such as other RFID readers 200, gateways, etc. In the context of this present application, both forms are wireless communications, but active RF communication 422 is differentiated from backscatter modulation 420 in that (i) backscatter modulation 420 relies on an RFID reader 200 to initiate a wireless communication and an RFID transponder 100 can only respond with a wireless communication 421 that is based upon or derived from the wireless transmission originated by the RFID reader 200, and (ii) active RF communication is that which independently originated from any powered device in the security system using its own generated carrier frequency independent of any other device. A first optional form of communication is power line carrier communication 202 that travels over standard power lines 430. A second optional form of communication is a hardwired connection 431. Each of these communications types will be discussed in more detail below.

A second common element is the controller function 250. Conventional alarm panels typically contain a single controller, and all other contacts, motion detectors, etc. are fairly dumb from an electronics and software perspective. For this reason, the alarm panel must be hidden in the house because, if the alarm panel were discovered and disabled, all of the intelligence of the system would be lost. The controller function 250 of the present invention is distributed through most, if not all, of the powered devices in the security system. The controller function 250 is a set of software logic that can reside in the processor and memory of a number of different devices within the security system, including within the RFID reader 200.

Figure 5A:
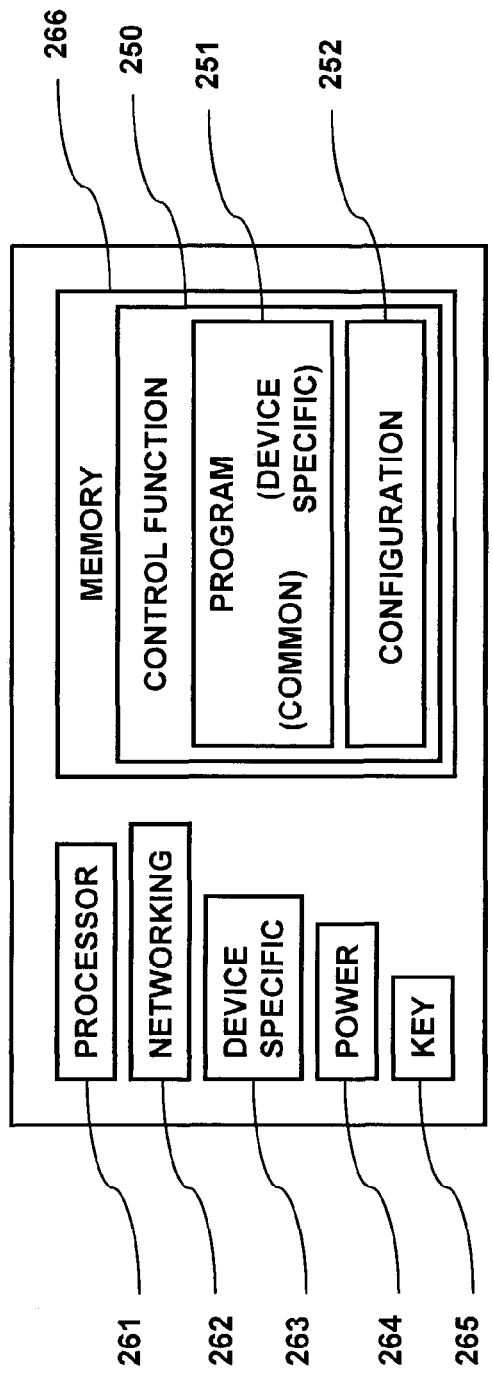
FIG. 5A shows a generalized architecture of a device in the security system containing a control function.

FIG. 5A shows a generalized architecture for any device used in the security system. Elements common to most devices will be power 264, a processor 261, memory 266 associated with the processor, and the chosen networking 262. If the memory 266 is of an appropriate type and size, the memory 266 can contain a controller function 250, consisting of both program code 251 and configuration data 252. The program code 251 will generally contain both controller function 250 code common to all devices as well as code specific to the device type. For example, an RFID reader 200 will have certain device-specific hardware 263 that requires matching code, and a gateway 300 may have different device-specific hardware 263 that requires different matching code.

When multiple devices are installed in a system, the controller functions 250 in the different devices become aware of each other, and share configuration data 252 and updated program code 251. The updated program code 251 can consist of either a later-released version of the program code 251, or can consist of device-specific code or parameters. For example, if a new type of device is developed and then installed into an existing system, the older devices in the system may require updated program code 251 or parameters in order to effectively manage the new device.

Figure 5B:
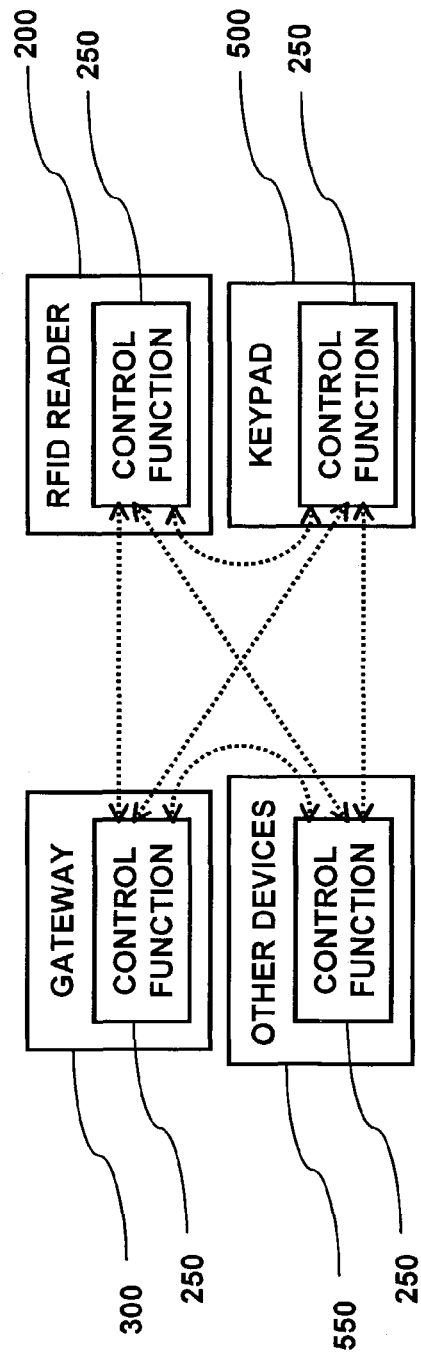
FIG. 5B shows the control functions in multiple devices logically connecting to each other.

Independent of the physical communications layer, each controller function 250 in each device can communicate with all other controller functions 250 in all other devices as shown in FIG. 5B. The purpose of replicating the controller function 250 on multiple devices is to provide a high level of redundancy throughout the entire security system, and to reduce or eliminate possible points of failure (whether component failure, power failure, or disablement by an intruder). The controller functions 250 implemented on each device perform substantially the same common functions; therefore, the chances of system disablement by an intruder are fairly low.

When there are multiple controller functions 250 installed in a single security system, the controller functions 250 arbitrate among themselves to determine which controller function 250 shall be the master controller for a given period of time. The preferred arbitration scheme consists of a periodic self-check test by each controller function 250, and the present master controller may remain the master controller as long as its own periodic self-check is okay and reported to the other controller functions 250 in the security system. If the present master controller fails its self-check test, or has simply failed for any reason or been disabled, and there is at least one other controller function 250 whose self-check is okay, the failing master controller will abdicate and the other controller function 250 whose self-check is okay will assume the master controller role. In the initial case or subsequent cases where multiple controller functions 250 (which will ideally be the usual case) are all okay after periodic self-check, then the controller functions 250 may elect a master controller from among themselves by each choosing a random number from a random number generator, and then selecting the controller function 250 with the lowest random number. There are other variations of arbitration schemes that are widely known, and any number are equally useful without deducting from the inventiveness of permitting multiple controller functions 250 in a single security system, as long as the result is that in a multi-controller function 250 system, no more than one controller function 250 is the master controller at any one time. In a multi-controller function 250 system, one controller function 250 is master controller and the remaining controller functions 250 are slave controllers, keeping a copy of all parameters, configurations, tables, and status but not duplicating the actions of the master controller.

In a system with multiple controller functions 250, the security system can receive updated program code 251 and selectively update the controller function 250 in just one of the devices. If the single device updates its program code 251 and operates successfully, then the program code 251 can be updated in other devices. If the first device cannot successfully update its program code 251 and operate, then the first device can revert to a copy of older program code 251 still stored in other devices. Because of the distributed nature of the controller functions 250, the security system of the present invention does not suffer the risks of conventional alarm panels which had only one controller.

The controller function 250 typically performs the following major logic activities, although the following list is not meant to be limiting:

configuration of the security system whereby each of the other components are identified, enrolled, and placed under control of the master controller, receipt and interpretation of daily operation commands executed by the homeowner or building occupants including commands whereby the system is placed, for example, into armed or monitoring mode or disarmed for normal building use, communications with other controller functions 250, if present, in the system including exchange of configuration information and daily operation commands as well as arbitration between the controller functions 250 as to which controller function 250 shall be the master controller, communications with various external networks 410 for purposes such as sending and receiving messages, picture and audio files, new or updated program code 251, commands and responses, and similar functions, communications with RFID readers 200 and other sensors 620 and devices 550, such as passive infrared sensors 570, in the security system including the sending of various commands and the receiving of various responses and requests, processing and interpreting data received from the RFID readers 200 including data regarding the receipt of various signals from the sensors and RFID transponders 100 within read range of each RFID reader 200, monitoring of each of the sensors, both directly and indirectly, to determine, for example, whether a likely intrusion has occurred, whether glass breakage has been detected, or whether motion has been detected by a microwave- and/or passive infrared-based device, deciding, based upon the configuration of the security system and the results of monitoring activity conducted by the controller function 250, whether to cause an alert or take another event-based action, causing an alert, if necessary, by some combination of audible indication such as via a siren device 551, or using a gateway 300 to dial through the public switched telephone network (PSTN) 403 to deliver a message to an emergency response agency 460, or sending a message through one or more commercial mobile radio service (CMRS) 402 operators to an emergency response agency 460.

Many homeowners desire monitoring of their security systems by an alarm services company. The inventive security system permits monitoring as well as access to various external networks 410 through a gateway device 300. There is actually not a single gateway 300, but rather a family of gateway devices 300, each of which permit access from the security network 400 to external devices and networks using different protocols and physical connections. Each gateway 300 is configured with appropriate hardware and software that match the external network 410 to which access is desired.

Figure 6:
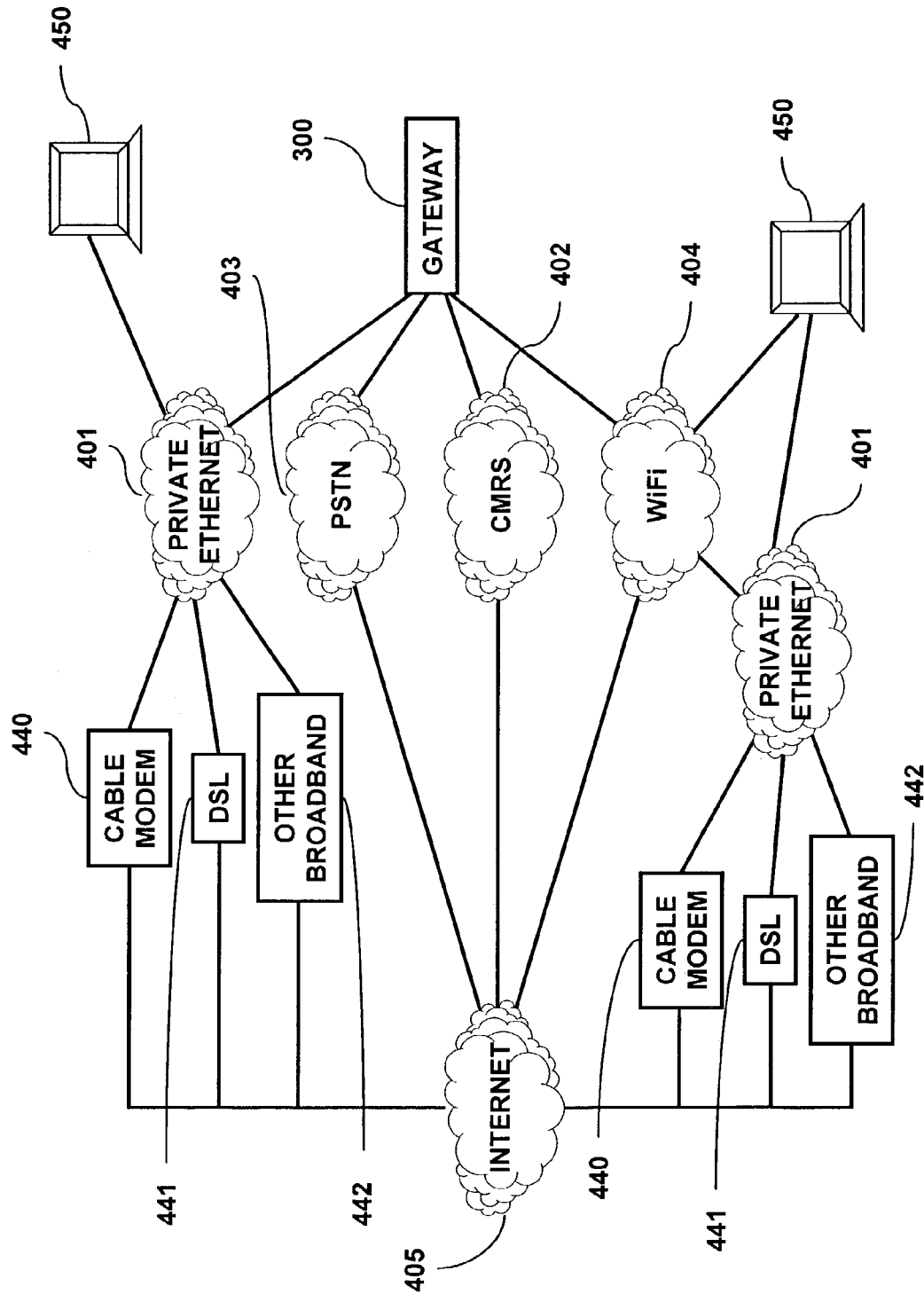
FIG. 6 shows multiple ways in which a gateway can be configured to reach different private and external networks.

As shown in FIG. 6, examples of external networks 410 to which access can be provided are private Ethernets 401, CMRS 402, PSTN 403, WiFi 404, and the Internet 405. This list of external networks 400 is not meant to be limiting, and appropriate hardware and software can be provided to enable the gateway 300 to access other network formats and protocols as well. Private Ethernets 401 are those which might exist only within a building or residence, servicing local computer terminals 450. If the gateway 300 is connected to a private Ethernet 401, access to the Internet 405 can then be provided through a cable modem 440, DSL 441, or other type of broadband network 442. There are too many suppliers to enumerate here.

Figure 10:
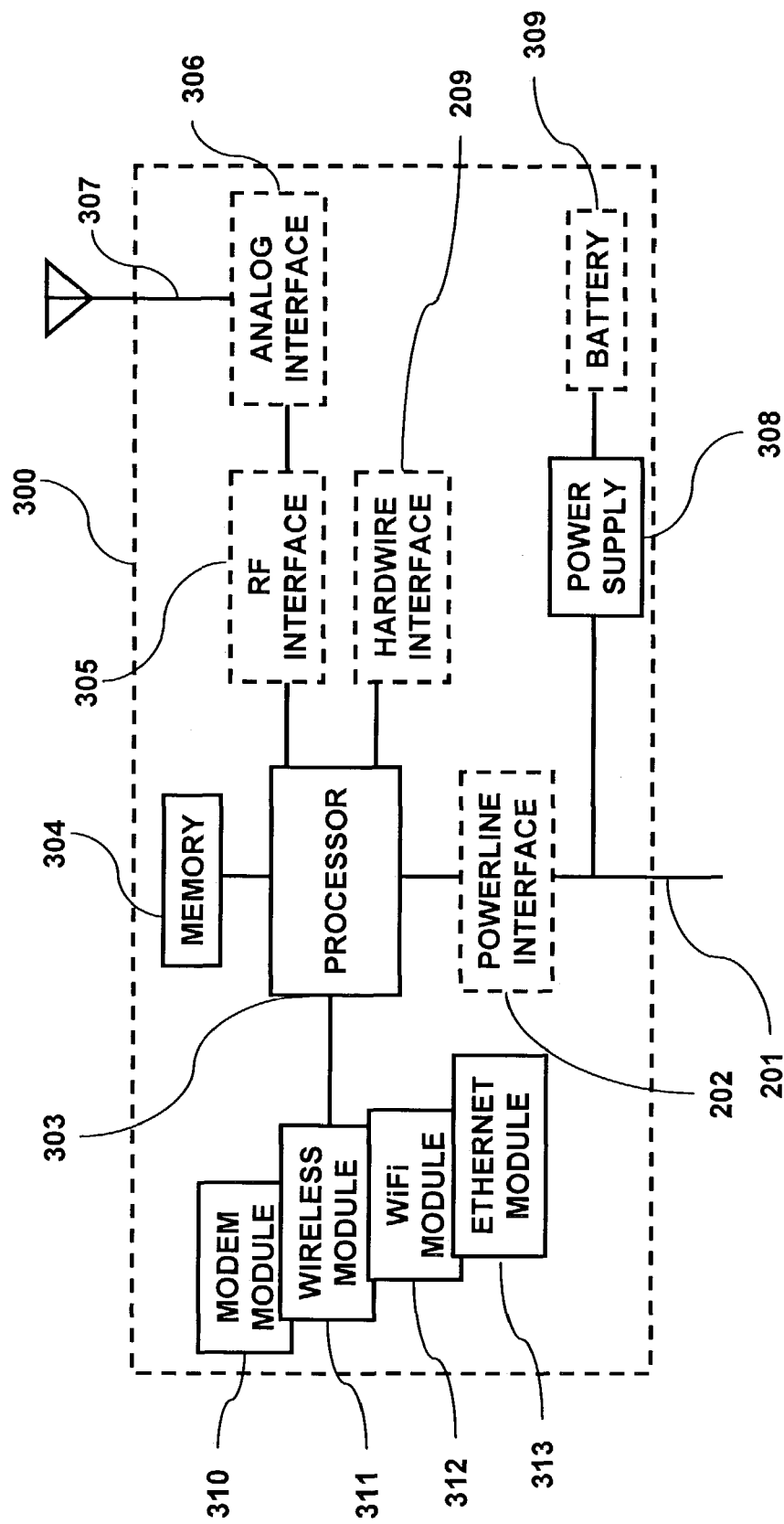
FIG. 10 shows an architecture of the gateway.
Figure 23B:
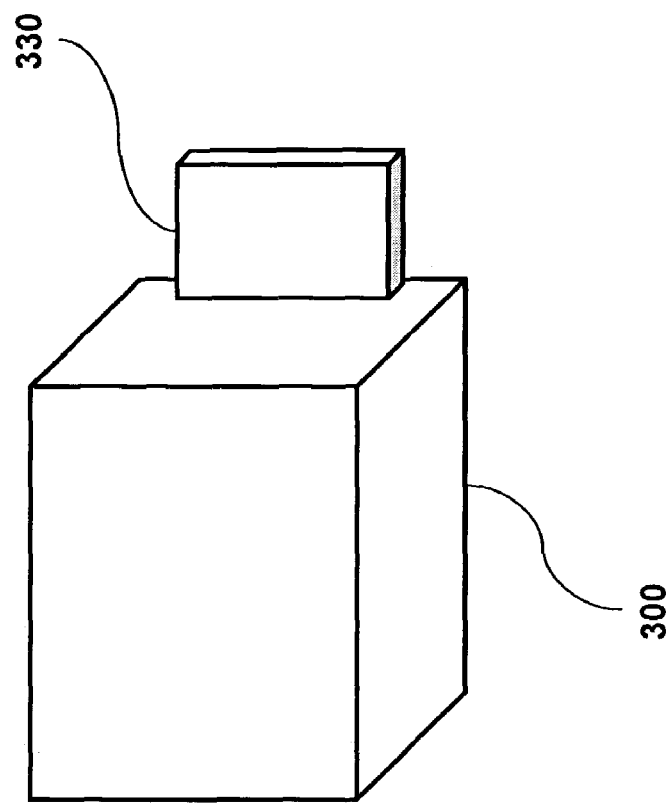
FIG. 23B shows an example embodiment of a gateway.

A block diagram of the gateway 300 is shown in FIG. 10; it can be seen that the specific architecture of the gateway 300 follows the generic device architecture previously shown in FIG. 5A. The major logic functions, including a controller function 250, are implemented in the firmware or software executed by the microprocessor 303 of the gateway 300. The microprocessor 303 contains non-volatile memory 304 for storing the controller function 250 firmware or software as well as the configuration of the system. The gateway 300 typically has its own power supply 308 and can also contain a backup battery 309, if desired, for use in case of loss of normal power. The gateway 300 will typically store the controller function 250 configuration information in the form of one or more tables in non-volatile memory 304. The table entries enable the gateway 300 to store the identity of each RFID reader 200 and other devices, along with the capabilities of each RFID reader 200 and other devices, the identity of each RFID transponder 100, along with the type of RFID transponder 100 and any associated intrusion sensors 600, and the association of various sensors in the system. For example, as discussed later, it is advantageous for the controller function 250 to associate particular passive infrared sensors 570 with particular RFID readers 200 containing a microwave Doppler motion function. With respect to each RFID transponder 100, the table entries may further contain radio frequency, power level, and modulation technique data. These table entries can enable the controller function 250 to command an RFID reader 200 to use a particular combination of radio frequency, modulation technique, antenna, and power level for a particular RFID transponder 100, wherein the combination used can vary when communicating with each separate RFID reader 200, RFID transponder 100, or other device 551. Furthermore, the tables may contain state information, such as the reported status of any battery 111 included with an RFID transponder 100. One embodiment of the gateway 300 can take the form shown in FIG. 23B.

The security system permits the installation of multiple gateways 300 in a single security network 400, each of which can interface to the same or different external networks 410. For example, a second gateway 300 can serve to function as an alternate or backup gateway 300 for cases in which the first gateway 300 fails, such as component failure, disablement or destruction by an intruder, or loss of power at the outlet where the first gateway 300 is plugged in.

The gateway 300 will typically communicate with the RFID readers 200 using any of active RF communications 422 through an RF interface 305, analog interface 306, and antenna 307, a power line carrier protocol 202, or hardwire interface 209. There are tradeoffs to consider with each form of communication. Active RF communications 422 will require that the gateway 300 be within RF propagation range of other devices, such as RFID readers 200. In a typical 2,100 square foot house, this will generally not be a problem, especially given the allowed power limits (as discussed below). Power line carrier protocols 202 can extend the range of communications, but are susceptible to interference on the power line 430 and interruption if the breaker for that power circuit "trips". Hardwire communications 209 is the most reliable because it is dedicated; however, it entails the cost of installing dedicated wires 431.

In general, the homeowner or building owner receives maximum benefit of this inventive security system by avoiding the installation of additional wires. Since active RF communications 422 will be discussed elsewhere, power line communications 202 will be discussed here. Power line carrier 202 protocols allow the sending of data between devices using the existing power lines 430 in a building. One of the first protocols for doing this is known as the X-10 protocol. However, there are now a number of far more robust protocols in existence. One such protocol is known as CEBus (for Consumer Electronics Bus), which was standardized as EIA600. There are a growing number of other developers of power line carrier 202 protocols such as Easyplug/Inari, Itran Communications, nSine, and Intellon. For the inventive security system, the primary driver for deciding upon a particular power line carrier protocol is the availability of chipsets, reference designs, and related components at high manufacturing volumes and at low manufacturing cost. Furthermore, compatibility with other products in the home automation field would be an additional advantage. If power line carrier communications 202 were desired by a homeowner or building owner, the preferred choice would be the standard HomePlug, embodied in the Intellon chipset. HomePlug offers sufficient data speeds over standard power lines 430 at a reported distance of up to 300 meters. That standard operates using frequencies between 4.3 and 20.9 MHz, and includes security and encryption protocols to prevent eavesdropping over the power lines 430 from adjacent houses or buildings. However, the specific choice of which protocol to use is at the designer's discretion, and does not subtract from the inventiveness of this system.

For various reasons, it is also possible that a particular building owner will not desire to use power line carrier communications 202. For example, the occupants of some buildings may be required to meet certain levels of commercial or military security that preclude permitting signals on power lines 430 that might leak outside of the building. Therefore, a form of the gateway 300 may also be configured to use hardwired connections 431 through a hardwire interface 209 to one or more RFID readers 200.

Figure 7:
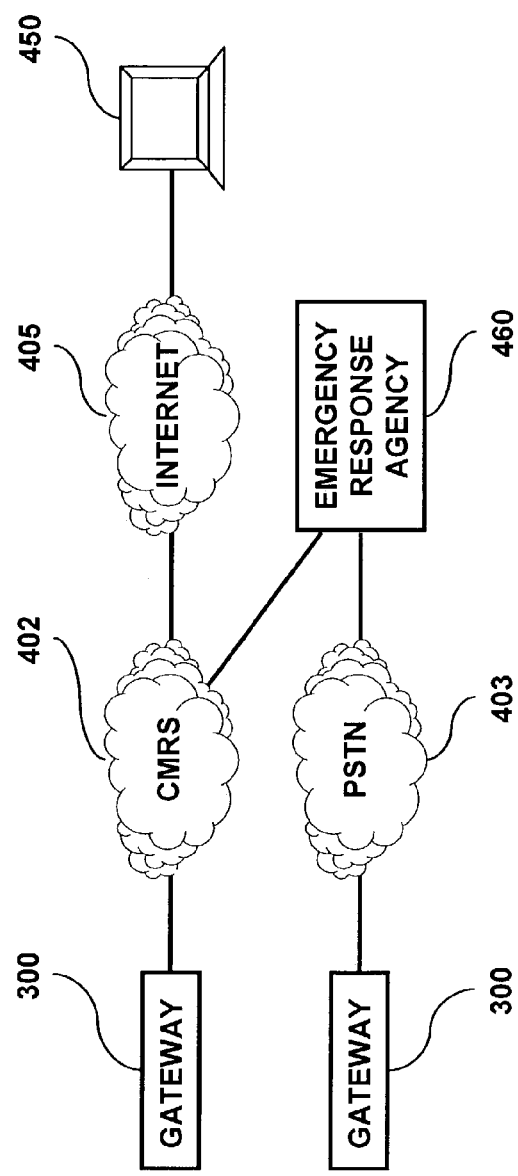
FIG. 7 shows some of the multiple ways in which a gateway can be configured to reach emergency response agencies and other terminals.

Homeowners and building owners generally desire one or two types of alerts in the event that an intrusion is detected. First, an audible alert may be desired whereby a loud siren 551 is activated both to frighten the intruder and to call attention to the building so that any passers-by may take notice of the intruder or any evidence of the intrusion. However, there are also scenarios in which the building owner prefers the so-called silent alert whereby no audible alert is made so as to lull the intruder into believing he has not been discovered and therefore may still be there when law enforcement personnel arrive. The second type of alert involves messaging an emergency response agency 460, indicating the detection of an intrusion and the identity of the building, as shown in FIG. 7. The emergency response agency 460 may be public or private, depending upon the local customs, and so, for example, may be an alarm services company or the city police department.

The gateway 300 of the inventive system supports the second type of foregoing alert by including a slot capable of receiving optional modules 310, 311, 312, or 313 which provide, respectively, a modem module 310, wireless module 311, WiFi module 312, or Ethernet module 313. These modules 310 to 313 are preferably in the form of an industry standard PCMCIA or compact flash (CF) module 330, thereby allowing the selection of any of a growing variety of modules made by various vendors manufactured to these standards. The modem module 310 is used for connection to a public switched telephone network (PSTN) 403; the wireless module 311 is used for connection to a commercial mobile radio service (CMRS) network 402 such as any of the widely available CDMA, TDMA, or GSM-based 2 G, 2.5 G, or 3 G wireless networks. The WiFi module 312 is used for connection to private or public WiFi networks 404; the Ethernet module 313 is use for connection to private or public Ethernets 401.

Certain building owners will prefer the high security level offered by sending an alert message through a CMRS 402 network or WiFi network 404. The use of a CMRS network 402 or WiFi network 404 by the gateway 300 overcomes a potential point of failure that occurs if the intruder were to cut the telephone wires prior to attempting an intrusion. If the building owner has installed at least two gateways 300 in the system, one gateway 300 may have a wireless module 311 installed and a second may have a modem module 310 installed. This provides the inventive security system with two separate communication paths for sending alerts to the emergency response agency 460 as shown in FIG. 7. By placing different gateways 300 in very different location in the building, the building owner significantly decreases the likelihood that an intruder can discover and defeat the security system.

The controller function 250, in particular when contained in a gateway 300 with a wireless module 311 or WiFi module 312, offers an even higher level of security that is particularly attractive to marketing the inventive security system to apartment dwellers. Historically, security systems of any type have not been sold and installed into apartments for several reasons. Apartment dwellers are more transient than homeowners, making it difficult for the dweller or an alarm services company to recoup an investment in installing a system. Of larger issue, though, is the small size of apartments relative to houses. The smaller size makes it difficult to effectively hide the alarm panel of conventional security systems, making it vulnerable to discovery and then disconnection or destruction during the pre-alert period. The pre-alert period of any security system is the time allowed by the alarm panel for the normal homeowner to enter the home and disarm the system by entering an appropriate code or password into a keypad. This pre-alert time is often set to 30 seconds to allow for the fumbling of keys, the carrying of groceries, the removal of gloves, etc. In an apartment scenario, 30 seconds is a relatively long time in which an intruder can search the apartment seeking the alarm panel and then preventing alert. Therefore, security systems have not been considered a viable option for most apartments. Yet, at least 35% of the households in the U.S. live in apartments and their security needs are not less important than those of homeowners.

The inventive security system includes an additional remote monitoring function in the controller function 250, which can be selectively enabled at the discretion of the system user, typically for use with the wireless module 311 or WiFi module 312, but also available for use with the Ethernet module 313. Beginning in 2001, most CMRS 402 networks based upon CDMA, TDMA, or GSM have supported a feature known as two-way Short Messaging Service (SMS). Available under many brand names, SMS is a connectionless service that enables the sending of short text messages between a combination of wireless and/or wired entities. Public WiFi networks 404 and Ethernet networks, of course, have a similar messaging capability. The controller function 250 includes a capability whereby the controller function 250 can send a message, via the wireless module 311 or WiFi module 312 and using the SMS feature of CMRS 402 networks or messaging feature of WiFi networks 404, to a designated remote processor at an alarm services company, or other designated location, at the time that a pre-alert period begins and again at the time that the security system has been disabled by the normal user, such as the apartment dweller, by entering the normal disarm code. Furthermore, the controller function 250 can send a different message, via the wireless module 311 or WiFi module 312 and using the SMS feature of CMRS networks 402 or messaging feature of WiFi networks 404, to the same designated processor if the normal user enters an abnormal disarm code that signals distress, such as when, for example, an intruder has forced entry by following the apartment dweller home and using a weapon to force the apartment dweller to enter her apartment with the intruder and disarm the security system.

Figure 13:
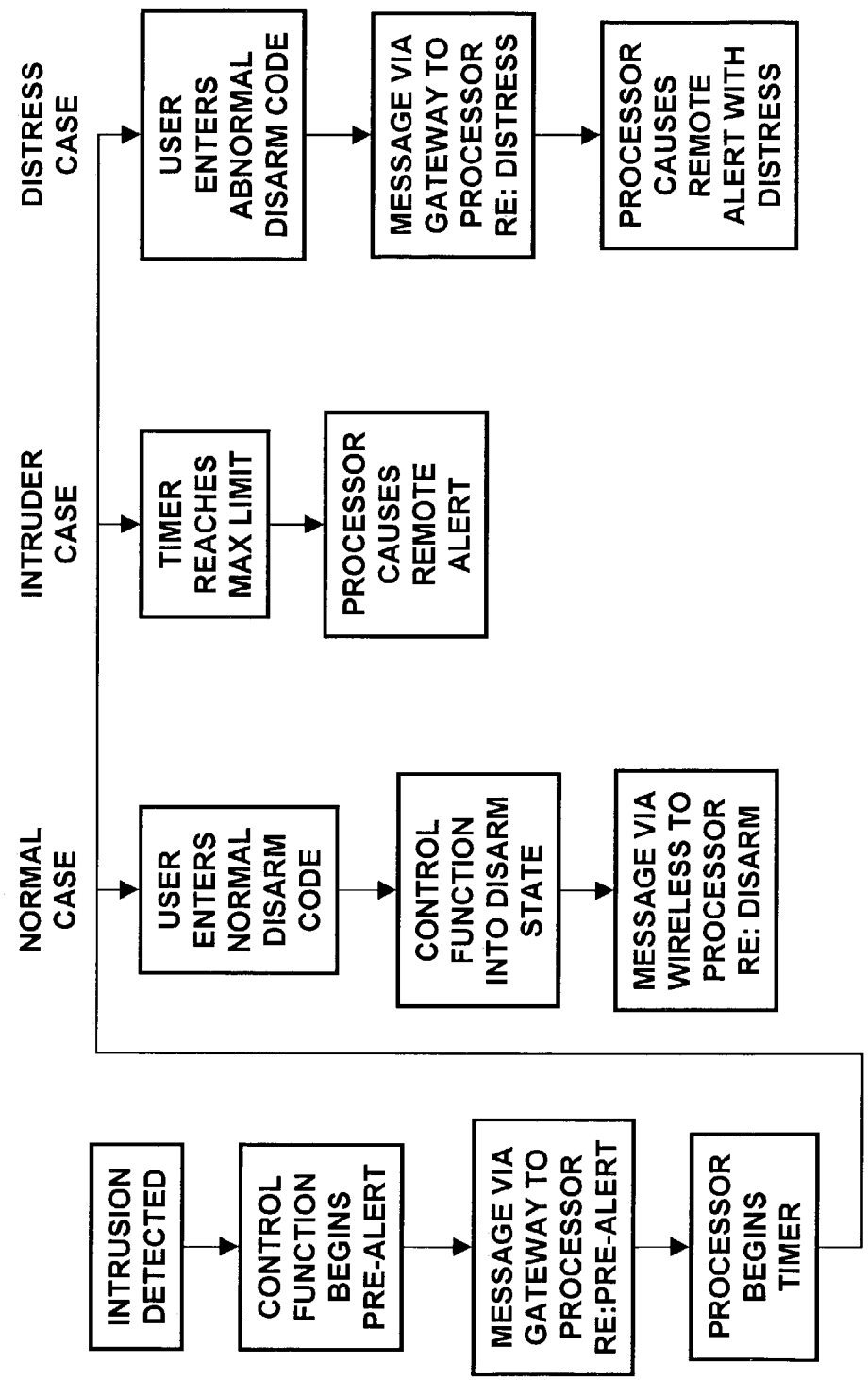
FIG. 13 is a flow chart for a method of providing a remote monitoring function.

In logic flow format, the remote monitoring function operates as shown in FIG. 13 and described in more detail below, assuming that the function has been enabled by the user:

An intrusion is detected in the building, such as the apartment, the controller function 250 begins a pre-alert period, the controller function 250 sends a message via the wireless module 311 or WiFi module 312 to a designated remote processor that may be remotely monitoring security systems, whereby the message indicates the identity of the security system and the transition to pre-alert state, the designated remote processor begins a timer (for example 30 seconds or any reasonable period allowing for an adequate pre-alert time), if the person causing the intrusion is a normal user under normal circumstances, the normal user will enter the normal disarm code, the controller function 250 ends the pre-alert period, and enters a disarmed state, the controller function 250 sends a message via the wireless module 311 or WiFi module 312 to the designated remote processor, whereby the message indicates the identity of the security system and the transition to disarm state, if the person causing the intrusion is an intruder who does not know the disarm code and/or disables and/or destroys the device containing the controller function 250 of the security system, the timer at the designated remote processor reaches the maximum time limit (30 seconds in this example) without receiving a message from the controller function 250 indicating the transition to disarm state, the designated remote processor may remotely cause an alert indicating that a probable intrusion has taken place at the location associated with the identity of the security system, if the person causing the intrusion is an authorized user under distressed circumstances (i.e., gun to back), the authorized user will enter an abnormal disarm code indicating distress, the controller function 250 sends a message via the wireless module 311 or WiFi module 312 to the designated remote processor, whereby the message indicates the identity of the security system and the entering of an abnormal disarm code indicating distress, the designated remote processor may remotely cause an alert indicating that an intrusion has taken place at the location associated with the identity of the security system and that the authorized user is present at the location and under distress.

As can be readily seen, this inventive remote monitoring function now enables the installation of this inventive security system into apartments without the historical risk that the system can be rendered useless by the discovery and disablement or destruction by the intruder. With this function enabled, even if the intruder were to disable or destroy the system, a remote alert could still be signaled because a message indicating a transition to disarm state would not be sent, and a timer would automatically conclude remotely at the designated processor. This function is obviously not limited to just apartments and could be used for any building.

With the wireless module 311, WiFi module 312, or Ethernet module 313 installed, a gateway 300 can also be configured to send either an SMS-based message through the CMRS 402 or an email message through a WiFi network 404 or Ethernet network 401 to the Internet 405 and to any email address based upon selected user events. For example, an individual away from home during the day may want a message sent to his pager, wireless phone, or office email on computer 450 if the inventive security system is disarmed at any point during the day when no one is supposed to be at home. Alternately, a parent may want a message sent when a child has returned home from school and disarmed the security system. Perhaps a homeowner has provided a temporary disarm code to a service company scheduled to work in the home, and the homeowner wants to receive a message when the work personnel have arrived and entered the home. By assigning different codes to different family members and/or work personnel, the owner of the security system can discriminate among the persons authorized to disarm the system. Any message sent, as described herein, can contain an indication identifying the code and/or the person that entered the disarm code. The disarm code itself is not sent for the obvious security reasons, just an identifier associated with the code.

With the modem module 310, wireless module 311, WiFi module 312, or Ethernet module 313 installed, the gateway 300 can send or receive updated software, parameters, configuration, or remote commands, as well as distribute these updated software, parameters, configuration, or remote commands to other controller functions 250 embedded in other devices such as RFID readers 200. For example, once the security system has been configured, a copy of the configuration, including all of the table entries, can be sent to a remote processor for both backup and as an aid to responding to any reported emergency. If, for any reason, all of the controller functions 250 within the security system ever experienced a catastrophic failure whereby its configuration were ever lost, the copy of the configuration stored at the remote processor could be downloaded to a restarted or replacement controller function 250.

Certain parameters, such as those used in glass breakage detection, can be downloaded to the controller function 250 and then propagated, in this example, to the appropriate glass breakage detection functions that may be contained within the system. Therefore, for example, if a homeowner were experiencing an unusual number of false alarm indications from a glass breakage detection function, remote technical personnel could remotely make adjustments in certain parameters and then download these new parameters to the controller function 250. Additionally, the operating parameters for new devices can also be downloaded to the controller function 250. For example, if a homeowner added a new device to the security system several years after initial installation, the parameters for this new type of device might not exist in the controller function 250. The security system could obtain the parameters associated with the new device from a site designated by the manufacturer.

The controller function 250 can also report periodic status and/or operating problems detected by the system to the emergency response agency 460 or to the manufacturer of the system. One example of the usefulness of this function is that reports of usage statistics, status, and/or problems can be generated by an emergency response agency 460 and a copy can be provided to the customer as part of his monthly bill. Furthermore, the usage statistics of similarly situated customers can be compared and analyzed for any useful patterns.

The RFID reader 200 is typically designed to be inexpensively manufactured since, in each installed security system, there may be approximately one RFID reader 200 for each major room to be monitored. From a physical form factor perspective, the RFID reader 200 of the present invention can be made in several embodiments, where the form of the embodiment is partially dependent upon whether the RFID reader 200 is being used with existing security systems or whether the RFID reader 200 is being used in a new self-install system. Embodiments particularly useful in self-installed security systems, wherein the RFID reader 200, or other devices 550 such as for example gateways 300, obtains its power from a nearby standard AC power outlet 720 shall hereinafter be termed "self-install embodiments." In this embodiment, shown in FIG. 17, the packaging of the RFID reader 200, or other devices 550 such as for example gateways 300, may have the plug integrated into the package such that the RFID reader 200 or other device 550 is plugged into a standard outlet 720 without any associated extension cords, power strips, or the like.

Figure 14:
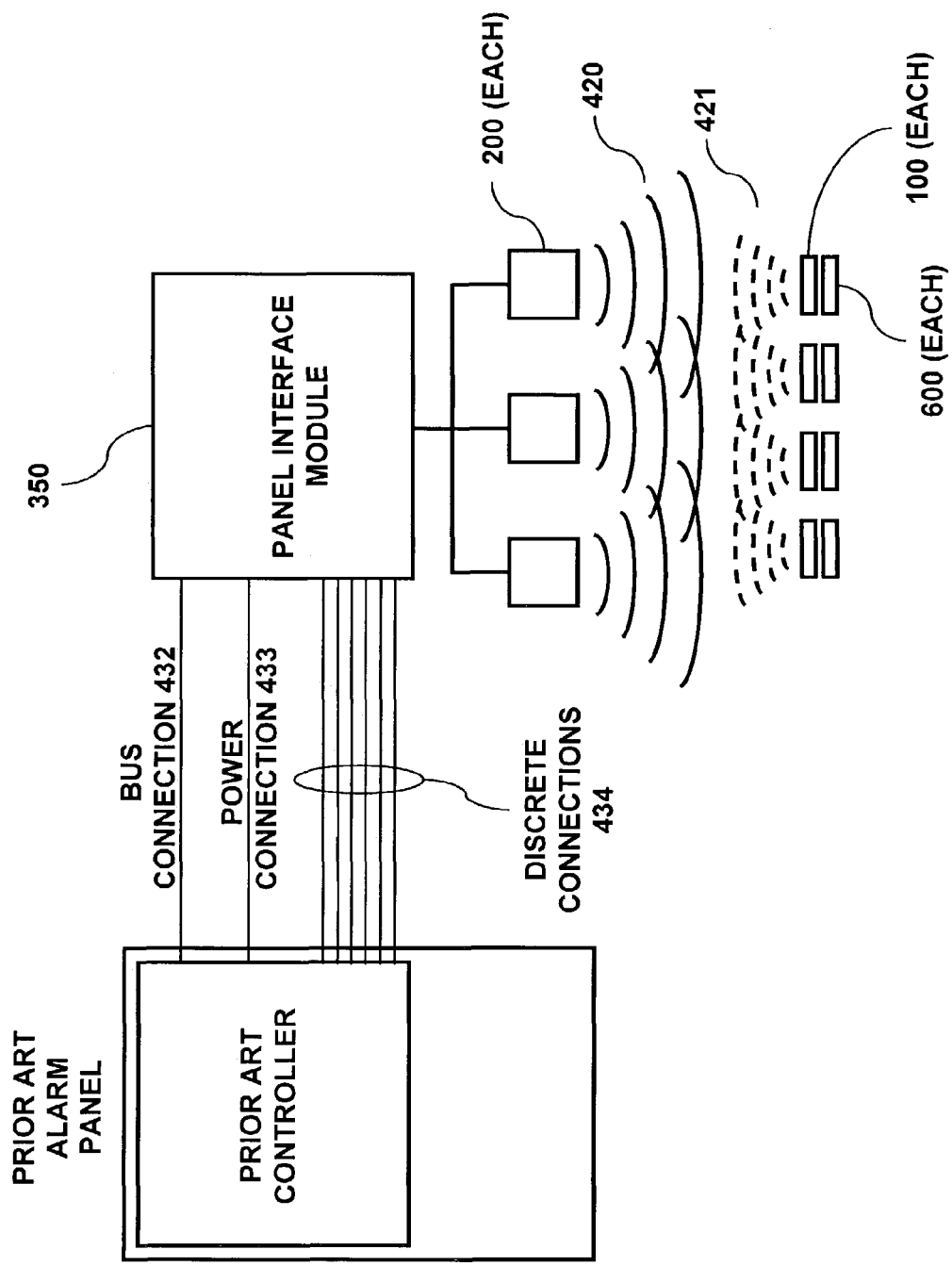
FIG. 14 shows the manner in which an RFID reader can be connected to a controller that is designed to interface with a conventional alarm panel.
Figure 15:
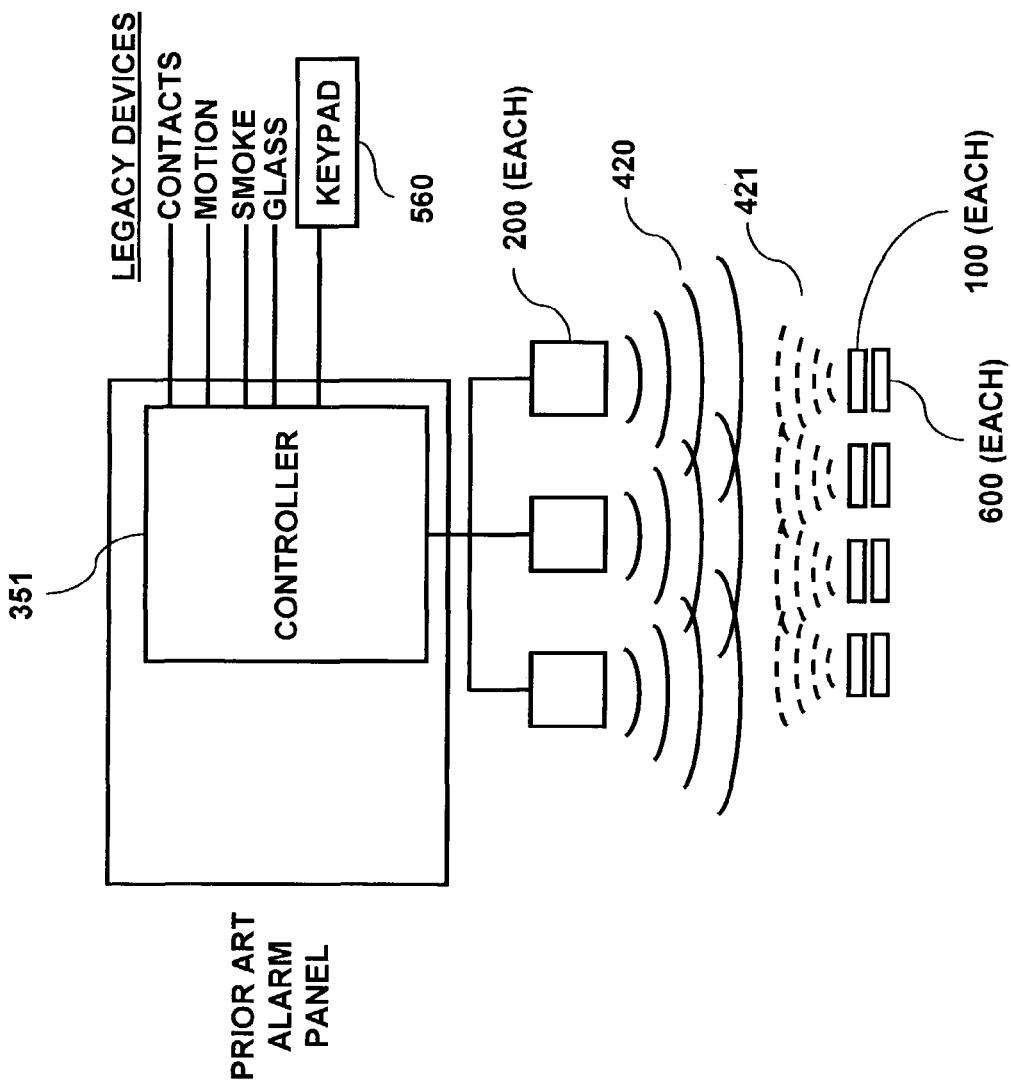
FIG. 15 shows the manner in which an RFID reader can be connected to a controller that is part of a conventional alarm panel.

Second embodiments particularly useful with existing security systems, wherein the RFID reader 200 receives power directly or indirectly via its connection to the power supply of an alarm panel such as those of conventional security systems, shall hereinafter be termed "existing embodiments." In this embodiment, the received power will typically be 12 VDC, which is also commonly available to conventional motion detectors and other sensors. FIGS. 14 and 15 show the RFID reader 200 as it can be connected, typically via hardwire, to controllers associated with conventional alarm panels. Existing embodiments of the RFID reader 200 will generally not include a controller function 250. Rather, the controller function 250 may be implemented using a dedicated processor on a panel interface module 350 as shown in FIG. 14 or it may be incorporated into the processor of a controller 351 associated with the alarm panel of conventional security systems. In existing embodiments, the panel interface module 350 and associated RFID readers 200 derive their power from the power supply and/or lead acid battery of the conventional alarm panel.

From a mechanical standpoint, the self-install embodiment of the RFID reader 200, as well as other self-install devices 550 for use in the inventive security system, such as gateways 300, sirens 551, and other devices 550, is provided with threaded screw holes on the rear of the packaging, as shown in FIG. 19A. If desired by the user installing the system of the present invention, holes can be drilled into a plate 722, which may be an existing outlet cover (for example, if the user has stylized outlet covers that he wishes to preserve) whereby the holes are of the size and location that match the holes on the rear of the packaging for the RFID reader 200 or the gateway 300, for example. Alternately, the user can employ a plate in the shape of an extended outlet cover 721 shown in FIG. 19B which provides additional mechanical support through the use of additional screw attachment points. Then, as shown in FIGS. 19A and 19B, the plate 722 or 721 can be first attached to the rear of the RFID reader 200 or other device packaging, using the screws 724 shown, and if necessary, spacers or washers. The RFID reader 200 or other example devices 550 can be plugged into the outlet 720, whereby the plate 722 or 721 is in alignment with the sockets of the outlet 720. Finally, an attachment screw 723 can be used to attach the plate 722 or 721 to the socket assembly of the outlet 720. This combination of screws provides positive mechanical attachment whereby neither the RFID reader 200 nor other example devices can accidentally be jostled or bumped out of the outlet 720. Furthermore, the presence of the attachment screw 723 will slow down any attempt to rapidly unplug the RFID reader 200 or other example devices 550. Existing embodiments of the RFID reader 200 are not mounted to outlets 720, but rather are mounted in similar fashion to conventional motion detectors.

Figure 9:
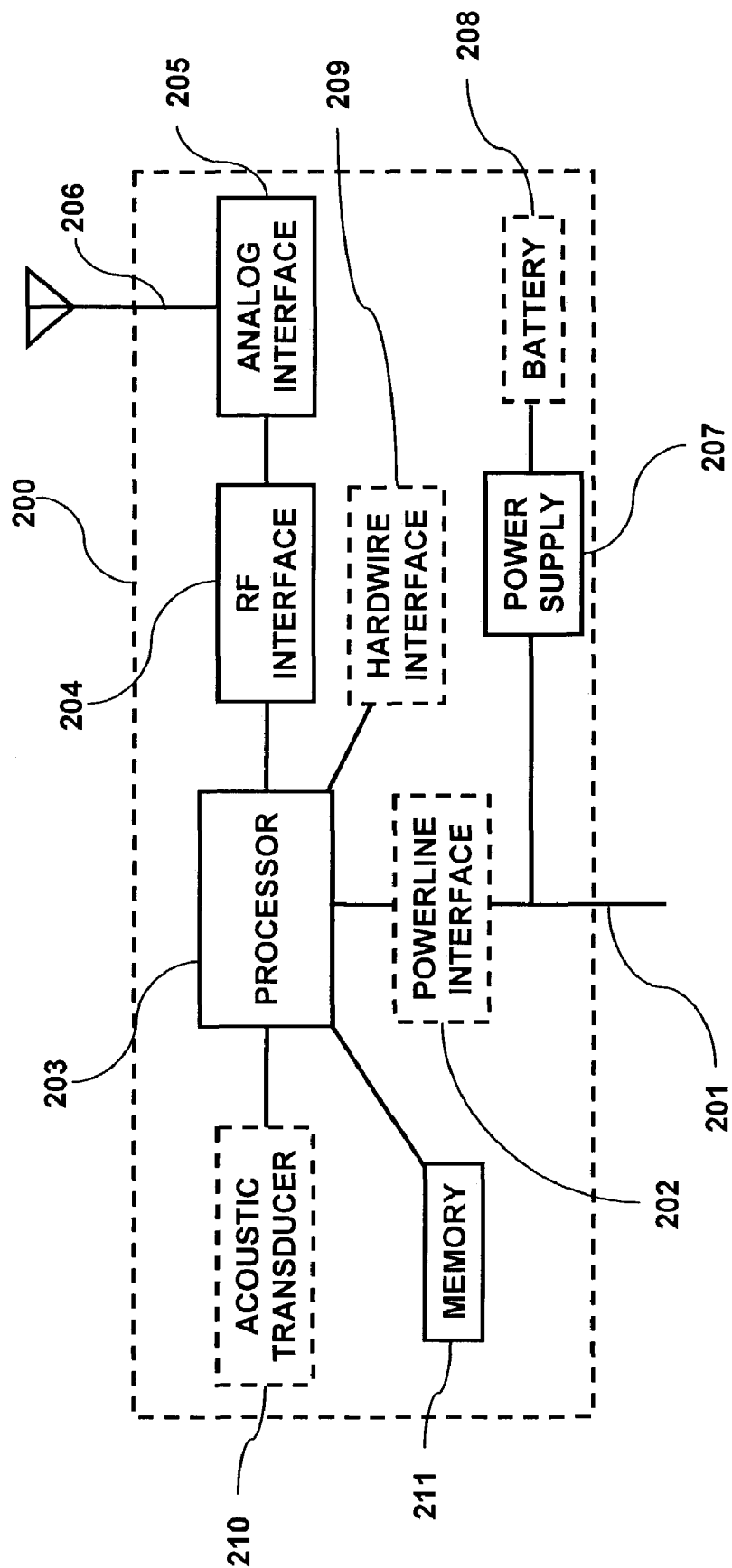
FIG. 9 shows an architecture of the RF reader.

FIG. 9 shows a block diagram of the RFID reader 200. Blocks shown in solid lines are typically included in each embodiment of an RFID reader 200. Blocks shown in dashed lines may or may not be included in a particular embodiment, depending upon the integration wishes of the designer. Generally, the RFID reader 200 will include at a minimum a microprocessor 203 controlling transmission and receive functions through an RF interface 204 chipset, an analog interface 205, and antenna 206. The microprocessor 203, RF interface 204, and analog interface 205 may be incorporated as a single chipset or discretely separated. While FIG. 9 shows only a single antenna 206 for simplicity, as will be discussed later it may be advantageous for the RFID reader 200 to contain more than one antenna 206 to provide increased directivity. When more than one antenna 206 is present, the analog circuits 205 will typically enable the switching of the RF interface 204 between the multiple antenna elements 206.

If the RFID reader 200 is being used with an alarm panel of a conventional security system, typically described as a retrofit application, then this existing embodiment of the RFID reader 200 may only support limited functions such as only backscatter modulation if the RFID reader 200 will only be in wireless communications with RFID transponders 100 and not with any other devices 550. In this case, the processor 203 and memory 204 may not be present if the controller functions 250 are incorporated into the panel interface module 350 or controller 351 of a conventional alarm panel. For similar reasons, the existing embodiment of the RFID reader 200 may not have a power supply 207 since power can be derived directly or indirectly from the conventional alarm panel.

Figure 17:
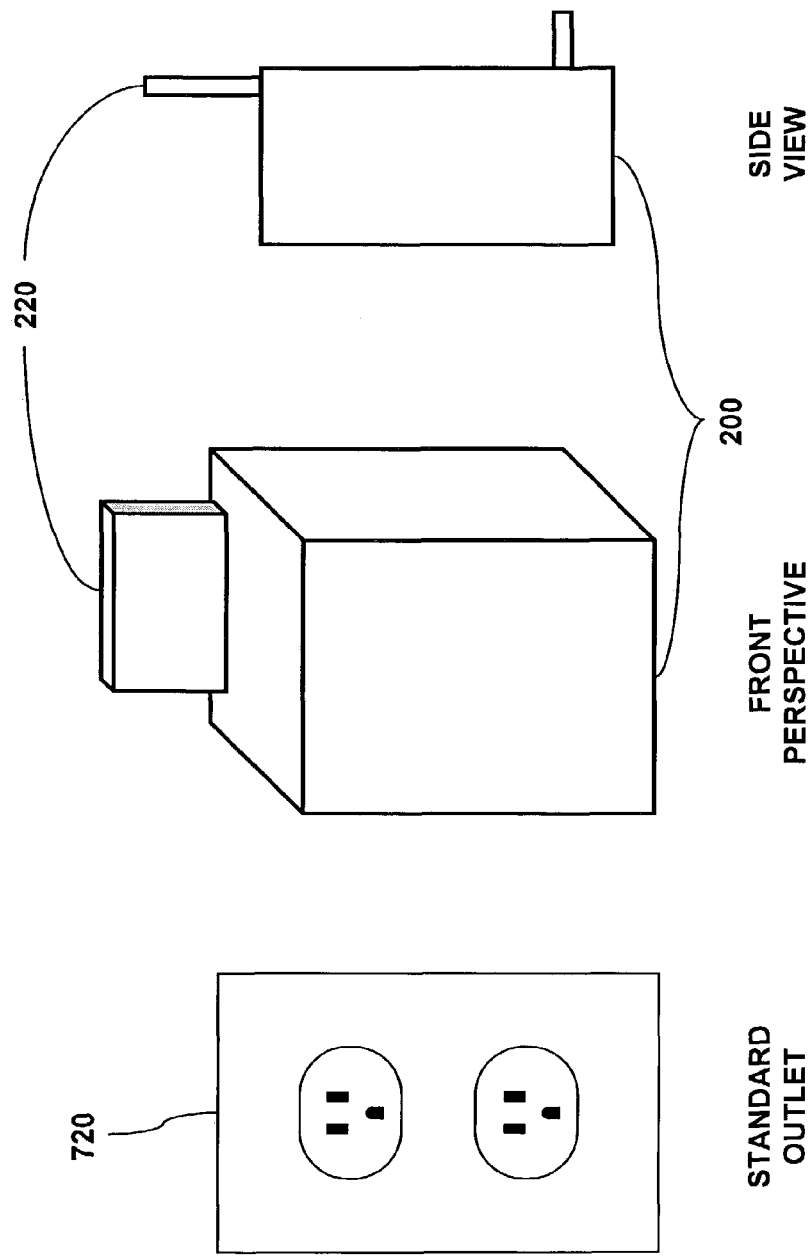
FIG. 17 shows an example embodiment of an RF reader without an acoustic transducer, and in approximate proportion to a standard power outlet.

If the configuration of the RFID reader 200 includes only a single antenna, it can take the form shown in FIG. 17 with one PC motherboard containing most of the components, with a slot for accepting a daughter card in the form factor of an industry standard PCMCIA or compact flash (CF) module 220. These module sizes are preferred because the growing variety of modules made by various vendors and manufactured to these standards are leading to rapidly declining component and manufacturing costs for chipsets, discrete resistors, capacitors, inductors, antennas, packaging, and the like. Furthermore, it may ease the process of FCC equipment certification to make the intentional radiating portions of the RFID reader 200 into a mechanical package separate from the remaining circuits. It is not a requirement of this present invention that the RFID reader 200 be constructed in these two parts as shown in FIG. 17 (motherboard plus daughter board); rather, it is one possible choice because of the opportunity to lower development and manufacturing costs. It is likely that variations of the RFID reader 200 can also be produced with all components integrated into a single package, perhaps even smaller in size, without detracting from the present inventive architecture and combination of functions, circuits, and logic. For example, as will be discussed later, when multiple antennas 206 are used the packaging is generally integrated.

Other elements of FIG. 9 may be incorporated depending upon the chosen embodiment. If the RFID reader 200 is a self-install embodiment, then the RFID reader 200 includes a local power supply 207. If battery backup is desired, the packaging of the RFID reader 200 also permits the installation of a battery 208 for backup purposes in case normal power supply 207 is interrupted. When the RFID reader 200 is used in a self-install embodiment, the RFID reader 200 will generally also include a controller function 250, therefore the microprocessor 203 will also require sufficient memory 211 for program and data storage. The lowest cost form of the self-install embodiment will use active RF communications 422 between multiple RFID readers 200 and other devices 550. However, the RFID reader 200 may also include a power line interface 202 or a hardwire interface 209 to provide communications capability over wires, as discussed elsewhere.

The RFID reader 200 will typically communicate with the RFID transponders 100 using frequencies in one or more of following unlicensed frequency bands: 902 to 928 MHz, 2435 to 2465 MHz, 2400 to 2483 MHz, or 5725 to 5850 MHz. These bands permit the use of unlicensed secondary transmitters, and are part of the bands that have become popular for the development of cordless phones and wireless LAN networks, thereby leading to the wide availability of many low cost components that are required for this invention, such as the RF interface 204 chips, analog interface 205 components, and antennas 206. There are 3 different FCC rule sets applicable to the present invention, which will be discussed briefly.

Transmissions regulated by FCC rules 47 CFR 15.245 permit field strengths of up to 500 mV/m at 3 meters (measured using an average detector function; the peak emission limit may be up to 20 dB higher). This implies an averaged transmission power of 75 mW and a peak transmission power of up to 7.5 Watts. Furthermore, transmissions under these regulations do not suffer the same duty cycle constraints as existing wireless security system transmitters operating under 47 CFR 15.231 (a). However, in order to use the rules of 47 CFR 15.245, the RFID reader 200 must operate as a field disturbance sensor, which it does. Existing wireless security system transmitters are not field disturbance sensors.

Transmissions regulated by FCC rules 47 CFR 15.247 permit frequency hopping (FHSS) or digital modulation (DM) systems at transmission powers up to 1 Watt into a 6 dBi antenna, which results in a permitted 4 Watt directional transmission. In order for a FHSS device to take advantage of the full permitted power, the FHSS device must frequency hop at least once every 400 milliseconds.

Transmissions regulated by FCC rules 47 CFR 15.249 permit field strengths of up to 50 mV/m at 3 meters (measured using an average detector function; the peak emission limit may be up to 20 dB higher). This implies an averaged transmission power of 750 µW and a peak transmission power of up to 75 mW. Unlike 47 CFR 15.247, rule section 47 CFR 15.249 does not specify modulation type or frequency hopping.

Most other products using these unlicensed bands are other transient transmitters operating under 47 CFR 15.247 and 47 CFR 15.249, and so even though it may seem that many products are available and in use in these bands, in reality there remains a lot of available space in the band at any one instant in time, especially in residential homes. Most transmitters operating under 47 CFR 15.247 are frequency hopping systems whereby the given spectrum is divided into channels of a specified bandwidth, and each transmitter can occupy a given channel for only 400 milliseconds. Therefore, even if interference occurs, the time period of the interference is brief. In most cases, the RFID readers 200 can operate without incurring interference or certainly without significant interference. In residential homes, the most frequent product user of these bands is cordless telephones, for which there are no standards. Each phone manufacturer uses its own modulation and protocol format. For data devices, there are several well known standards that use the 2400 to 2483 band, such as 802.11, 802.11b (WiFi), Bluetooth, ZigBee (HomeRF-lite), and IEEE 802.15.4, among others.

The present invention has a substantial advantage over the aforementioned products in that the RFID readers 200, gateways 300, and other devices 550 of the security system are fixed. Other products such as cordless phones and various data devices usually have at least one handheld, usually battery powered, component. The FCC's Maximum Permitted Exposure (MPE) guidelines, described in OET 65, generally cause manufacturers to limit transmission power of handheld devices to 100 mW or less. Since most wireless links are symmetrical, once the handheld device (such as the cordless phone) is power limited, any fixed unit (such as the cordless base unit) is also limited in power to match the handheld device. Given that the RFID reader 200, gateway 300, and other devices 550 of the security system are not handheld, they can use the full power permitted by the FCC rules and still meet the MPE guidelines.

As discussed earlier, the preferred mechanism of communications by and between RFID readers 200, gateways 300, and other devices is active RF communications 422. The invention is not limiting, and modulation formats and protocols using either FHSS or DM can be employed. As one example, the active RF communications 422 can use Gaussian Frequency Shift Keyed (GFSK) modulation with FHSS. This particular modulation format has already been used quite successfully and inexpensively for Bluetooth, 802.11, and other data systems to achieve raw data rates on the order of 1 Mbps. In order to take maximum advantage of the permitted power limits in, for example, the 2400 to 2483 MHz band, if a FHSS protocol is chosen, GFSK or otherwise, at least 75 hopping channels should be used and if a DM protocol is chosen, a minimum 6 dB bandwidth of 500 KHz should be used. Any designer of a security system under this invention can take advantage of the fixed nature of the RFID readers 200, gateways 300, and other devices 550 as well as the relatively low data rate requirements to select a modulation format and protocol with high link margins. Most other products in these bands have at least one mobile component and high data rates are required. Therefore, in spite of the presence of other products, the active RF communications 422 used in the security system should achieve higher reliability and range, and lower susceptibility to interference than other collocated products.

When using active RF communications 422, RFID readers 200, gateways 300, and other devices 550 function as a network of devices. A message originating on one device may pass through intermediate devices before terminating on the destination devices, as shown in FIGS. 2C and 8. The RFID readers 200, gateways 300, and other devices 550 determine their own network topology based upon the ability of each device to reliably receive the transmissions from other devices. As will be discussed later, the antennas 206 used in these devices may be directional, and therefore it is not always certain that each device can directly transmit to and receive from every other device. However, given the power limits and expected distribution of devices in typical homes and buildings, it can be generally expected that each device can communicate with at least one other device, and that the devices can then form for themselves a network that enables the routing of a message from any one device to any other device. Networking protocols are well understood in the art and therefore not covered here. The devices described herein typically will use the unique originating and destination address of each device in the header of each message sent in routing messages within the network.

While the RFID readers 200, gateways 300, and other devices 550 use 47 CFR 15.247 rules for their active RF communications 422, the RFID readers 200 can use both 47 CFR 15.245 and 47 CFR 15.247 rules for their wireless communications 420 with the RFID transponders 100. Thus, the RFID readers 200 can communicate to the RFID transponders 100 using one protocol, at a maximum power of 4 W for any length of time, and then switch to a second protocol, if desired, at a maximum power of 7.5 W to obtain a response 421 from an RFID transponder 100. While the RFID reader 200 can transmit at 7.5 W for only 1 ms under the 47 CFR 15.245, that time period is more than enough to obtain tens or hundreds of bits of data from an RFID transponder 100. The extra 2.7 dB of power permitted under 47 CFR 15.245 is useful for increasing the read range of the RFID reader 200. In a related function, the RFID reader 200 can use the longer transmission times at 4 W to deliver power to the RFID transponders 100, as described elsewhere, and reserve the brief bursts at 7.5 W only for data transfer.

As an alternative to active RF communications 422, the RFID readers 200, gateways 300, and other devices 550 can use a power line carrier protocol 202, matching of course, the chipsets and protocols discussed for the gateway 300. Either communications mechanism permits the homeowner or building owner to install the RFID readers 200 by simply plugging each into an outlet 720 in approximately each major room. The power line carrier protocol 202 is connected to the outlet 720 via an AC connector 201. The RFID readers 200, gateways 300, and other devices 550 can then use the method disclosed later to associate themselves with each other and begin communications without the need to install any new wires. However, as also discussed in the foregoing, there may be some users with higher security requirements that do not permit the use of radio spectrum or power lines 430 that may be shared with users outside of the building, and therefore the design permits the use of hardwired connections or interface 209 between the gateways 300, RFID readers 200, and other devices 550.

Each RFID reader 200 communicates with one or more RFID transponders 100 typically using modulated backscatter techniques. These techniques are very well understood by those skilled in the art, and have been well discussed in a plethora of literature including patent specifications, trade publications, marketing materials, and the like. For example, the reader is directed to RFID Handbook Radio-Frequency Identification: Fundamentals And Applications, by Klaus Finkenzeller, published by John Wiley, 1999. U.S. Pat. No. 6,147,605, issued to Vega et al., provides additional material on the design and theory of modulated backscatter techniques. Patent application Ser. No. 10/072,984, filed by Shanks et al., also provides material on the design and theory of modulated backscatter techniques. Therefore, this same material is not covered here. Presently, a number of companies produce miniaturized chipsets, components, and antennas for RFID readers and transponders. Many of these chipsets, though designed for the 13.56 MHz band, are applicable and/or will be available in the higher bands such as those discussed here. For example, Hitachi has recently announced the manufacture of its mu-chip, which is a 2.4 GHz RFID transponder measuring only 0.4 mm square. The most important point here is that the wide availability of parts permits the designer many options in choosing the specific design parameters of the RFID reader 200 and RFID transponder 100 and therefore the innovative nature of this invention is not limited to any specific circuit design implementing the wireless links 420 and 421 between the RFID reader 200 and RFID transponder 100.

The extensive literature on RFID techniques and the wide availability of parts does not detract from the innovative application and combination of these techniques and parts to the present invention. Most applications of RFID have been applied to mobile people, animals, or things that must be authorized, tracked, counted, or billed. No one has previously considered the novel application of low cost RFID components to solve the problem of monitoring fixed assets such as the windows 702, doors 701, and other structures that comprise the openings of buildings. All present transmitters constructed for conventional wireless security systems are several times more expensive than the RFID-based design of the present invention because of the additional components required for active transmission. Furthermore, no one has considered the use of multiple, distributed low cost RFID readers 200 with overlapping coverage so that a building's security is not dependent on a single, vulnerable, and historically unreliable central transceiver.

There are several examples of the advantages that the present RFID approach offers versus conventional wireless security systems. Present wireless security systems limit status reporting by transmitters to times even longer than the FCC restriction of once per hour in order to conserve the battery in the transmitter. The RFID approach does not have the same battery limitation because of the modulated backscatter design. Conventional wireless security systems are subject to both false positive and false negative indications because centrally located transceivers have difficulty distinguishing noise from real signals. The central transceiver has little control over the time of transmission by a transmitter and therefore must evaluate every signal, whether noise, interference, or real transmission. This is made more difficult because the conventional central transceivers are not always located centrally in the house. Professional installers generally hide these central transceivers in a closet or similar enclosure to prevent an intruder from easily spotting the central transceiver and disabling it. Each wall or door through which signals must pass to reach a central transceiver can cause loss of up to 10 dB in signal power. In contrast, the RFID approach places all of the transmission control in the master controller and RFID reader 200. The RFID reader 200 only looks for a reflected response 421 during a transmission sequence 420. Therefore, the RFID reader 200 can be simpler in design.

Some centralized transceivers attempt to use diversity antennas to improve their reliability; however, these antennas are separated only by the width of the packaging, which is frequently much less than one wavelength of the chosen frequency (i.e., 87 cm at 345 MHz and 69 cm at 433 MHz). As is well known to those skilled in the art of wireless, spatial diversity of antennas works best when the antennas are separated by more than one wavelength at the chosen frequency. With the present invention, RFID readers 200 are separated into multiple rooms, creating excellent spatial diversity and the ability to overcome environmental effects such as multipath and signal blockage. Multipath and signal blockage are effects of the RF path between any transmitter and receiver. Most cellular systems use diversity antennas separated by multiple wavelengths to help overcome the effects of multipath and signal blockage. Under the present invention, in most installations there will be multiple RFID readers 200 in a building. There will therefore be an independent RF path between each RFID reader 200 and each RFID transponder 100. The master controller sequences transmissions from the RFID readers 200 so that only one RFID reader 200 is transmitting at a time. Besides reducing the potential for interference, this allows the other RFID readers 200 to listen to both the transmitting RFID reader 200 and the subsequent response from the RFID transponders 100. If the RF path between the transmitting RFID reader 200 and the RFID transponder 100 is subject to some form of multipath or signal blockage, it is possible and even highly probable that one of the remaining RFID readers 200 is capable of detecting and interpreting the signal. If the transmitting RFID reader 200 is having trouble receiving an adequate response from a particular RFID transponder 100, the master controller will then poll the remaining RFID readers 200 to determine whether the response was received by any of them.

One major design advantage of the present invention versus all other applications of RFID is the fixed relationship between each RFID reader 200 and the RFID transponders 100. While RFID readers 200 for other applications must include the complexity to deal with many simultaneous tags in the read zone, tags moving rapidly, or tags only briefly in the read zone, the present invention can take advantage of the controlled static relationship in the following ways.

While there may be multiple RFID transponders 100 in the read zone of each RFID reader 200, the RFID reader 200 can poll each RFID transponder 100 individually, preventing collisions or interference. In addition, because each RFID transponder 100 is responding individually, the RFID reader 200 can use the expected response bit sequence to improve the receive processing gain. A specific RFID transponder 100 is responding at a specific time, and at least a portion of the response 421 will contain bits in a predetermined sequence.

Because the RFID transponders 100 are fixed, the RFID reader 200 can use longer integration times in its signal processing to increase the reliability of the read signal, permitting successful reading at longer distances and lower power when compared with RFID applications with mobile tags.

Furthermore, the RFID reader 200 can make changes in specific frequency while remaining within the specified unlicensed frequency band, in an attempt to find, for each RFID transponder 100, an optimal center frequency, given the manufacturing tolerances of the components in each RFID transponder 100 and any environment effects that may be creating more absorption or reflection at a particular frequency. In a similar manner, the RFID reader 200 can learn the center frequencies of the marking and spacing bits modulated by each RFID transponder 100. While these center frequencies may be nominally known and designed into the RFID transponder 100, there is likely a significant probability that the manufacturing process will result in a variation of actual modulation frequencies. By matching its demodulation process to each RFID transponder 100, the RFID reader 200 can improve its signal processing margin.

Because the multiple RFID readers 200 are controlled from a single master controller, the controller function 250 can sequence the RFID readers 200 in time so that the RFID readers 200 do not interfere with each other.

Because there will typically be multiple RFID readers 200 installed in each home, apartment, or other building, the controller function 250 can use the excellent spatial diversity created by the distributed nature of the RFID readers 200 to increase and improve the reliability of each read. That is, one RFID reader 200 can initiate the transmission sequence 420, but multiple RFID readers 200 can tune and read the response 421 from the RFID transponder 100. Thus, the multiple RFID readers 200 can operate as a network of receivers to demodulate and interpret the response 421 from the RFID transponder 100.

Because the RFID transponders 100 are typically static, and because the events (such as intrusion) that affect the status of the sensors connected to the RFID transponders 100 are relatively slow compared to the speed of electronics in the RFID readers 200, the RFID readers 200 have the opportunity to pick and choose moments of low quiescent interference from other products in which to perform their reads with maximum signal-to-noise ratio potential—all without missing the events themselves.

Because the path lengths and path loss from each RFID transponder 100 to the RFID reader 200 are relatively static, the RFID reader 200 can use different power levels when communicating with each RFID transponder 100. Lower path losses require lower power to communicate; conversely, the RFID reader 200 can step up the power, within the specified limits of the FCC rules, to compensate for higher path losses. The RFID reader 200 can determine the lowest power level to use for each RFID transponder 100 by sequentially stepping down its transmit power 420 on successive reads until no return signal 421 can be detected. Then the power level can be increased one or two incremental levels. This determined level can then be used for successive reads. This use of the lowest necessary power level for each RFID transponder 100 can help reduce the possibility of interference while ensuring that each RFID transponder 100 can always be read.

Finally, for the same static relationship reasons, the master controller and RFID readers 200 can determine and store the typical characteristics of transmission between each RFID transponder 100 and each RFID reader 200 (such as signal power, signal-to-noise ratio, turn on time, modulation bit time, etc.), and determine from any change in the characteristics of transmission whether a potential problem exists. Thus, the RFID reader 200 can immediately detect attempts to tamper with the RFID transponder 100, such as partial or full shielding, deformation, destruction, or removal.

By taking advantage of the foregoing techniques, the RFID reader 200 of the present invention has a demonstrated wireless range of up to 30 meters when communicating with the RFID transponders 100, depending upon the building construction materials, placement of the RFID reader 200 in the room, and the furniture and other materials in the room which may have certain reflective or absorptive properties. This range is more than sufficient for the majority of homes and other buildings in the target market of the present security system, whereby the system can be implemented in a ratio of approximately one RFID reader 200 per major room (i.e., a hallway or foyer is not considered a major room for the purposes of the present discussion, but a living room or bedroom is a major room).

The RFID reader 200 is available with several options that increase both the level of security and functionality in the inventive security system. One option enhances the RFID reader 200 to include an acoustic transducer 210 capable of both receiving and emitting sound waves that enables a glass breakage detection capability in the RFID reader 200. Glass breakage sensors have been widely available for years for both wired and wireless prior art security systems. However, they are available only as standalone sensors selling for $30 to $50 or more. Of course, in a hardwired system, there is also the additional labor cost of installing separate wires from the alarm panel to the sensor. The cost of the sensors generally limits their use to just a few rooms in a house or other building. The cost, of course, is due to the need for circuits and processors dedicated to just analyzing the sound waves.

Figure 18B:
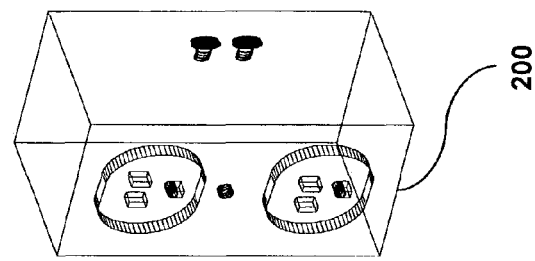
FIG. 18B shows an example embodiment of an RF reader integrated with an outlet.
Figure 18A:
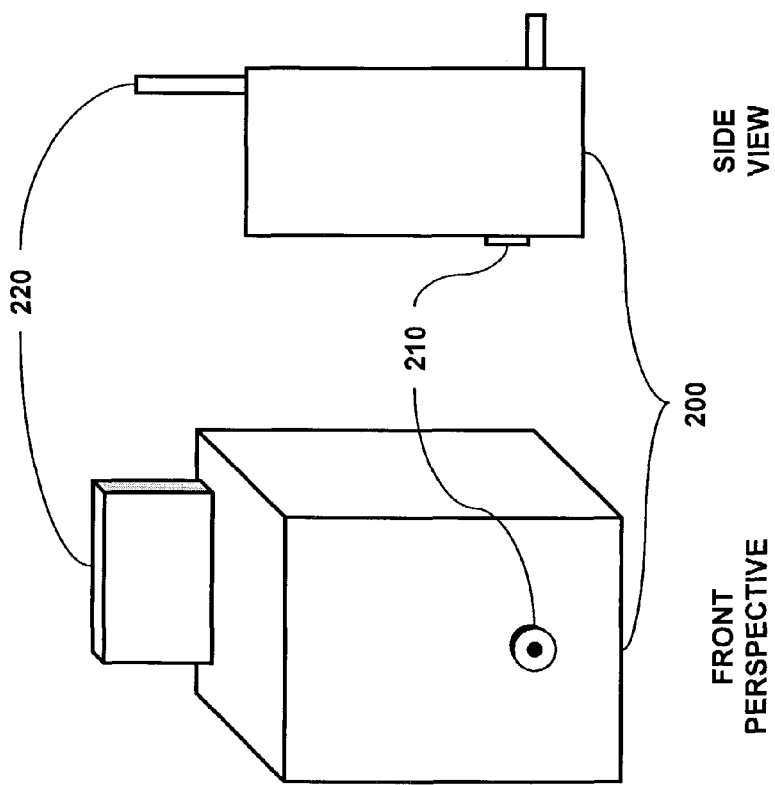
FIG. 18A shows an example embodiment of an RF reader with an acoustic transducer.

Since the RFID reader 200 already contains a power supply 207, a processor 203, and a controller function 250, the only incremental cost of adding the glass breakage detection capability is the addition of the acoustic transducer 210 (shown in FIGS. 9 and 18A). With the addition of this option, glass breakage detection can be available in every room in which an RFID reader 200 has been installed. The acoustic transducer 210 preferably supports both the reception of sound waves and the emission of sound waves such that the acoustic transducer 210 can also be used for other functions beyond just glass breakage detection, such as two-way audio, the sounding of tones and alerts, voice recognition, and voice response (i.e., spoken word responses to commands). While shown as a single block in FIGS. 9 and 18A, the acoustic transducer 210 can be implemented with a single combined component or with a separate input transducer (i.e., microphone) and output transducer (i.e., speaker).

Glass breakage detection is performed by analyzing received sound waves to look for certain sound patterns distinct in the breaking of glass. These include certain high frequency sounds that occur during the impact and breaking of the glass and low frequencies that occur as a result of the glass flexing from the impact. The sound wave analysis can be performed by any number of widely known signal processing techniques that permit the filtering of received signals and determination of signal peaks at various frequencies over time.

One advantage of the present invention over conventional standalone glass breakage sensors is the ability to adjust parameters in the field. Because glass breakage sensors largely rely on the receipt of audio frequencies, they are susceptible to false alarms from anything that generates sounds at the right combination of audio frequencies. Therefore, there is sometimes a requirement that each glass breakage sensor be adjusted after installation to minimize the possibility of false alarms. In some cases, no adjustment is possible in conventional glass breakage detection devices because algorithms are permanently stored in firmware at the time of manufacture. Because the glass breakage detection of the present invention is performed by the RFID readers 200, which include or are in communication with a controller function 250, the controller function 250 can alter or adjust parameters used by the RFID reader 200 in glass breakage detection. For example, the controller function 250 can contain tables of parameters, each of which applies to different building construction materials or window types. The user can select the appropriate table entry during system configuration, or select another table entry later after experience has been gained with the installed security system. Furthermore, if a gateway 300 has any of the modules 310 to 313, the controller function 250 can contact an appropriate database via a gateway 300 that is, for example, managed by the manufacturer of the security system to obtain updated parameters. There is, therefore, significant advantage to this implementation of glass breakage detection, both in the cost of device manufacture and in the ability to make adjustments to the processing algorithms used to analyze the sound waves.

The addition of the acoustic transducer 210, with both sound input and output capability, to the RFID reader 200 for the glass breakage option also allows the RFID reader 200 to be used by an emergency response agency 460 as a distributed microphone to listen into the activities of an intruder. Rather than being analyzed, the sound waves can be digitized and sent to the gateway 300, and then by the gateway 300 to the emergency response agency 460. After the gateway 300 has sent an alert message to the emergency response agency 460, any of the installed modules 310 to 313 can be available for use in an audio link. This two-way audio capability through the acoustic transducer 210 can be useful for more than just listening by an emergency response agency 460. Parents who are not home can listen into the activities of children who might be home. Similarly, a caregiver can use the two-way audio to communicate with an elderly person who might be living alone.

In a similar manner, the RFID reader 200 can contain optional algorithms for the sensing of motion in the room. Like glass breakage sensors, conventional motion sensors are widely available as standalone devices. Conventional motion sensors suffer from the same disadvantages cited for standalone glass breakage sensors, that is they are standalone devices requiring dedicated processors, circuits, and microwave generators. However, the RFID reader 200 already contains all of the hardware components necessary for generating and receiving the radio wave frequencies commonly used in detecting motion; therefore, the RFID reader 200 only requires the addition of algorithms to process the signals for motion in addition to performing its reading of the RFID transponders 100. Different algorithms are available for motion detection at microwave frequencies.

One such algorithm is Doppler analysis. It is a well-known physical phenomenon that objects moving with respect to a transmitter cause a reflection with a shift in the frequency of the reflected wave. While the shift is not large relative to the carrier frequency, it is easily detectable. Therefore, the RFID reader 200 can perform as a Doppler radar by the rapid sending and receiving of radio pulses, with the subsequent measurement of the reflected pulse relative to the transmitted pulse. People and animals walking at normal speeds will typically generate Doppler shifts of 5 Hz to 100 Hz, depending on the speed and direction of movement relative to the RFID reader 200 antenna 206. The implementation of this algorithm to detect the Doppler shift can be, at the discretion of the designer, implemented with a detection circuit or by performing signal analysis using the processor of the RFID reader 200. In either case, the object of the implementation is to discriminate any change in frequency of the return signal relative to the transmitted signal for the purpose of discerning a Doppler shift. The RFID reader 200 is capable of altering its transmitted power to vary the detection range of this motion detection function.

These motion detection functions can occur simultaneously with the reading of RFID transponders 100. Because the RFID transponders 100 are fixed relative to the RFID readers 200, no unintended shift in frequency will occur in the reflected signal. Therefore, for each transmitted burst to an RFID transponder 100, the RFID reader 200 can analyze the reflected signal for both receipt of data from the RFID transponder 100 as well as unintended shifts in frequency indicating the potential presence of a person or animal in motion.

By combining the above functions, the RFID reader 200, in a single integrated package can be capable of (i) communicating with other RFID readers 200, gateways 300, and other devices 550 using active RF communications 422, power line communications 202, and/or hardwired communications 209, (ii) communicating with RFID transponders 100 using wireless communications 420, (iii) detecting motion via Doppler analysis at microwave frequencies, (iv) detecting glass breakage via sound wave analysis of acoustic waves received via an audio transducer 210, and (v) providing a two-way audio link to an emergency response agency 460 via an audio transducer 210 and via a gateway 300. This RFID reader 200 achieves significant cost savings versus conventional security systems through the avoidance of new wire installation and the sharing of communicating and processing circuitry among the multiple functions. Furthermore, because the RFID readers 200 are under the control of a single master controller, the performance of these functions can be coordinated to minimize interference and provide spatial diversity and redundant confirmation of received signals.

The motion detector implemented in the RFID reader 200 is only a single detection technology. Historically, single motion detection technologies, whether microwave, ultrasonic, or passive infrared, all suffer false positive indications. For example, a curtain being blown by a heating vent can occasionally be detected by a Doppler analysis motion detector. Therefore, dual technology motion detectors are sometimes used to increase reliability—for example by combining microwave Doppler with passive infrared so that motion by a warm body is required to trigger an alert. An existing embodiment of the RFID reader 200, which can be mounted high on a wall or on a ceiling, can incorporate a passive infrared sensor 570, if desired, to achieve manufacturing cost savings for the same reasons previously discussed for glass breakage.

However, because the self-install embodiment of the RFID reader 200 will typically be mounted directly on power outlets 720, which are relatively low on the wall in most rooms, incorporating an infrared sensor 570 in the RFID reader 200 is not a viable option. Passive infrared sensors 570 lose their discriminating ability when their line of sight to a warm body is blocked. Because of the low mounting height of the RFID reader 200, it is likely that various pieces of furniture in the room will act to partially or fully block any view that a passive infrared sensor may have of the entire room. In order to overcome this potential limitation, the inventive security system adopts a novel technique to implement dual technology motion sensing in a room without the requirement that both technologies be implemented into a single package.

Existing dual technology sensors implement both technologies into a single sensor because the sensors are only capable of reporting a "motion" or "no motion" condition to the alarm panel. This is fortunate, because present alarm panels are only capable of receiving a "contact closed" or "contact open" indication. Therefore, all of the responsibility for identifying motion must exist within the single sensor package. The inventive controller function 250 can use active RF communications 422, power line carrier 202 protocols, or modulated backscatter 420 to communicate with a passive infrared sensor 570 mounted separately from the RFID reader 200. Therefore, if in a single room, the RFID reader 200 is detecting motion via microwave Doppler analysis and a passive infrared sensor 570 is detecting the presence of a warm body 710 as shown in FIG. 4, the master controller can interpret the combination of both of these indications in a single room as the likely presence of a person.

Figure 23A:
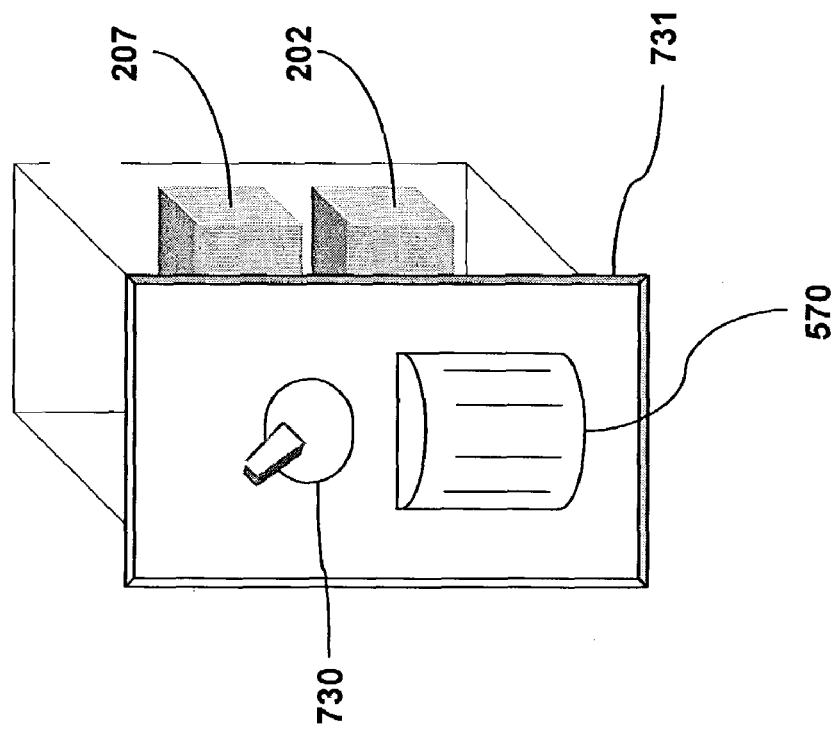
FIG. 23A shows an example embodiment of a passive infrared sensor integrated into a light switch.

One embodiment of this passive infrared sensor 570 is in the form of a light switch 730 with a cover 731 as shown in FIG. 23A. Most major rooms have at least one existing light switch 730, typically mounted at an average height of 55" above the floor. This mounting height is above the majority of furniture in a room, thereby providing a generally clear view of the room. Passive infrared sensors have previously been combined with light switches 730 so as to automatically turn on the light when people are in a room. More importantly, these sensor/switches turn off the lights when everyone has left, thereby saving electricity that would otherwise be wasted by lighting an unoccupied room. Because the primary purpose of these existing devices is to provide local switching, the devices cannot communicate with central controllers such as existing alarm panels.

The passive infrared sensor 570 that operates with the inventive security system includes a local power supply 207 and any of active RF communications 422, power line carrier 202 communications, or modulated backscatter communications 421 that permit the passive infrared sensor 570 to communicate with one or more controller functions 250 in the RFID readers 200 or gateways 300, and be under control of the master controller. At the time of system installation, the master controller is configured by the user thereby identifying the rooms in which the RFID readers 200 are located and the rooms in which the passive infrared sensors 570 are located. The master controller can then associate each passive infrared sensor 570 with one or more RFID readers 200 containing microwave Doppler algorithms. The master controller can then require the simultaneous or near simultaneous detection of motion and a warm body, such as a person 710, before interpreting the indications as a probable person in the room.

Because each of the RFID readers 200 and passive infrared sensors 570 are under control of the master controller, portions of the circuitry in these devices can be shut down and placed into a sleep mode during normal occupation of the building. Since conventional motion sensors are essentially standalone devices, they are always on and are always reporting a "motion" or "no motion" condition to the alarm panel. Obviously, if the alarm panel has been placed into a disarmed state because, for example, the building is being normally occupied, then these "motion" or "no motion" conditions are simply ignored by the alarm panel. But the sensors continue to use power, which although the amount may be small, it is still a waste of AC or battery power. Furthermore, it is well known in the study of reliability of electronic components that "power on" states generate heat in electronic components, and it is heat that contributes to component aging and possible eventual failure.

Additionally, there are some people concerned with being in the presence of microwave radiation. In reality, the amount of radiation generated by these devices is very small, and commonly believed to not be harmful to humans. However, there is the perception among some people that radiation of all types, however small, is still to be avoided. The present security system can selectively shut down or at least slow down the rate of the radiation from the RFID readers 200 when the security system is in a disarmed mode, or if the homeowner or building owner wants the security system to operate in a perimeter-only mode without regard to the detection of motion. By shutting down the radiation and transmissions used for motion detection, the security system is conserving power, extending the potential life of the components, and reducing the possibility of interference between the RFID reader 200 and other products that may be operating in the same unlicensed band. This is advantageous because, for example, while people are occupying the building they may be using cordless telephones (or wireless LANs, etc.) and want to avoid possible interference from the RFID reader 200. Conversely, when the security system is armed, there are likely no people in the building, and therefore no use of cordless telephones, and the RFID readers 200 can operate with reduced risk of interference from the transmissions from the cordless telephones.

Figure 11:
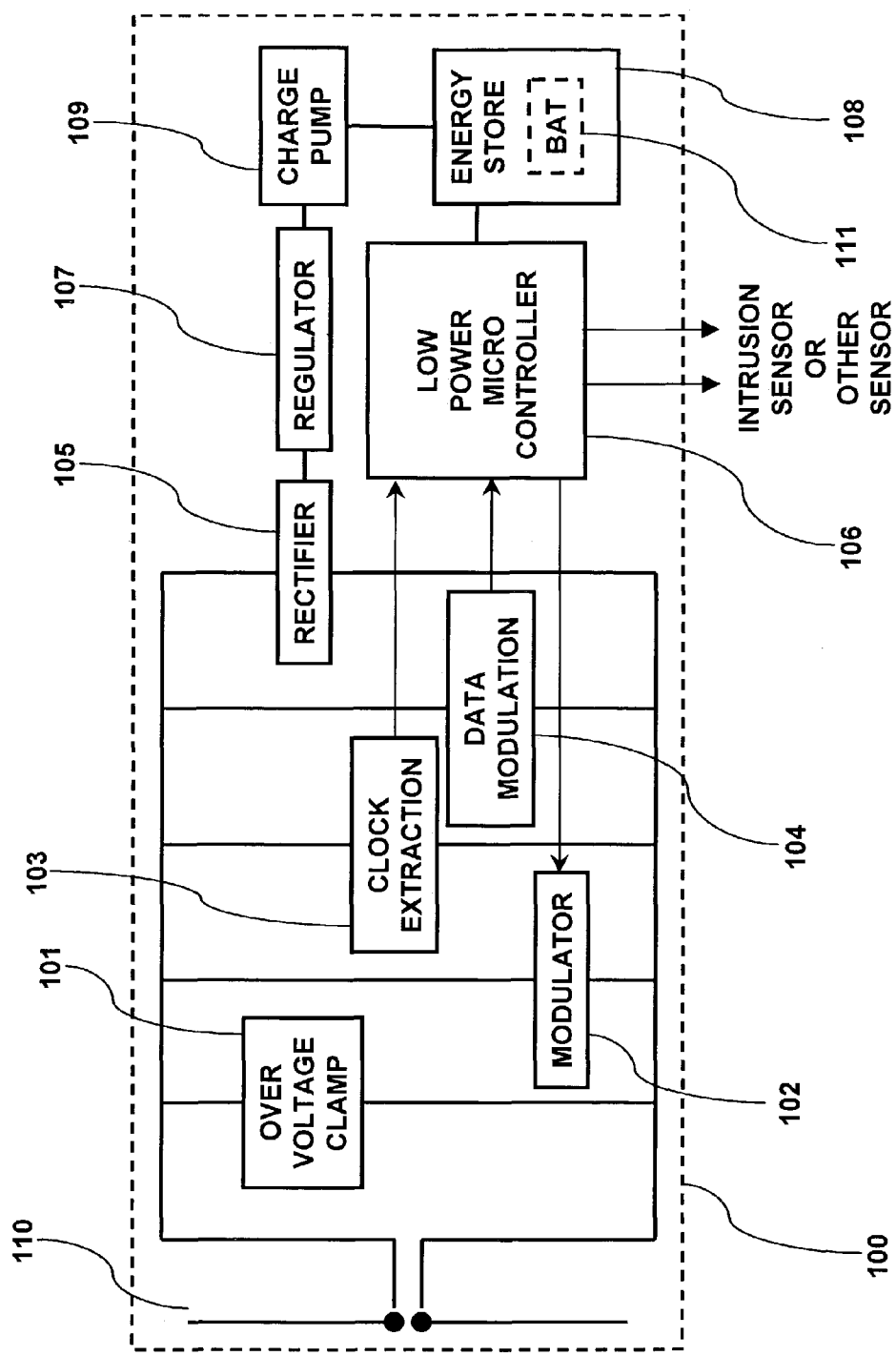
FIG. 11 shows an architecture of the RF transponder.

The RFID transponder 100 of the present invention is shown in FIG. 11. One form may typically be provided with an adhesive backing to enable easy attachment to the frame of an opening such as, for example, a window 702 frame or door 701 frame. RFID transponder 100 designs based upon modulated backscatter are widely known and the details of transponder design are well understood by those skilled in the art. The RFID transponder 100 will typically include energy management circuits such as an overvoltage clamp 101 for protection, a rectifier 105 and regulator 107 to produce proper voltages for use by the charge pump 109 in charging the energy store 108 and powering the microprocessor 106. The RFID transponder 100 receives and interprets commands from the RFID reader 200 by typically including circuits for clock extraction 103 and data modulation 104. Furthermore, the microprocessor 106 can send data and status back to the RFID reader 200 by typically using a modulator 102 to control the impedance of the antenna 110. The impedance control alternately causes the absorption or reflection of the RF energy transmitted by the RFID reader 200 thereby forming the response wireless communications 421.

Low cost chipsets and related components are available from a large number of manufacturers. In the present invention, the RFID reader 200 to RFID transponder 100 radio link budget is designed to operate at an approximate range of up to 30 meters. In a typical installation, each opening will have an RFID transponder 100 installed. The ratio of RFID transponders 100 to each RFID reader 200 will typically be 3 to 8 in an average residential home, although the technology of the present invention has no practical limit on this ratio. The choice of addressing range is a designer's choice largely based on the desire to limit the transmission of wasted bits. In order to increase the security of the transmitted bits, the RFID transponders 100 can include an encryption algorithm. The tradeoff is that this will increase the number of transmitted bits in each message. The key to be used for encryption can be exchanged during enrollment, as explained later.

The RFID transponders 100 are typically based upon a modulated backscatter design. Each RFID transponder 100 in a room absorbs power radiated from one or more RFID readers 200 when the RFID transponder 100 is being addressed, as well as when other RFID transponders 100 are being addressed. In addition, the RFID readers 200 can radiate power for the purpose of providing energy for absorption by the RFID transponders 100 even when the RFID reader 200 is not interrogating any RFID transponders 100. Therefore, unlike most RFID applications in which the RFID transponders or tags are mobile and in the read zone of a conventional RFID reader briefly, the RFID transponders 100 of the present invention are fixed relative to the RFID readers 200 and therefore always in the read zone of at least one RFID reader 200. Therefore, the RFID transponders 100 have extremely long periods of time in which to absorb, integrate, and store transmitted energy.

In a typical day-to-day operation, the RFID reader 200 is making periodic transmissions. The master controller will typically sequence the transmissions from the RFID readers 200 so as to prevent interference between the transmissions of any two RFID readers 200. The master controller will also control the rates and transmission lengths, depending upon various states of the system. For example, if the security system is in a disarmed state during normal occupancy hours, the master controller may use a lower rate of transmissions since little or no monitoring may be required. When the security system is in an armed state, the rate of transmissions may be increased so as to increase the rate of wireless communications between the RFID readers 200 and the various sensors. The increased rate of wireless communications will reduce the latency from any attempted intrusion to the detection of the attempted intrusion. The purpose of the various transmissions will generally fall into several categories including: power transfer without information content, direct addressing of a particular RFID transponder 100, addressing to a predetermined group of RFID transponders 100, general addressing to all RFID transponders 100 within the read range, and radiation for motion detection.

An RFID transponder 100 can typically only send a response wireless communication 421 in reply to a transmission 420 from an RFID reader 200. Furthermore, the RFID transponder 100 will only send a response wireless communication 421 if the RFID transponder 100 has information that it desires to communicate. Therefore, if the RFID reader 200 has made a globally addressed wireless communication 420 to all RFID transponders 100 asking if any RFID transponder 100 has a change in status, an RFID transponder 100 will not respond if in fact it has no change in status to report. This communications architecture reduces the use of resources on multiple levels. On the other hand, if an intrusion sensor 600 detects a probable intrusion attempt, it is desirable to reduce the latency required to report the probable intrusion attempt. Therefore, the communications architecture also includes a mechanism whereby an RFID transponder 100 can cause an interrupt of the otherwise periodic transmissions of any category in order to request a time in which the RFID transponder 100 can provide a response wireless communication with the details of the probable intrusion attempt. The interrupt might be, for example, an extended change of state of the antenna (i.e., from terminate to shorted) or a sequence of bits that otherwise does not occur in normal communications messages (i.e., 01010101). An example sequence may be: (a) the RFID reader 200 may be transmitting power without information content, (b) a first RFID transponder 100 causes an interrupt, (c) the RFID reader 200 detects the interrupt and sends a globally addressed wireless communication 420, (d) the first RFID transponder 100 sends its response wireless communication 421. This example sequence may also operate similarly even if in step (a) the RFID reader 200 had been addressing a second RFID transponder 100; steps (b) through (d) may otherwise remain the same.

Because of the passive nature of the RFID transponder 100, the transfer of energy in which to power the RFID transponder 100 relies on the buildup of electrostatic charge across the antenna elements 110 of the RFID transponder 100. As the distance increases between the RFID reader 200 and the RFID transponder 100, the potential voltage that can develop across the antenna elements declines. For example, under 47 CFR 15.245 the RFID reader 200 can transmit up to 7.5 W of power. At a distance of 10 m, this transmitted power generates a field of 1500 mV/m and at a distance of 30 m, the field declines to 500 mV/m.

The RFID transponder 100 may therefore include a charge pump 109 in which to incrementally add the voltages developed across several capacitors together to produce higher voltages necessary to charge the energy store 108 and/or power the various circuits contained within the RFID transponder 100. Charge pump circuits for boosting voltage are well understood by those skilled in the art. For example, U.S. Pat. Nos. 5,300,875 and 6,275,681 contain descriptions of some examples.

One form of the RFID transponder 100 can contain a battery 111, such as a button battery (most familiar use is as a watch battery) or a thin film battery. Batteries of these shapes can be based upon various lithium compounds that provide very long life. For example, Cymbet has developed a thin film battery that is long life and can be recharged at least 70,000 times. Therefore, rather than relying solely on a limited energy store 108 such as a capacitor, the RFID transponder 100 can be assured of always having sufficient energy through a longer life battery 111 component. In order to preserve charge in the battery 111, the processor 106 of the RFID transponder 100 can place some of the circuits in the RFID transponder 100 into temporary sleep mode during periods of inactivity.

Figure 12:
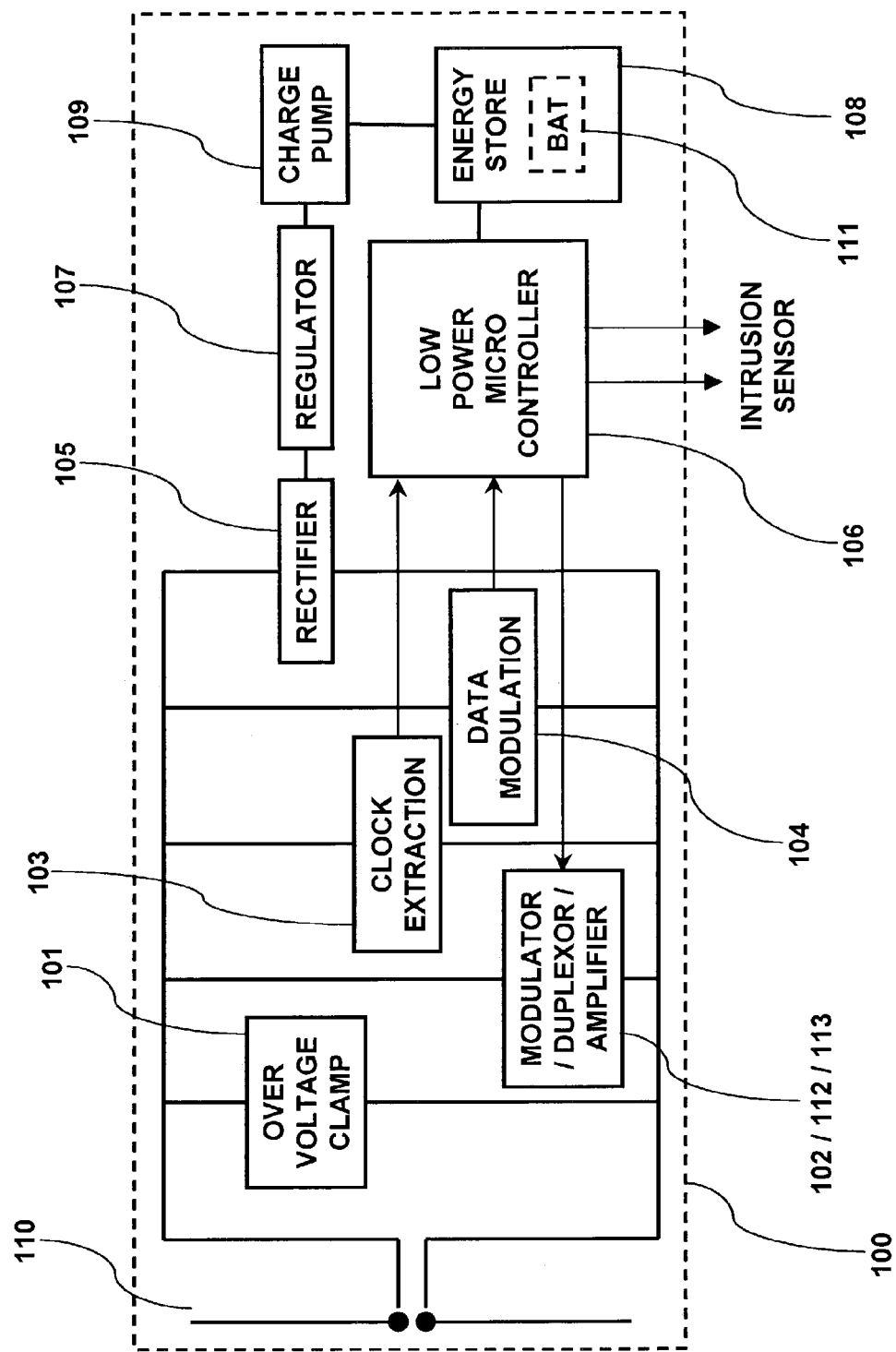
FIG. 12 shows an architecture of the RF transponder with an amplifier.

The use of the battery 111 in the RFID transponder 100 typically does not change the use of the passive modulated backscatter techniques as the communications mechanism. Rather, the battery 111 is typically used to enhance and assist in the powering of the various circuits in the RFID transponder 100. However, an enhanced form of the RFID transponder 100 can contain an active amplifier stage 113 which is shown in FIG. 12. This amplifier stage 113 is used to extend the possible range between the RFID reader 200 and the RFID transponder 100 by amplifying the return modulated signal 421 normally sent by backscatter modulation alone. Depending on the specific design, a duplexor 112 may also be required with the amplifier 113.

The use of this amplifying stage is particularly useful when the RFID transponder 100 replies to the RFID reader 200 using a modulation such as On-Off Keyed (OOK) amplitude modulation. The OOK operates by receiving a carrier wave from the RFID reader 200 at a center frequency selected by the RFID reader 200, or a master controller directing the RFID reader 200, and modulating marking (i.e., a "one") and spacing (i.e., a "zero") bits onto the carrier wave at shifted frequencies. The marking and spacing bits obviously use two different shifted frequencies, and ideally the shifted frequencies are selected so that neither creates harmonics that can confuse the interpretation of the marking and spacing bits. In this example, the OOK is not purely on and off, but rather two different frequency shifts nominally interpreted in the same manner as a pure on-off might normally be interpreted. The purpose is to actively send bits rather that using the absence of modulation to represent a bit. The use of OOK, and in particular amplified OOK, makes the detection and interpretation of the return signal 421 at the RFID reader 200 simpler than with some other modulation schemes.

As mentioned above, the RFID transponder 100 contains a charge pump 109 with which the RFID transponder 100 can build up voltages and stored energy with which to regularly recharge the battery 111, if present. If the battery 111 were to be recharged once per day, a battery capable of being recharged 70,000 times provides a life of over 190 years. This is in stark contrast with the battery-powered transmitters used in conventional wireless security systems, which have a typical life of only 1 to 2 years.

In addition to the charge pump 109 for recharging the battery 111, the RFID transponder 100 contains circuits for monitoring the charged state of the battery 111. If the battery 111 is already sufficiently charged, the RFID transponder 100 can signal the RFID reader 200 using one or more bits in a communications message. Likewise, if the battery 111 is less than fully charged, the RFID transponder 100 can signal the RFID reader 200 using one or more bits in a wireless communications message. Using the receipt of these messages regarding the state of the battery 111, if present, in each RFID transponder 100, the RFID reader 200 can take actions to continue with the transmission of radiated power, increase the amount of power radiated (obviously while remaining within prescribed FCC limits), or even suspend the transmission of radiated power if no RFID transponder 100 requires power for battery charging. By suspending unnecessary transmissions, the RFID reader 200 can conserve wasted power and reduce the likelihood of causing unwanted interference.

One form of the RFID transponder 100, excluding those designed to be carried by a person or animal, is typically connected to at least one intrusion sensor 600. From a packaging standpoint, the present invention also includes the ability to combine the intrusion sensors 600 and the RFID transponder 100 into a single package, although this is not a requirement of the invention.

The intrusion sensor 600 is typically used to detect the passage, or attempted passage, of an intruder through an opening in a building, such as the window 702 or door 701. Thus, the intrusion sensor 600 is capable of being in at least two states, indicating the status of the window 702 or door 701 such as "open" or "closed." Intrusion sensors 600 can also be designed under this invention to report more than two states. For example, an intrusion sensor 600 may have 4 states, corresponding to window 702 "closed," window 702 "open 2 inches," window 702 "open halfway," and window 702 "open fully."

In a typical form, the intrusion sensor 600 may simply detect the movement of a portion of a window 702 or door 701 in order to determine its current state. This may be accomplished, for example, by the use of one or more miniature magnets, which may be based upon rare earth metals, on the movable portion of the window 702 or door 701, and the use of one or more magnetically actuated miniature reed switches on various fixed portions of the window 702 or door 701 frame. Other forms are also possible. For example, pressure-sensitive contacts may be used whereby the movement of the window 702 or door 701 causes or relieves the pressure on the contact, changing its state. The pressure-sensitive contact may be mechanical or electro-mechanical such as a MEMS device. Alternately, various types of Hall effect sensors may also be used to construct a multi-state intrusion sensor 600.

In any of these cases, the input/output leads of the intrusion sensor 600 are connected to, or incorporated into, the RFID transponder 100 such that the state of the intrusion sensor 600 can be determined by and then transmitted by the RFID transponder 100 in a message to the RFID reader 200.

Because the RFID transponder 100 is a powered device (without or without the battery 111, the RFID transponder 100 can receive and store power), and the RFID reader 200 makes radiated power available to any device within its read zone capable of receiving its power, other forms of intrusion sensor 600 design are also available. For example, the intrusion sensor 600 can itself be a circuit capable of limited radiation reflection. Under normally closed circumstances, the close location of this intrusion sensor 600 to the RFID transponder 100 and the simultaneous reflection of RF energy can cause the generation of harmonics detectable by the RFID reader 200. When the intrusion sensor 600 is moved due to the opening of the window 702 or door 701, the gap between the intrusion sensor 600 and the RFID transponder 100 will increase, thereby reducing or ceasing the generation of harmonics. Alternately, the intrusion sensor 600 can contain metal or magnetic components that act to tune the antenna 110 or frequency-generating components of the RFID transponder 100 through coupling between the antenna 110 and the metal components, or the switching in/out of capacitors or inductors in the tuning circuit. When the intrusion sensor 600 is closely located next to the RFID transponder 100, one form of tuning is created and detected by the RFID reader 200. When the intrusion sensor 600 is moved due to the opening of the window 702 or door 701, the gap between the intrusion sensor 600 and the RFID transponder 100 will increase, thereby creating a different form of tuning within the RFID transponder 100 which can also be detected by the RFID reader 200. The intrusion sensor 600 can also be an RF receiver, absorbing energy from the RF reader 200, and building an electrostatic charge upon a capacitor using a charge pump, for example. The increasing electrostatic charge will create an electric field that is small, but detectable by a circuit in the closely located RFID transponder 100. Again, when the intrusion sensor 600 is moved, the gap between the intrusion sensor 600 and the RFID transponder 100 will increase, causing the RFID transponder 100 to no longer detect the electric field created by the intrusion sensor 600.

Another form of intrusion sensor 600 may be implemented with light emitting diode (LED) generators and detectors. At least two forms of LED-based intrusion sensor 600 are available. In the first form, shown in FIG. 25A, the LED generator 601 and detector 602 are incorporated into the fixed portion of the intrusion sensor 600 that is typically mounted on the window 702 or door 701 frame. It is immaterial to the present invention whether a designer chooses to implement the LED generator 601 and detector 602 as two separate components or a single component. Then a reflective material, typically in the form of a tape 603, can be attached to the moving portion of the window 702 or door 701. If the LED detector 602 receives an expected reflection from the LED generator 601, then no alarm condition is present. If the LED detector 602 receives a different reflection (such as from the paint of the window rather than the installed reflector) or no reflection from the LED generator 601, then an intrusion is likely being attempted. The reflective tape 603 can have an interference pattern 604 embedded into the material such that the movement of the window 702 or door 701 causes the interference pattern 604 to move past the LED generator 601 and detector 602 that are incorporated into the fixed portion of the intrusion sensor 600. In this case, the movement itself signals that an intrusion is likely being attempted without waiting further for the LED detector 602 to receive a different reflection or no reflection from the LED generator 601. The speed of movement is not critical, as the data encoded into the interference pattern 604 and not the data rate are important.

The use of such an interference pattern 604 can prevent easy defeat of the LED-based intrusion sensor 600 by the simple use of tin foil, for example. A different interference pattern 604, incorporating a different code, can be used for each separate window 702 or door 701, whereby the code is stored into the master controller and associated with each particular window 702 or door 701. This further prevents defeat of the LED-based intrusion sensor 600 by the use of another piece of reflective material containing any other interference pattern 604. This use of the LED-based intrusion sensor 600 is made particularly attractive by its connection with an RFID transponder 100 containing a battery 111. The LED generator 601 and detector 602 will, of course, consume energy in their regular use. Since the battery 111 of the RFID transponder 100 can be recharged as discussed elsewhere, this LED-based intrusion sensor 600 receives the same benefit of long life without changing batteries.

Figure 25B:
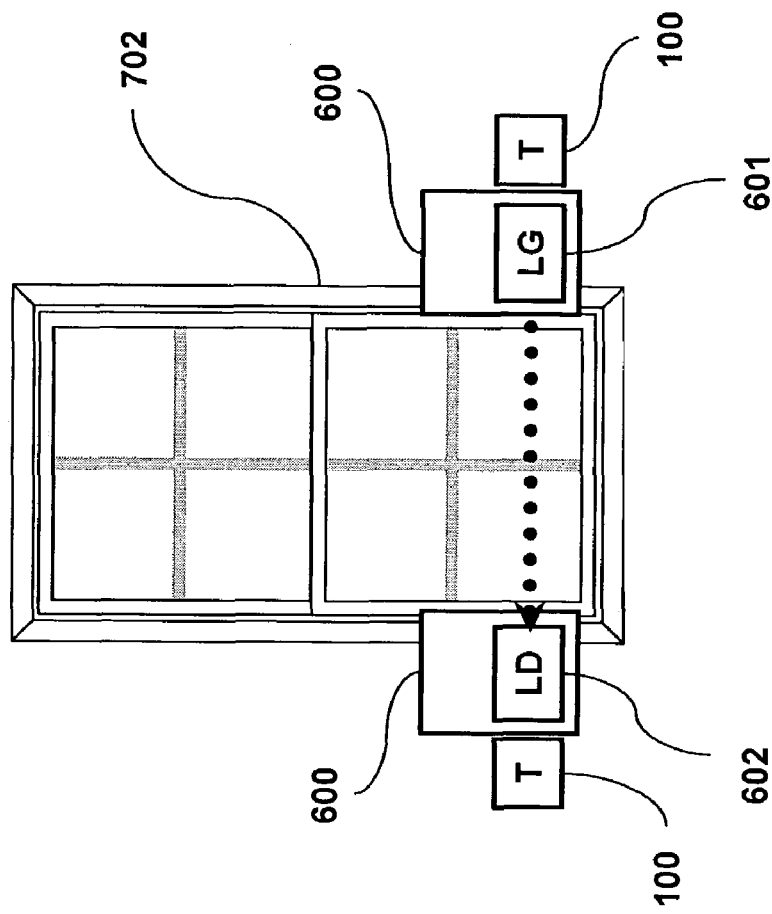
FIGS. 25A and 25B show examples of LED generators and LED detectors that may be used as intrusion sensors.
Figure 25A:
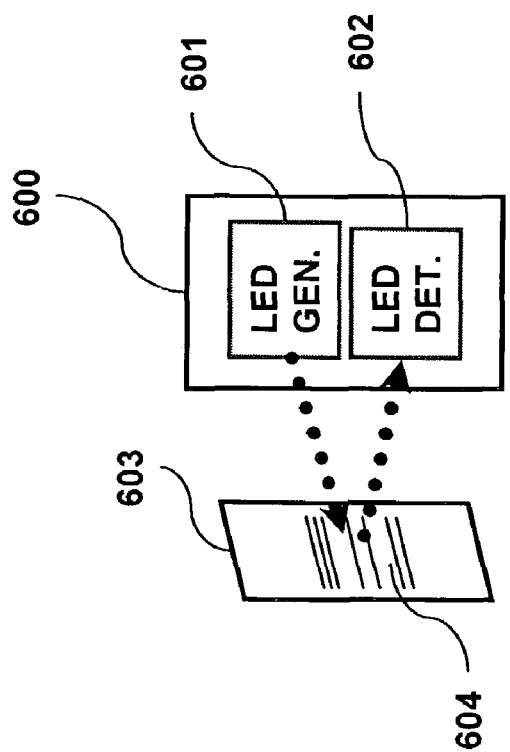

A second form of LED-based intrusion sensor 600 is also available. In this form, the LED generator 601 and LED detector 602 are separated so as to provide a beam of light across an opening as shown in FIG. 25B. This beam of light will typically be invisible to the naked eye such that an intruder cannot easily see the presence of the beam of light. The LED detector 602 will typically be associated with the LED-based intrusion sensor 600, and the LED generator 601 will typically be located across the opening from the LED detector 602. In this form, the purpose of the LED-based intrusion sensor 600 is not to detect the movement of the window 702 or door 701, but rather to detect a breakage of the beam caused by the passage of the intruder through the beam. This form is particularly attractive if a user would like to leave a window 702 open for air, but still have the window 702 protected in case an intruder attempts to enter through the window 353.

As before, it would be preferred to modulate the beam generated by the LED generator 601 so as to prevent easy defeat of the LED detector 602 by simply shining a separate light source into the LED detector 602. Each LED generator 601 can be provided with a unique code to use for modulation of the light beam, whereby the code is stored into the master controller and associated with each particular window 702 or door 701. The LED generator 601 can be powered by a replaceable battery or can be attached to an RFID transponder 100 containing a battery 111 so that the LED generator 601 is powered by the battery 111 of the RFID transponder 100, and the battery 111 is recharged as discussed elsewhere. In this latter case, the purpose of the RFID transponder 100 associated with the LED generator 601 would not be to report intrusion, but rather only to act to absorb RF energy provided by the RFID reader 200 and charge the battery 111.

In each of the cases, the RFID transponder 100 is acting with a connected or associated intrusion sensor 600 to provide an indication to the RFID reader 200 that an intrusion has been detected. The indication can be in the form of a message from the RFID transponder 100 to the RFID reader 200, or in the form of a changed characteristic of the transmissions from the RFID transponder 100 such that the RFID reader 200 can detect the changes in the characteristics of the transmission. It is impossible to know which form of intrusion sensor 600 will become most popular with users of the inventive security system, and therefore the capability for multiple forms has been incorporated into the invention. Therefore, the inventive nature of the security system and the embodiments disclosed herein are not limited to any single combination of intrusion sensor 600 technique and RFID transponder 100.

Figure 24B:
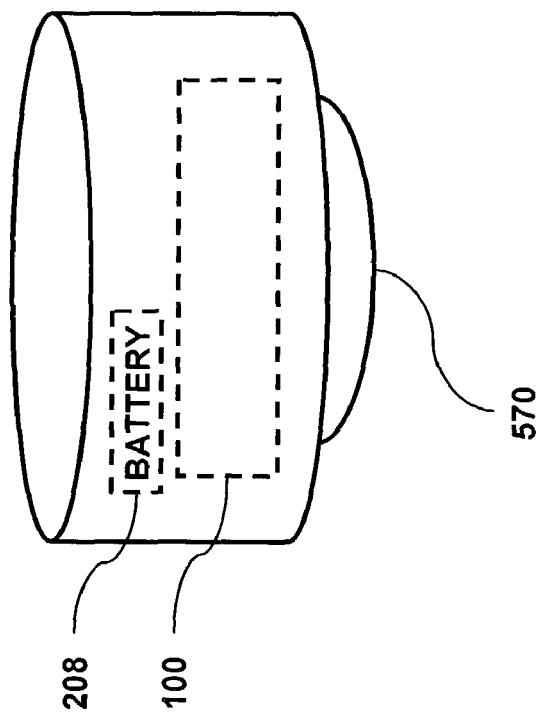
FIGS. 24A and 24B show alternate forms of a passive infrared sensor that may be used with the security system.
Figure 24A:
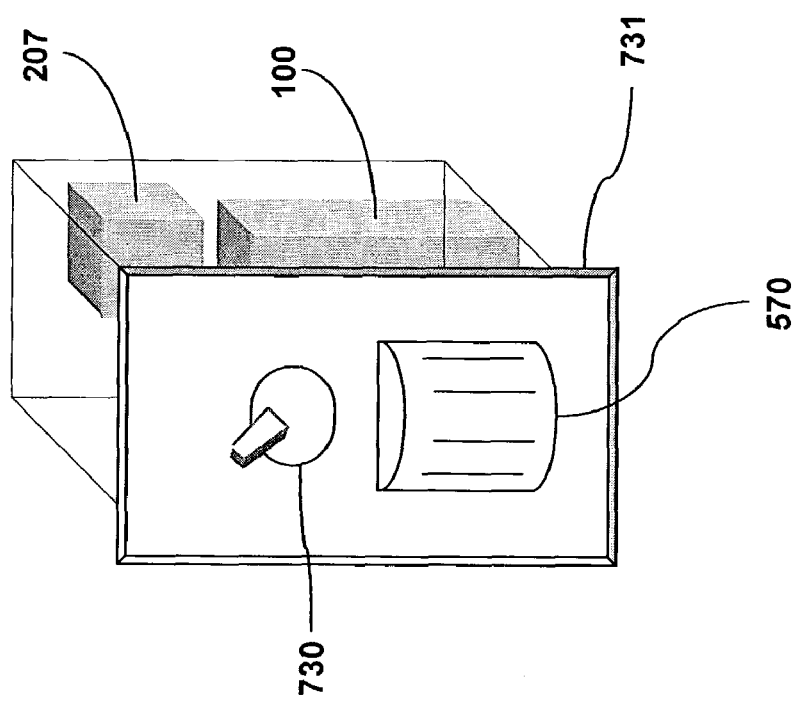

Other embodiments of RFID transponders 100 may exist under the present invention. Two other forms of passive infrared sensors 570 can be created by combining a passive infrared sensor 570 with the circuits of the RFID transponder 100. In this manner, the master controller can communicate with the passive infrared sensor 570 without the size, form factor, and cost of the power line communications 202 interface and associated circuits. As shown in FIG. 24A, in one embodiment the passive infrared sensor 570 with its power supply 207 is integrated into the packaging of a light switch 730. Within this same packaging, an RFID transponder 100 is also integrated. The passive infrared sensor 570 operates as before, sensing the presence of a warm body 710. The output of the circuits of the passive infrared sensor 570 is connected to the RFID transponder 100 whereby the RFID transponder 100 can relay the status of the passive infrared sensor 570 (i.e., presence or no presence of a warm body 710 detected) to the RFID reader 200, and then to the master controller. At the time of system installation, the master controller is configured by the user thereby identifying the rooms in which the RFID readers 200 are located and the rooms in which the passive infrared sensors 570 are located. The master controller can then associate each passive infrared sensor 570 with one or more RFID readers 200 containing microwave Doppler algorithms. The master controller can then require the simultaneous or near simultaneous detection of motion and a warm body, such as a person 710, before interpreting the indications as a probable person in the room.

It is not a requirement that the passive infrared sensor 570 be packaged into a light switch 730 housing. As shown in FIG. 24B, in another embodiment the passive infrared sensor 570 is implemented into a standalone packaging. In this embodiment, both the passive infrared sensor 570 and the RFID transponder 100 are battery 208 powered so that this sensor/transponder combination can be located anywhere within a room. So, for example, this embodiment allows the mounting of this standalone packaging on the ceiling, for a look down on the covered room, or the mounting of this standalone packaging high on a wall.

The present invention also includes a novel method of enrolling RFID transponders 100 with the master controller. The process of enrolling refers to identifying the RFID transponders 100 that are associated with each security system. Each RFID transponder 100 contains a unique serial number to distinguish that RFID transponder 100 from others that may be located in the same building as well as other RFID transponders 100 that may be located in other buildings. The process of enrolling must prevent the unintentional enrollment of RFID transponders 100 that are not intended to be associated with a given security system, without regard to whether the unintentional enrollment would be accidental or malicious. Furthermore, during the process of enrollment, the RFID transponder 100 exchanges more detailed information about itself than would otherwise be transmitted during normal routine transmissions. This more detailed information (for example, the encryption key) allows the RFID transponder 100 and RFID reader 200 to mutually encrypt communications, if necessary, between themselves so that intruders or other interlopers may be prevented from interpreting or spoofing the routine communications between the RFID transponder 100 and RFID reader 200. Spoofing refers to the generation of false communications that attempt to trick a security system into reporting normal conditions when in fact an intrusion is being attempted and the security system would be causing an alert in the absence of the spoofing. Therefore, during enrollment, it would be advantageous to ensure to the greatest degree possible that the more detailed information is not intercepted.

In conventional security systems using transmitters operating under 47 CFR 15.231, the transmitters frequently require programming to associate them with the security system. In some cases, this programming requires the attachment of a special programming console to the transmitter. This is generally not an operation that can be performed by a homeowner. Alternately, the transmitter is identified by a serial number, which then must be manually typed into the keypad. Given the size of the typical keypad and LCD display, and the number of transmitters in a home, this manual process can be quite arduous.

In the present invention, the RFID reader 200 is capable of altering its transmitted power so as to vary the range of its read zone (that is, the distance and shape of the area in which the RFID reader 200 can communicate with an RFID transponder 100). 47 CFR 15.245 permits a maximum average transmit power of 75 mW, but there is no restriction on how low the power can be set. Therefore, using the present invention, when the user desires to enroll with the master controller of a given security system, the following process is followed. The master controller is placed into an enrollment mode. During the enrollment mode, one or more RFID readers 200 are instructed to prepare for enrollment, which entails setting the power level to a low level, thereby creating only a small read zone near to the RFID reader 200. The RFID reader 200 may command all known RFID transponders 100, that is those RFID transponders 100 already enrolled with the master controller, to not respond to the RFID reader 200, thereby allowing the RFID reader 200 to receive responses only from new RFID transponders 100 not already enrolled. The user of the system brings an unenrolled RFID transponder 100 near to the RFID reader 200. Near in this case will typically be within 20 to 30 centimeters of the RFID reader 200. Once the RFID reader 200 can detect the RFID transponder 100, the RFID reader 200 will sequentially step its power down in incremental steps to verify that the RFID transponder 100 is in fact very near to the RFID reader 200. Each incremental step down in power further reduces the size and shape of the read zone. As the power is reduced, all other RFID transponders 100 in the vicinity of the RFID reader 200 should no longer be detectable, and only the RFID transponder 100 being enrolled will be detectable. The RFID reader 200 will reduce its power to a predetermined threshold, at which point the RFID reader 200 can be reasonably certain that the RFID transponder 100 is physically close to the RFID reader 200. At this point of physical closeness and low power, it is highly unlikely that the communications between the two devices can be intercepted. At this point, the RFID transponder 100 provides its unique serial number including the detailed information required for the RFID reader 200 and RFID transponder 100 to engage in encrypted communications. After this particular exchange, the RFID transponder 100 is enrolled, and the master controller may provide some form of feedback, such as audible or visual, to the user indicating that the RFID transponder 100 has been enrolled. Now the RFID transponder 100 may be installed.

In a similarly novel manner, RFID readers 200, gateways 300, and other devices 550 may be enrolled with each other and therefore with the master controller. The same type of issues related in the foregoing apply to this enrollment process. The goal is to enable the network of devices within the inventive security system to exchange communications that may be encrypted without sharing certain identity or encryption information in the open where it can be intercepted. The automatic method of the present invention proceeds as follows.

The installer of the system may first install and power on at least one RFID reader 200. Each gateway 300 or other device 550, except RFID readers 200, is provided with an associated master key RFID transponder 265. This will typically be either in a small form factor that is portable or can in fact be embedded into the packaging of the gateway 300 or other device 550. In a sense, it is like a key for entry to the system. The master controller, which is likely to initially be the first RFID reader 200 powered on, is placed into an enrollment mode. During the enrollment mode, one or more RFID readers 200 are instructed to prepare for enrollment, which entails setting the power level to a low level, thereby creating only a small read zone near to the RFID reader 200. The user of the system brings the master key RFID transponder 265 (which may be separate or embedded into the packaging of a gateway 300 or other device) near to the RFID reader 200. Near in this case will typically be within 20 to 30 centimeters of the RFID reader 200. Once the RFID reader 200 can detect the master key RFID transponder 265, the RFID reader 200 will sequentially step its power down in incremental steps to verify that the master key RFID transponder 265 is in fact very near to the RFID reader 200. Each incremental step down in power further reduces the size and shape of the read zone. As the power is reduced, all other RFID transponders 100 in the vicinity of the RFID reader 200 should no longer be detectable, and only the master key RFID transponder 265 will be detectable. The RFID reader 200 will reduce its power to a predetermined threshold, at which point the RFID reader 200 can be certain that the master key RFID transponder 265 is physically close to the RFID reader 200. At this point of physical closeness and low power, it is highly unlikely that the communications between the two devices can be intercepted. The master controller commands the RFID reader 200 to read the master key RFID transponder 265, and verifies the content of the master key RFID transponder 265. If the master key RFID transponder 265 is properly verified, the master controller enrolls the RFID reader 200 by receiving its unique identity codes. If desired for higher security, the master key RFID transponder 265 can contain a code used for encrypting communications. This code, once received by the RFID reader 200, can be used to encrypt all communications between the master controller and the RFID reader 200. The code remains secret because it is only transmitted over the short air gap between the RFID reader 200 and the master key RFID transponder 265 during enrollment, and never over the power lines 250, or at high enough power that it is detectable outside of the immediate physical vicinity of the RFID reader 200 or user during enrollment. It is not a requirement that the code is ever user readable or user accessible.

In a larger security system with many RFID readers 200, gateways 300, and other devices 550, the above process may entail the exchange of multiple master keys 265. For example, gateway A is registered using key A with RFID reader C and RFID reader D, and then gateway B is registered using key B with RFID reader C. RFID reader C can provide key B to both gateway A and reader D using key A. Eventually, the entire network of devices within the security system has the full set of master keys 265 necessary for any device to communicate with any other device, whether the communication is active RF 422 or power line carrier 202. Furthermore, once the keys 265 are known to all the devices, the master controller may command all devices to shift to a single new key. The important aspects of the above process are that (i) the user is not required to type codes of any kind into a programming terminal of any type, and (ii) the unique keys 265 are never compromised by being openly sent at power levels and over distances capable of being intercepted.

Because the RFID reader 200 and RFID transponder 100 operate in one of the shared frequency bands allocated by the FCC, these devices, as do all Part 15 devices, are required to accept interference from other Part 15 devices. It is primarily the responsibility of the RFID reader 200 to manage communications with the RFID transponder 100, and therefore the following are some of the capabilities that may be included in the RFID to mitigate interference. First, the RFID reader 200 can support the use of multiple modulation schemes. For example, 47 CFR 15.245 has a bandwidth of 26 MHz in the 902 to 928 MHz band and 30 MHz in the 2435 to 2465 MHz band, with no restrictions on modulation scheme or duty cycle. The other devices operating in these bands will typically be frequency hopping devices that have divided their allowable spectrum into channels, where each channel may typically be 250 KHz, 500 KHz, 1 MHz, or similar. The specific channels used by other devices may or may not overlap with the spectrum used by the present invention. The most typical case is a partial overlap. For example, some wireless LAN devices follow a standard known as 802.11, which uses the spectrum 2400 to 2483.5 MHz, and employs 75 channels, each with a bandwidth of 1 MHz. These devices only partially overlap the 2435 to 2465 MHz spectrum that may be used by the present invention. All frequency hopping devices operating under 47 CFR 15.247 will typically occupy each of their channels for no more than 400 milliseconds. Therefore, 802.11 devices, in this example, have the potential for causing only transitory interference and only for a small proportion of the time (no more than $^{39}\!/_{75}$th probability, or 40%).

The RFID reader 200 can vary its modulation scheme, under command of the master controller. The RFID transponder 100 uses backscatter modulation, which alternately reflects or absorbs the signal radiated by the RFID reader 200 in order to send its own data back. Therefore, the RFID transponder 100 will automatically follow, by design, the specific frequency and modulation used by the RFID reader 200. This is a significant advantage versus conventional wireless security system transmitters, which can only transmit at a single modulation scheme with their carrier centered at a single frequency. If interference is encountered at or near that single frequency, these transmitters of conventional wireless security systems have no ability to alter their transmission characteristics to avoid or mitigate the interference.

An RFID reader 200 can be implemented to support any of the following modulation schemes, though the present invention is not limited to just these modulation schemes. As is well known in the art, there are many modulation techniques and variations within any one modulation technique, and designers have great flexibility in making choices in this area. The simplest is a carrier wave (CW) signal, at a variety of frequency choices within the allowable bandwidth. The CW conveys no information from the RFID reader 200 to the RFID transponder 100, but still allows the RFID transponder 100 to backscatter modulate 421 the signal on the return path as described earlier. The RFID reader 200 would typically use another modulation scheme such as Binary Phase Shift Keyed (BPSK), Gaussian Minimum Shift Keyed (GMSK), Gaussian Frequency Shift Keyed (GFSK), or even on-off keyed (OOK) AM, when sending data to the RFID transponder 100, but can use CW when expecting a return signal 421. The RFID reader 200 can concentrate its transmitted power into this CW, permitting this narrowband signal to overpower a portion of the spread spectrum signal typically used by other devices operating in the unlicensed bands. If the RFID reader 200 is unsuccessful with CW at a particular frequency, the RFID reader 200 can shift frequency within the permitted band. As stated, under the present invention the RFID transponder 100 will automatically follow the shift in frequency by design. Rather than repeatedly generating CW at a single frequency, the RFID reader 200 can also frequency hop according to any prescribed pattern. The pattern may be predetermined or pseudorandom. This pattern can be adaptive and can be varied, as needed to avoid interference.

If the success rate with frequency hopping is, in itself, insufficient to overcome interference, the RFID reader 200 can use a multicarrier modulation scheme, whereby the signal content in now spread into multiple frequencies within a predetermined bandwidth. Since the anticipated interference will likely be coming from frequency hopping devices (based upon the profiles of devices registered in the FCC equipment database for these frequency bands), and only for brief periods of time (less than 400 milliseconds, which is a requirement of most devices operating under 47 CFR 15.247), if the RFID reader 200 spreads its signal out across multiple frequencies in the permitted band then only a portion of the signal will be interfered with at any one point in time. The remaining portion of the signal will likely retain its fidelity. The multicarrier modulation scheme may be spread spectrum or another appropriate scheme. Finally, the RFID reader 200 can combine a multicarrier modulation scheme with frequency hopping so as to both spread its energy within a predetermined channel and also periodically change the channel within the permitted band in which it is operated. There are some devices, such as microwave ovens, which may bleed energy into one of the unlicensed bands. This will typically cause interference in only a region of the band, and will not be moving (as in channel hopping). Therefore the RFID reader 200 can detect repeated failures in the interfered region of the band, and avoid that region for a period of time. The availability of 47 CFR 15.245 as the rule basis in addition to 47 CFR 15.247 permits the RFID reader 200 great flexibility in responding to the environmental conditions experienced in each installation, and at each point in time. Very few other devices have such operating flexibility.

There may be times when the interference experienced by the RFID reader 200 is not unintentional and not coming from another Part 15 device. One mechanism by which a very technically knowledgeable intruder may attempt to defeat the security system, or any wireless system, of the present invention is by intentional jamming. Jamming is an operation by which a malicious intruder independently generates a set of radio transmissions intended to overpower or confuse legitimate transmissions. In this case, the intruder would likely be trying to prevent one or more RFID transponders 100 from reporting a detected intrusion to the RFID reader 200, and then to the master controller. Jamming is, of course, illegal under the FCC rules; however, intrusion itself is also illegal. In all likelihood, a person about to perpetrate a crime may not give any consideration to the FCC rules. Therefore, the RFID reader 200 also contains algorithms that can determine within a reasonable probability that the RFID reader 200 is being subjected to jamming. If one or more RFID readers 200 detect a change in the radio environment, in a relatively short predetermined period of time, wherein attempted changes in modulation schemes, power levels, and other parameters are unable to overcome the interference, the master controller can cause an alert indicating that it is out of communications with one or more RFID transponders 100 with the likely cause being jamming. This condition can be distinguished from the failure of a single RFID transponder 100 by a simultaneous and parallel occurrence of the change in RF environment, caused by signals not following known FCC transmission rules for power, duty cycle, bandwidth, modulation, or other related parameters and characteristics. The alert can allow the building owner or emergency response agency 460 to decide upon an appropriate response to the probable jamming.

In addition to its support of multiple modulation schemes, the RFID reader 200 is available in an embodiment with multiple antennas that enables the RFID reader 200 to subdivide the space into which the RFID reader 200 transmits and/or receives. It is well known in antenna design that it is desirable to control the radiation pattern of antennas to both minimize the reception of noise and maximize the reception of desired signals. An antenna that radiates equally in all directions is termed isotropic. An antenna that limits its radiation into a large donut shape can achieve a gain of 2 dBi. By limiting the radiation to the half of a sphere above a ground place, an antenna can achieve a gain of about 3 dBi. By combining the two previous concepts, the gain can be further increased.

By expanding upon these simple concepts to create antennas that further limit radiation patterns, various directional gains can be achieved. The RFID reader 200 circuit design permits the construction of embodiments with more than one antenna, whereby the transceiver circuits can be switched from one antenna to another. In one example, the self-installed embodiment of the RFID reader 200 will typically be plugged into an outlet 720. Therefore, the necessary coverage zone of the RFID reader 200 is logically bounded by the planes created by the floor below the reader and the wall behind the reader. Therefore, relative to an isotropic antenna, the read zone of the RFID reader 200 should normally be required to cover the space contained within only one-quarter of a sphere. Therefore, a single antenna configured with the RFID reader 200 should typically be designed at a gain of approximately 6 dBi. By comparison, the antennas of most centralized transceivers of conventional wireless security systems are isotropic or have a gain of only 2 to 3 dBi because the wireless transmitters of these conventional systems can be located in any direction from the one centralized transceiver. This design limitation detracts from their receive sensitivity.

However, it may be desirable to further subdivide this space into multiple subspaces, for example a "left" and a "right" space, with antenna lobes that overlap in the middle. Each antenna lobe may be then able to increase its design gain to approximately 9 dBi or more. Since the RFID readers 200 and RFID transponders 100 are fixed, the RFID reader 200 can "learn" in this example "left"/"right" configuration which RFID transponders 100 have a higher received signal strength in each of the "left" and "right" antennas 206. The simplest method by which this can be achieved is with two separate antennas 206, with the transceiver circuits of the RFID reader 200 switching between the antennas 206 as appropriate for each RFID transponder 100. This enables the RFID reader 200 to increase its receiver sensitivity to the reflected signal returning from each RFID transponder 100 while improving its rejection to interference originating from a particular direction. This example of two antennas 206 can be expanded to three or four antennas 206. Each subdivision of the covered space can allow a designer to design an increase in the gain of the antenna 206 in a particular direction. Because the physical packaging of the RFID reader 200 has physical depth proportionally similar to its width, a three antenna 206 pattern is a logical configuration in which to offer this product, where one antenna 206 looks forward, one looks left, and the other looks right. An alternate configuration, which is equally logical, can employ four antennas 206: one antenna 206 looks forward, the second looks left, the third looks right, and the fourth looks up. These example configurations are demonstrated in FIGS. 20A and 20B.

There are multiple manufacturing techniques available whereby the antennas can be easily printed onto circuit boards or the housing of the RFID reader 200 thereby creating antennas known as patch antennas or microstrip antennas. The reader is directed to Compact and Broadband Microstrip Antennas, by Kin-Lu Wong, published by Wiley (2002), as one source for a description of the design and performance of these microstrip antennas. This present specification does not recommend the choice of any one specific antenna design, because so much relies on the designer's preference and resultant manufacturing costs. However, when considering the choice for antenna design for both the RFID reader 200 and the RFID transponder 100, the following should be taken into consideration. Backscatter modulation relies in part upon the Friis transmission equation and the radar range equation. The power $P_r$ that the receiving RFID reader 200 can be expected to receive back from the RFID transponder 100 can be estimated from the power $P_t$ transmitted from the transmitting RFID reader 200, the gain $G_t$ of the transmitting RFID reader 200 antenna, gain $G_r$ of the receiving RFID reader 200 antenna, the wavelength $\lambda$ of the carrier frequency, the radar cross section $\sigma$ of the RFID transponder 100 antenna, and the distances $R_1$ from the transmitting RFID reader 200 to the RFID transponder 100 and $R_2$ from the RFID transponder 100 to the receiving RFID reader 200. (Since more than one RFID reader 200 can receive wireless communications from the RFID transponder 100, the general case is considered here.) The radar range equation is then:

$$P_r = P_t \cdot \sigma \cdot [G_t \cdot G_r / 4\pi] \, [\pi / 4\pi R_1 R_2]^2$$

Therefore, the designer should consider antenna choices for the RFID readers 200 and RFID transponders 100 that maximize, in particular, $G_r$ and $\sigma$. The combination of $P_t$ and $G_t$ cannot result in a field strength that exceeds the prescribed FCC rules. The foregoing discussion of microstrip antennas does not preclude the designer from considering other antenna designs. For example, dipoles, folded dipoles, and log periodic antennas may also be considered. Various patents such as U.S. Pat. Nos. 6,147,606, 6,366,260, 6,388,628, 6,400,274, among others show examples of other antennas that can be considered. Unlike other applications for RFID, the security system of the present invention uses RFID principles in a primarily static relationship. Furthermore, the relationship between the RFID reader 200 antennas and RFID transponder 100 antennas will typically be orthogonal since most buildings and homes have a square or rectangular layout with largely flat walls. This prior knowledge of the generally static orthogonal layout should present an advantage in the design of antennas for this RFID application versus all other RFID applications.

Figure 26:
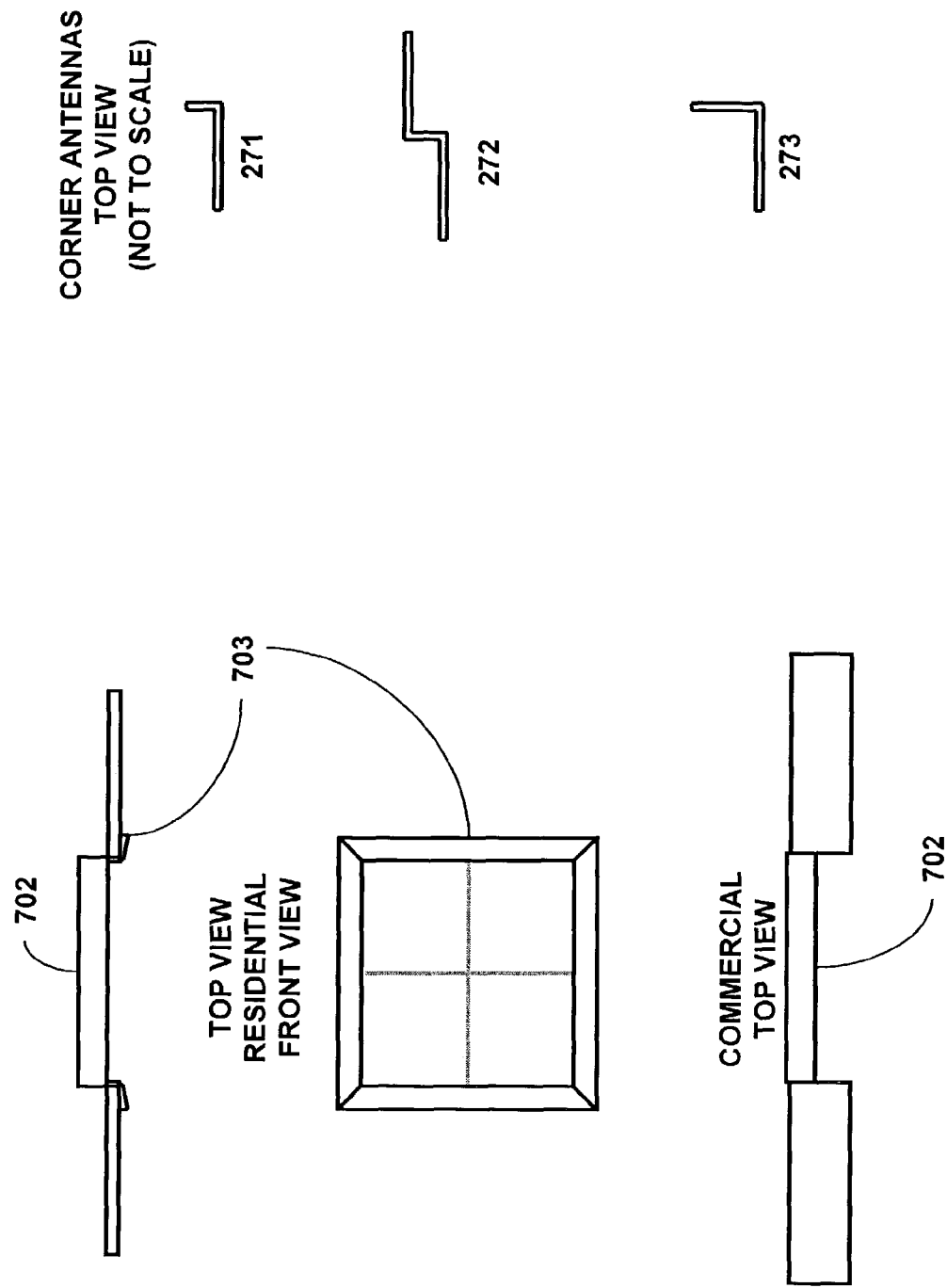
FIG. 26 shows examples of corner antennas for RFID transponders and examples of window frames in which they may be mounted.

Some example antenna designs are shown in FIG. 26. One form of the RFID transponder 100 will typically be used in residential homes. The windows 702 and doors 701 of most residential homes are surrounded by a type of molding known as casing 703. Many shapes of casing 703 are available, but they all share the two important features of width and depth. Typically, the minimum width is 2.25 inches and the minimum depth of the side furthest from the window 702 or door 701 is 0.5 inches. By taking advantage of these known minimum dimensions and the orthogonal layout of most residential homes, wraparound corner antenna designs such as 271 or 272 are possible as shown that provide a reflective surface in two directions and increase the antenna surface area and the radar cross section $\sigma$ of the resultant antenna 206 even when viewed from multiple directions. The corner reflector design for the RFID transponder 100 antenna 271 or 272 increases the layout flexibility of the RFID transponders 100 and the RFID readers 200 in any given room. Alternately, an antenna can be designed to be inserted under the molding such that the antenna is between the molding and the underlying drywall. This permits a hidden antenna that can be relatively large in surface area.

Many commercial buildings do not use molding around their windows 702, however the wall thickness is frequently much more than the window 702 depth, giving rise to a right angle drywall surface as shown in FIG. 26. This is also advantageous for another wraparound corner antenna design such as 273, and in fact provides more flexibility is designing the physical dimensions because commercial building owners are less sensitive about aesthetics than homeowners. The reflective surface of the antenna designs 271–273 can be covered with a plastic housing capable of accepting paint so that the RFID transponder 100 can be painted after installation so as to blend in with the wall decor.

As with several other features of the present invention, designers can make preferred choices on configuration without deducting from the intentions of the present invention, and therefore no limitation should be construed by the choice of any specific number of antennas or type of antenna design.

The architecture of the security system of the present invention provides an advantage to the physical design of antennas for the RFID readers 200. The concepts of directional antenna gain have been applied to various wireless systems, such as cellular systems. However, these systems suffer from the design constraint of multiple sectored antennas simultaneously transmitting. Therefore, in order to achieve the types of gains stated above, these antennas must be designed with large front-to-back signal rejection ratios, for example. The present security system is under command, at all times, of a central master controller, which can sequence the transmissions of each of the RFID readers 200 installed in each system. Therefore, the antenna design parameters are relaxed by knowing that the system is not self-interfering whereby the antenna of one RFID reader 200 must be designed to reject the signals simultaneously generated by another RFID reader 200. This centralized control and the simplified antenna design parameters permit the present system to be manufactured at lower cost.

The range of the present security system can be extended, if necessary in certain installations, in the following manner. FCC rule section 47 CFR 15.249 permits the construction of transmitters in the bands 902 to 928 MHz and 2400 to 2483.5 MHz with a field strength of 50 mV/m at 3 meters (equivalent to approximately 750 microwatts). Unlike the RFID transponders 100, transmitters under this rule section must now be active transmitters 560. These active transmitters 560 require more components, and therefore will be more expensive to manufacture than the RFID transponders 100. They will also likely suffer from some of the same disadvantages of the transmitters of conventional wireless security systems such as reduced battery life, with the following exceptions. 47 CFR 15.249 does not have the duty cycle restrictions of 47 CFR 15.231. The field strength limits of 47 CFR 15.249 are greater than the field strength limits of 47 CFR 15.231. The RFID reader 200 can confirm receipt of a transmission from an active transmitter 560 so that the transmitter 560 knows its message has been received. If the message has not been received, the transmitter 560 can shift frequency.

Finally, the present security system is not based around a single central transceiver; distributed RFID readers 200 are still used with all of the aforementioned advantages. If the building owner has an area too large in which to operate using the lower-cost RFID transponders 100, transmitters 560 may be used in place of the RFID transponders 100. In the manner previously discussed, the transmitters 560 will now be connected to an intrusion sensor 600. A single RFID reader 200 can communicate with both RFID transponders 100 and transmitters 560, and the RFID reader 200 remains in control of communications with both the RFID transponders 100 and transmitters 560 to avoid system self-interference and collisions. In addition to covering larger areas, these active transmitters 560 can be used to monitor objects that have their own battery power source, such as automobiles, tractors, or watercraft. Thus, the security system enables the coverage of more than just the perimeter and interior of a home or other building.

One additional form of an active transmitter 560 is a handheld device known as a keyfob 561. Keyfobs 561 are widely used today for locking and unlocking cars, and a number of conventional wireless alarm panels also support keyfobs 561. The present security system also includes support for keyfobs 561, whose signals can be received by either RFID readers 200 or gateways 300. Typically, the security system would be programmed such that the function keys on the keyfob 561 will be used to place the system into either armed or disarmed mode. The batteries on keyfobs 561 will typically last for years because the keyfobs 561 only transmit when a button is pressed.

The RFID reader 200 is not limited to reading just the RFID transponders 100 installed in the openings of the building. The RFID reader 200 can also read RFID transponders 100 that may be carried by individuals 710 or animals 711, or placed on objects of high value. By placing an RFID transponder 100 on an animal 711, for example, the controller function 250 can optionally ignore indications received from the motion sensors if the animal 711 is in the room where the motion was detected. By placing an RFID transponder 100 on a child, the controller function 250 can use any of the modules 310 to 313 installed in a gateway 300, to send an message to a parent at work when the child has arrived home or equally important, if the child was home and then leaves the home. The RFID transponder 100 can also include a button than can be used, for example, by an elderly or invalid person to call for help in the event of a medical emergency or other panic condition. When used with a button, the RFID transponder 100 is capable of reporting two states: one state where the RFID transponder 100 simply registers its presence, and the second state in which the RFID transponder 100 communicates the "button pressed" state. It can be a choice of the system user of how to interpret the pressing of the button, such as causing an alert, sending a message to a relative, or calling for medical help. Because the RFID readers 200 will typically be distributed throughout a house, this form of panic button can provide a more reliable radio link than conventional systems with only a single centralized receiver.

Earlier, the X-10 power line protocol was mentioned and then dismissed as a contender for use in the power line communications of the disclosed invention. The X-10 protocol is far too simple and lacking in reliability features for use in a security system. However, there are reportedly over 100 million lighting and appliance control devices that have shipped with the X-10 protocol. These devices are typically used only to turn on, turn off, or variably dim lights or appliances. Because the RFID reader 200 and gateway 300 are already coupled to the power lines 250, these devices are also capable of generating the 120 KHz pulses necessary to send X-10 based commands to X-10 devices that may be installed in the building or home. The controller function 250 can be configured, for example, to turn on certain lights when an intrusion has been detected and when the system has been disarmed. The support for this protocol is only as a convenience for these legacy devices.

Figure 16:
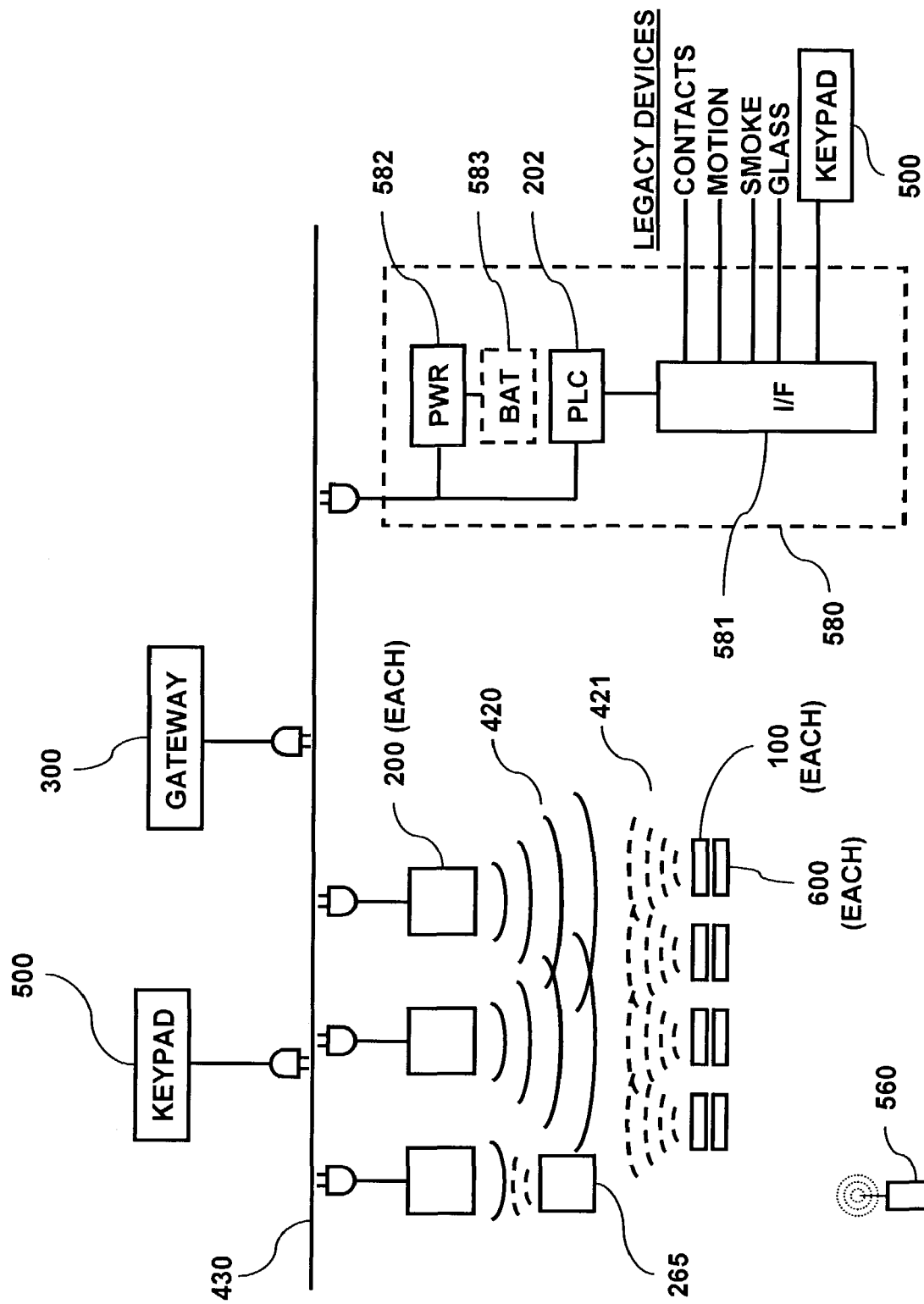
FIG. 16 shows an example configuration in which power line carrier communication is used.

The security system also includes an optional legacy interface module 580 shown in FIG. 16. This interface module 580 can be used by building owners or homeowners that already have certain parts of a conventional wired security system installed, and would like to continue to use these parts in conjunction with the inventive security system disclosed herein. Older wired security systems operate on the contact "closed" or "open" principle. That is, each sensor, whether magnetic/reed switch window/door contact, motion sensor, glass breakage sensor, heat sensor, etc., is in one state (generally contact "closed") when normal, and then is in the other state (generally contact "open") when in the detection state (i.e., intrusion, motion, heat, etc.). The interface module 580 allows these legacy devices to be monitored by the controller 300. The interface module 580 provides active RF 422 or power line communications 202 to the controller function 250, terminal interfaces 581 for the wires associated with the sensors, DC power 582 to powered devices, and battery 583 backup in the case of loss of primary power. The controller function 250 must be configured by the user to interpret the inputs from these legacy devices. The interface module 580 also implements the bus protocol supported by the legacy keypads 500 currently used with conventional wired security systems. This bus protocol is separate from the contact "closed" or "open" interfaces described in the foregoing; it is typically a 4-wire interface whereby commands and responses can be modulated onto the wires. Because of the large numbers of these keypads 500 installed into the marketplace, there is a high degree of familiarity in the home security user base for the form factor and function of these keypads 500. One example of such a keypad 500 supported by the interface module 580 is shown in U.S. Design Pat. No. D389,762, issued on Jan. 27, 1998 to Yorkey, and assigned to Brinks Home Security.

Figure 21:
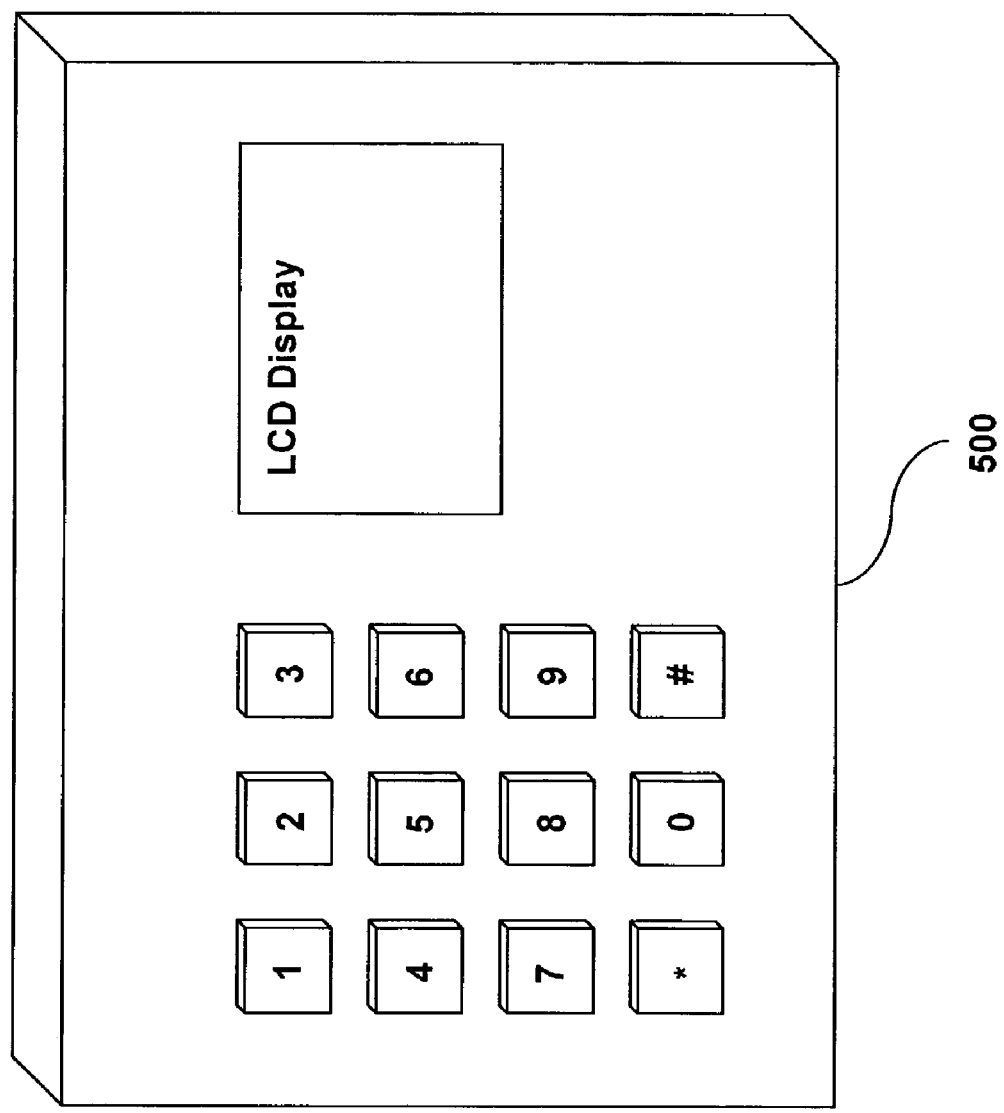
FIG. 21 shows an example embodiment of a keypad and display.

The inventive security system provides a number of mechanisms for users and operators to interface with the security system. On a day-to-day basis, it is expected that most security systems will include a keypad 500 similar to the one shown in FIG. 21 since it is a convenient mechanism by which authorized persons can arm or disarm the system and view the status of various zones. There are a number of keypad options that can be made available for the security system, derived from permutations of the following possibilities: (i) active RF communications 422, backscatter modulation 421, or power line carrier communications 202 with the RFID readers 200, gateways 300, and other devices 550, (ii) AC powered or battery powered, and if battery powered, rechargeable from the RFID readers 200 in the manner discussed earlier for RFID transponders 100, and (iii) inclusion, or not, of sufficient processing 261 and memory 266 capability to also support a controller function 250. In smaller systems, it may be useful for the keypad 500 to be capable of supporting a controller function 250. In larger systems, there will already be a number of RFID readers 200 (and probably gateways 300) with controller functions 250 such that adding one more will not increase the reliability of the system. The choice of the communications mechanism by which the keypad 500 sends and receives commands to the network of devices in the system will largely be driven by the communications choice used by and between the RFID readers 200 and gateways 300. The choice of a power source will largely be a designer choice.

Figure 22:
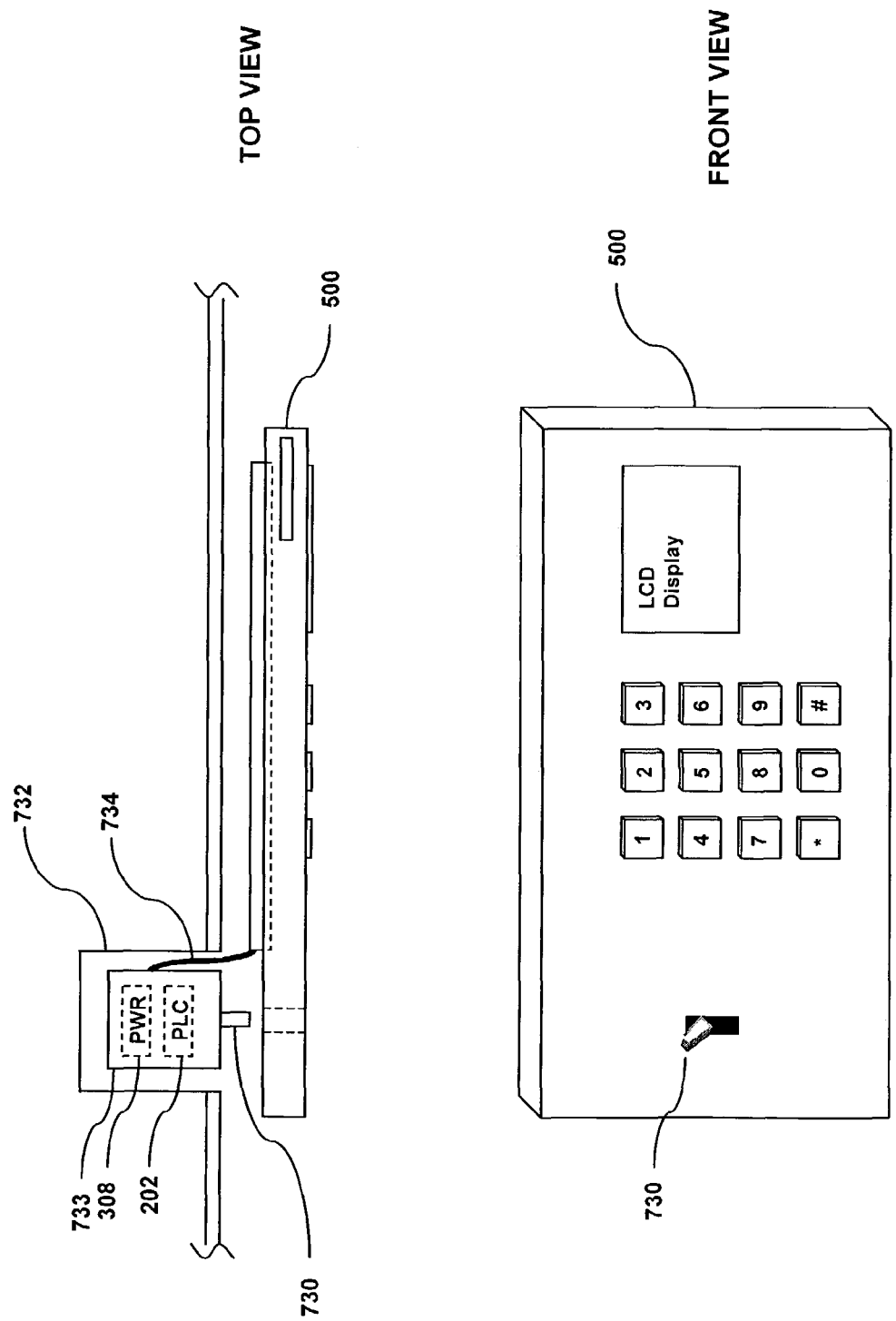
FIG. 22 shows one way in which the keypad may be mounted onto an electrical box while permitting a light switch to protrude.

One example keypad 500 may be mounted, for example, onto the type of electrical box 243 used for light switches 730. One form of packaging that is particularly suited to mounting onto electrical boxes 732 used for light switches 730 is shown in FIG. 22. In this figure, the keypad 500 is packaged with a light switch 730 so that the installation of the present security system does not result in the loss of an accessible light switch 730. The power supply 308 and power line communications interface circuits 202, if included, are packaged with a light switch 730 into an AC interface unit 733 and installed into electrical box 732. A wire connection 734 protrudes from this AC interface unit 733 for connection to the keypad 500. The keypad 500 is then mounted onto the wall in such a manner that the light switch 730 portion of the AC interface unit 733 protrudes through the housing of the keypad 500, thereby enabling both the light switch 730 to be accessible and the keypad 500 to access AC power through an existing electrical box 732.

Another interface mechanism available for use with the security system is voice recognition and voice response. When an RFID reader 200 is manufactured with an acoustic transducer 210, the RFID reader 200 can also include software-based functionality in the program code 251 to interpret spoken words as commands to the security system. Similarly, the security system can respond to spoken word commands with spoken word responses or tones. Software to perform voice recognition and voice response is widely available and known to those skilled in the art, though most existing software must be modified to support the relative noisy environment of the typical home. U.S. Pat. No. 6,574,596, issued to Bi, et al., provides one example description of voice recognition, as do several well-known textbooks.

With the voice recognition and voice response as the primary interface mechanism, it is possible to implement a version of the inventive security system with no keypad 500 at all. The RFID readers 200 with acoustic transducers 210 can be used by authorized users to perform various functions, including the day-to-day functions such as arming and disarming the system. One attractive advantage of incorporating voice recognition and voice response into the security system via the acoustic transducer 210 in the RFID reader 200 is that the security system can be armed or disarmed from any room in the house in which an RFID reader 200 is installed. The voice commands received at a single RFID reader 200 can be communicated to the controller functions 250 of all other devices in the security system.

Another interface mechanism available for use with the security system is a USB gateway 510 that enables a desktop or laptop computer to be used for downloading, uploading, or editing the configuration stored in the controller functions 250. The USB gateway 510 connects to and can obtain power from the Universal Serial Bus (USB) port commonly installed in most computers 450 today. The USB gateway device 510 then converts signals from the USB port to backscatter modulation or active RF communications 422 with an RFID reader 200 or gateway 300, thereby providing access to the configuration data stored by the controller functions 250. A software program provided with the USB gateway 510 enables the user to access the USB gateway 510 via the USB port, and display, edit, or convert the configuration data. In this manner, authorized users have an easy mechanism to create labels for each of the RFID readers 200, gateways 300, RFID transponders 100, and other devices 550. For example, a particular RFID transponder 100 may be labeled "Living Room Window" so that any alert generated by the security system can identify by label the room in which the intrusion has occurred. The labels created for the various devices can also be displayed on the keypad 500 to show, for example, which zones are in an open or closed state.

Though most homes obtain Internet access via a broadband or modem connection, the USB gateway 510 can also be used to send or receive email on the PC 450 via the modules 310 to 313 installed in a gateway 300. This therefore expands the capability and cost effectiveness of the inventive security system, and expands its use beyond just security.

In a similar manner, the security system also supports an email device 530 that uses active RF communications 422, backscatter modulation 421, or power line carrier communications 202 to communicate with the RFID readers 200 and gateways 300. This email device 530, which can take the form of a palm-type organizer or other forms, will typically be used to send and receive email via the modules 310 to 313 installed in a gateway 300. As described earlier, the various devices in the security system self form a network, thereby enabling messages to originate on any device and terminate on any capable device. Therefore, it is not necessary that the email device 530 be near a gateway 300. If necessary, messages can be received via the modules 310 to 313 installed in a gateway 300, be routed through multiple RFID readers 200, and then terminated at the email device 530. The primary advantage of including an email device 530 in the security system is to give the homeowner a device that is always on and available for viewing. There are a greater number of wireless phones in use today capable of sending and receiving SMS messages. The email device 530 provides a convenient "always on" device whereby family members can send short messages to each other. Alternately, in another example, one spouse can leave a message for another spouse before leaving work.

As an alternative to using a USB gateway 510, the security system also supports a WiFi gateway 520. WiFi, also known as 802.11b, is becoming a more prevalent form of networking computers. Recently, Intel made available a new chip called Centrino by which most new computers will automatically come equipped with WiFi support. Therefore, rather than using a USB gateway 510 that connects to a port on the computer 450, a gateway 300 can have a WiFi module 520 installed in the PCMCIA or CF slot 330. WiFi modules with these form factors are available from a number of manufacturers, such as Bromax. The gateway 300 with WiFi module 520 can provide either local access from a local PC 450 (assuming that the local PC supports WiFi) to the security system, or alternately from the security system to a public WiFi network 404. It is expected that, in the near future, some neighborhoods will be wired with public WiFi networks 404. These public WiFi networks 404 will provide another alternative access to the Internet from homes (in addition to cable modems 440 and DSL 441, for example). There may be users, therefore, that may prefer the security system to provide alerts through this network rather than a PSTN 403 or CMRS 402 network. In the event these public WiFi networks 404 become prevalent, then the security system can offer the email access described above through these networks as well. The gateway 300 with WiFi module 520 primarily acts as a protocol converter between the chosen modulation and protocol used within the security system and the 802.11b standard. In addition to the protocol conversion, the gateway 300 with WiFi module 520 also provides a software-based security barrier similar to a firewall to prevent unauthorized access to the security system. Any application accessing the security system, whether on a local PC 450 or remote through a public WiFi network 404, must possess and use one of the master keys 265 provided by one of the gateways 300 or RFID readers 200.

Through one or more of the gateways 300, the security system can access external networks 410 as well as be accessed through these same networks. Some users may find it useful to be able to visually or audibly monitor their home or building remotely. Therefore, the security system also supports camera devices 540 and audio devices 540, as well as combination camera/audio devices 540 that enable a user to remotely see and/or hear what is occurring in a home or building. Each of the devices can be individually addressed, like the RFID readers 200 and gateways 300, since each is provided with a unique identity. The camera device 540 can be implemented as an RFID reader 200 with a camera component or the camera device can be manufactured without RFID reading capability, at the option of the designer. When a security system causes an alert, an emergency response agency 460 or an authorized user can be contacted. In addition to reporting the alert, as well as the device (i.e., identity of the RFID transponder 100) causing the alert, the security system can be configured to provide pictures and/or audio clips of the activity occurring within the security system. Low-cost miniature cameras are widely available for PC and wireless phone use, and formats for transmitting pictures taken by these miniature cameras is also widely known. In the inventive security system, cameras and/or microphones are packaged in a manner similar to RFID readers 200. These devices 540 are powered locally and support active RF communications 422 or power line carrier communications 202 so as to transfer pictures and/or audio to the appropriate gateway 300. These devices will be particularly useful in communities in which the emergency response agency 460 requires confirmation of intrusion prior to dispatching police.

There are multiple uses for the audio and camera support in the security system in addition to alarm verification by an emergency response agency 460. A caregiver can check in on the status of an elderly person living alone using the audio and/or camera capabilities of the security system. A family on a trip can check in on the activities of a pet left at home. The owner of a vacation home can periodically check in on the property during the winter months when the vacation home is otherwise unoccupied. By combining the audio and/or camera capability with the USB gateway 510 and a local PC 450, a user can store picture and audio files on the PC 450 to provide a continuous record of activities in the home. As an alternative to storing pictures on a local PC 450, a device 550 can be provided with a large enough memory 266 to contain a file system wherein the file system stores pictures periodically taken by one or more cameras in the security system. The pictures in the file system can be accessed later to retrieve pictures taken at particular times.

One advantageous device in which a camera can be included is another device 550 with smoke detection capability. Since smoke detectors are generally mounted on ceilings, the inclusion of camera capability into a ceiling-mounted smoke detector will provide the camera with a wide angle of view with little likely viewing obstruction. A smoke detection device with AC power provided will already include many or all of the elements shown in FIG. 5A; therefore, it is only an incremental cost to add the camera capability as a further device specific capability 263.

The inventive security system does not require all smoke detectors installed in a home to be devices 550 as defined in this specification. Certain manufacturers, such as a Firex, already provide families with low-cost smoke detectors that have a wired communications capability; that is, if one smoke detector detects smoke and causes an audible alert, all smoke detectors that are wired to the detecting smoke detector also cause an audible alert. Using the present invention, one of the example Firex smoke detectors can be replaced with a smoke detection device 550 of the inventive security system, and if any of the Firex family of smoke detectors causes an alert and sends a communication via the standard Firex wired communications, the smoke detection device 550 of the inventive security system will receive the same communication as all Firex smoke detectors on the same circuit, and the inventive security system can cause its own alert using its own audible capability and/or any gateway devices 300 installed in the inventive security system. This ability to convert the wired communication from an existing Firex network of smoke detectors into an appropriate communication within the inventive security system obviates the need for a user to replace all of the smoke detectors in a home when installing an inventive security system. Note that while smoke detectors and Firex have been used as examples, other types of sensors and other brands/manufacturers can be substituted into this specification without detracting from the inventive nature.

In addition to detecting intrusion, the security system can monitor the status of other environmental quantities such as fire, smoke, heat, water, gases, temperature, vibration, motion, as well as other measurable events or items, whether environmental or not (i.e., presence, range, location). The list of sensor possibilities is not meant to be exhaustive, and many types of sensors already exist today. An important part of the inventive nature of this security system is enabling the reading and monitoring of various other sensor types 620 by an RFID-based security system using backscatter modulation 421 or active RF communications 422, whereby the monitoring of intrusion is combined with the monitoring of other measurable quantities, and placed under the control of a common master controller. For each of these sensor types 620, the security system can be configured to report an alert based upon a change in the condition or quantity being measured, or by the condition or quantity reaching a particular relationship to a predetermined threshold, where the relationship can be, for example, one or more of less than, equal to, or more than (i.e., a monitored temperature is less than or equal to a predetermined threshold such as the freezing point).

These detection devices can be created in at least two forms, depending upon the designer's preference. In one example embodiment, an appropriate sensor can be connected to an RFID transponder 100, in a manner similar to that by which an intrusion sensor 600 is connected to the RFID transponder 100. All of the previous discussion relating to the powering of an LED generator 601 by the RFID transponder 100 applies to the powering of appropriate sensors as well. This embodiment enables the creation of low-cost sensors, as long as the sensors are within the reader range of RFID readers 200.

In a second example embodiment, these sensor devices may be independently powered, much as RFID readers 200 and gateways 300 are independently powered. Each of these detection devices are created by combining a sensor appropriate for the quantity being measured and monitored with a local power supply 264, processor 261, and a communications mechanism 262 that may include any of active RF 422, backscatter modulation 421, or power line carrier communications 202. In either of these example embodiments, the detection devices must be registered using the same mechanism as discussed for RFID readers 200, gateways 300, and other devices 550. These sensor devices may find great use in monitoring the status of unoccupied buildings, such as vacation homes. A temperature sensor may be useful in alerting a remote building owner if the heating system has failed and the building plumbing is in danger of freezing. Similarly, a flood-prone building can be monitoring for rising water while otherwise unoccupied.

In addition to performing the functions described herein within a single building or home, the security system in one building can also operate in concert with an inventive security system installed in one or more other buildings through a networking capability. There are two levels of networking supported by the security system: local and server-based. Local networking operates using active RF communications 422 between security systems installed in two different buildings. Because of the power levels supported during active RF communications 422, the distance between the security systems in the two buildings can be a mile or greater, depending upon terrain. Each of the security systems remain under the control of their respective master controllers, and the controller function 250, including both the program code 251 and configuration data 252, of each device remains dedicated to its own security system. However, an authorized user of one security system and an authorized user of a second security system can command their respective systems to permit communications between the two security systems, thereby creating a network between the two systems. This network can exist between more than just two systems; for example, an entire neighborhood of homes, each with an inventive security system, can permit their respective security systems to network with other security systems in the neighborhood.

When two or more security systems are networked using active RF communications 422, various capabilities of each security system can be shared. For example, a first security system in a first home can access a gateway 300 associated with a second security system in a second home. This may be advantageous if, for example, an intruder were to cut the phone line associated with the first home, thereby rendering useless a gateway 300 with modem module 310 installed in the first security system. It is unlikely that an intruder would know to cut the phone lines associated with multiple homes. In another example, if a child wearing an RFID transponder 100 associated with the first security system is present in the second home, the second security system can read the RFID transponder 100 on the child and provide the read data to the first security system, thereby enabling a parent to locate a child at either the first home or the second home. In yet another example, if the first security system in the first home causes an alert, and the occupants are away on travel, the first security system can request the second security system to also cause an alert thereby notifying the neighbors at the second home of the alert and enabling them to investigate the cause of the alert at the first home.

When two security systems are beyond the range of communications via active RF communications 422, the security systems may still form a network through their respective gateways 300. The security systems may either network through direct connection between their respective gateways 300 or may network through an intermediate server. The use of an intermediate server can enable the first security system and the second security system to have different types of modules 310 to 313 installed in the gateway 300 of each respective security system. Since a commercial emergency response agency will likely already have servers equipped to support the various types of modules 310 to 313 installed in various gateways 300, the provision of an intermediate server for networking security systems may present an expanded business opportunity.

Networking through intermediate servers expands the applications and usefulness of the inventive security system. For example, there may be a caregiver that would like to monitor an elderly parent living alone in another city. Using the networking feature, the caregiver can monitor the armed/disarmed status of the security system in the home of the elderly parent, use two-way audio and/or the camera of the security system to check on the elderly parent, and monitor any RFID transponder 100 worn by the elderly parent. This may be equally useful for parents to monitor a student living away at college, and other similar family situations.

In either form of networking, the security system can provide an authentication mechanism to ensure that networking is not inadvertently enabled with another unintended security system. The authentication mechanism may consist of the mutual entering of an agreed security code in each of the two security systems which are to network. In their communications with each other, the two security systems may send and verify that the security codes properly match before permitting various operations between the two systems. Other authentication mechanisms may also be used, such as the shared use of a designated master key RFID transponder 265. In this example, rather that requiring the mutual entering of an agreed security code, each of the security systems which are to network can be required to first read the same designated master key RFID transponder 265. As described earlier, the reading of master key RFID transponders 265 requires a close physical proximity generally attainable only by authorized users.

In addition to the physical embodiments described herein, various components of the security system can be manufactured in other physical embodiments. For example, modern outlet boxes used for both outlets and light switches are available in sizes of 20 cubic inches or more. In fact, many modern electrical codes require the use of these larger boxes. Within an enclosure of 20 cubic inches or more, an RFID reader 200 can be manufactured and mounted in a form integrated with an outlet or a light switch as shown in FIG. 18B. The installation of this integrated RFID reader 200 would require the removal of a current outlet, and the connection of the AC power lines to the integrated RFID reader 200/outlet. The AC power lines would power both the RFID reader 200 and the outlet. In addition to a cleaner physical appearance, this integrated RFID reader 200/outlet would provide the same two outlet connection points as standard outlets and provide a concealed RFID reader 200 capability. In a similar manner, an integrated RFID reader 200/light switch can also be manufactured for mounting within an outlet box.

The true scope of the present invention is not limited to the presently preferred embodiments disclosed herein. As will be understood by those skilled in the art, for example, different components, such as processors or chipsets, can be chosen in the design, packaging, and manufacture of the various elements of the present invention. The discussed embodiments of the present invention have generally relied on the availability of commercial chipsets, however many of the functions disclosed herein can also be implemented by a designer using discrete circuits and components. As a further example, the RFID reader 200 and RFID transponder 100 can operate at different frequencies than those discussed herein, or the gateways 300 and RFID readers 200 can use alternate RF or power line communications protocols. Also, certain functions which have been discussed as optional may be incorporated as part of the standard product offering if customer purchase patterns dictate certain preferred forms. Finally, this document generally references U.S. standards, customs, and FCC rules. Various parameters, such as input power or output power for example, can be adjusted to conform with international standards. Accordingly, except as they may be expressly so limited, the scope of protection of the following claims is not intended to be limited to the specific embodiments described above.

I claim:

1. A first RFID reader for use in a security network in a building having an RFID transponder physically connected to or incorporating a sensor, the first RFID reader comprising:
   a first antenna for wirelessly communicating with, by sending transmissions to and receiving a wireless signal which indicates a status of the sensor from, the RFID transponder; and
   a processor coupled to the antenna and configured to receive the wireless signal, decode the sensor status from the wireless signal, and communicate the sensor status to a control function.

2. The first RFID reader of claim 1 wherein the security network is configured for use in a building having an opening and the sensor monitors the opening to detect intrusion.

3. The first RFID reader of claim 1 wherein the security network is configured for use in a building and the sensor monitors the building for smoke or fire.

4. The first RFID reader of claim 1 wherein the security network includes a second RFID reader and the first RFID reader receives wireless communications from the second RFID reader.

5. The first RFID reader of claim 1 wherein the security network includes a second RFID reader and the first RFID reader transmits wireless communications received from the RFID transponder to the second RFID reader.

6. The first RFID reader of claim 1 further comprising a second antenna for use in wireless communications.

7. The first RFID reader of claim 6 wherein only one of the first antenna and the second antenna is used in each wireless communication.

8. The first RFID reader of claim 7 further comprising configuration data including parameters that predetermine which of the first antenna or the second antenna to use in each wireless communication.

9. The first RFID reader of claim 1 further comprising a battery backup.

10. The first RFID reader of claim 1 wherein the processor is configured to support more than one modulation technique.

11. The first RFID reader of claim 10 wherein at least one modulation technique is continuous wave.

12. The first RFID reader of claim 10 wherein at least one modulation technique is Gaussian Frequency Shift Keying.

13. The first RFID reader of claim 1 wherein the first RFID reader supports multiple transmit power levels.

14. The first RFID reader of claim 1 configured to vary its rate of transmitting RF energy.

15. The first RFID reader of claim 1 further comprising algorithms for using microwave Doppler analysis to detect motion.

16. The first RFID reader of claim 15 configured to apply the algorithms for using microwave Doppler analysis to detect motion in response to wireless communications received from the RFID transponder.

17. The first RFID reader of claim 1 further comprising an acoustic transducer.

18. The first RFID reader of claim 17 further comprising algorithms to process audio waves received by the acoustic transducer wherein the algorithms detect glass breakage.

19. The first RFID reader of claim 17 further comprising algorithms to process audio waves received by the acoustic transducer wherein the algorithms perform voice recognition.

20. The first RFID reader of claim 19 wherein the processor is configured to perform the control function in response to commands received via voice recognition.

21. The first RFID reader of claim 17 further comprising algorithms to digitize the audio waves received by the acoustic transducer and retransmit the digitized audio waves via wireless communications.

22. The first RFID reader of claim 1 further comprising a sensor that monitors an environmental parameter in at least one portion of the building.

23. The first RFID reader of claim 22 wherein the environmental parameter is the presence of smoke.

24. The first RFID reader of claim 22 wherein the environmental parameter is temperature.

25. The first RFID reader of claim 22 wherein the environmental parameter is the presence of water.

26. The first RFID reader of claim 1 further comprising a camera.

27. The first RFID reader of claim 26 further comprising algorithms to digitize pictures recorded by the camera and transmit the digitized pictures via wireless communications.

28. The first RFID reader of claim 1 wherein at least one operation of the first RFID reader is under the control of a master controller contained within the security network.

29. The first RFID reader of claim 28 wherein the master controller is contained within a device in the security network other than the first RFID reader.

30. The first RFID reader of claim 28 further comprising the master controller.

31. The first RFID reader of claim 30 wherein the master controller sends a command controlling at least one operation of another device within the security network.

32. The first RFID reader of claim 1 further comprising configuration data that are changed under the control of a master controller or the control function contained within the security network.

33. The first RFID reader of claim 1 further comprising a memory which stores program code executed by the processor wherein the program code is updatable under the control of a master controller or the control function contained within the security network.

34. The first RFID reader of claim 1 further comprising physical packaging wherein the RFID transponder is positioned within the physical packaging of the first RFID reader.

35. The first RFID reader of claim 1 further comprising an interface to another security system.

36. The first RFID reader of claim 35 configured to receive power via the interface to the other security system.

37. The first RFID reader of claim 35 configured to receive commands via the interface to the other security system.

38. The first RFID reader of claim 1 mechanically mounted to a plate wherein the plate is configured to be mechanically mounted to an outlet.

39. The first RFID reader of claim 1 integrated with an outlet and configured to be installed within a standard outlet box.

40. The first RFID reader of claim 1 integrated with a light switch and configured to be installed within a standard outlet box.

41. The first RFID reader of claim 1 wherein the control function is performed by the first RFID reader.

42. The first RFID reader of claim 1 wherein the RFID transponder and the first RFID reader are positioned in a fixed, static relationship.

43. An RFID reader for use in a security network in a structure having a sensor monitoring an opening of the structure to detect intrusion and an RFID transponder being physically connected to or having incorporated the sensor, the RFID reader comprising:

an antenna wirelessly communicating with, by sending transmissions to and receiving a wireless signal which indicates a status of the sensor from, the RFID transponder;

a processor coupled to the antenna and configured to support more than one modulation technique and to receive the wireless signal, decode the sensor status from the wireless signal, and communicate the sensor status to a control function; and a memory which stores program code executed by the processor wherein the program code is updatable under the control of a master controller or the control function.

44. An RFID reader for use in a security network in a structure having a sensor monitoring an opening of the structure to detect intrusion and an RFID transponder being physically connected to or having incorporated the sensor, the RFID reader comprising:

an antenna wirelessly communicating with, by sending transmissions to and receiving a wireless signal which indicates a status of the sensor from, the RFID transponder;

a control function;

a processor coupled to the antenna and configured to support more than one modulation technique and to receive the wireless signal, decode the sensor status from the wireless signal, and communicate the sensor status to the control function; and a memory which stores program code executed by the processor wherein the program code is updatable under the control of the control function, the first RFID reader supporting multiple transmit power levels.

* * * * *